US011797119B2

(12) United States Patent
Isaacson et al.

(10) Patent No.: US 11,797,119 B2
(45) Date of Patent: Oct. 24, 2023

(54) SELECTIVELY ADHERED RESISTIVE FORCE SENSOR

(71) Applicant: Sensei, Inc., Mountain View, CA (US)

(72) Inventors: Scott Isaacson, Mountain View, CA (US); Ilya Daniel Rosenberg, Mountain View, CA (US)

(73) Assignee: SENSEL, INC., Sunnyvale, CA (US)

( * ) Notice: Subject to any disclaimer, the term of this patent is extended or adjusted under 35 U.S.C. 154(b) by 0 days.

(21) Appl. No.: 15/952,388

(22) Filed: Apr. 13, 2018

(65) Prior Publication Data

US 2018/0299997 A1    Oct. 18, 2018

Related U.S. Application Data

(60) Provisional application No. 62/485,893, filed on Apr. 14, 2017.

(51) Int. Cl.
*G06F 3/045*        (2006.01)
*G06F 3/041*        (2006.01)
(Continued)

(52) U.S. Cl.
CPC .......... *G06F 3/0414* (2013.01); *G06F 3/045* (2013.01); *B32B 37/1292* (2013.01); *B32B 38/10* (2013.01); *B32B 43/006* (2013.01); *B32B 2457/08* (2013.01); *G06F 2203/04102* (2013.01); *G06F 2203/04103* (2013.01)

(58) Field of Classification Search
CPC ................. G06F 3/045; G06F 3/0414; G06F 2203/04102; G06F 2203/04103; B32B 38/10; B32B 37/1292; B32B 2457/08; B32B 43/006
See application file for complete search history.

(56) References Cited

U.S. PATENT DOCUMENTS 4,314,227 A    2/1982   Eventoff
5,802,911 A    9/1998   Cahill et al.
(Continued)

FOREIGN PATENT DOCUMENTS

CN    1813325 A      8/2006
CN    103534673 A    1/2014
(Continued)

OTHER PUBLICATIONS

International Search Report and Written Opinion for International Application Serial No. PCT/US18/27719 dated Jul. 9, 2019, 15 pages.
(Continued)

*Primary Examiner* — Dennis P Joseph
(74) *Attorney, Agent, or Firm* — Amin, Turocy & Watson, LLP

(57) ABSTRACT

A system and method for fabricating a selectively-adhered force sensor comprising a flexible membrane constrained at a multitude of points within the sensor active area. The system comprising a processor; and a memory that stores
(Continued)

executable instructions that, when executed by the processor, facilitate performance of operations, comprising: facilitating application of a conductive layer to a first surface; and facilitating curing of the conductive layer to the first surface.

20 Claims, 65 Drawing Sheets

(51) Int. Cl.
*B32B 43/00* (2006.01)
*B32B 38/10* (2006.01)
*B32B 37/12* (2006.01)

(56) References Cited

U.S. PATENT DOCUMENTS

| | | | |
|---|---|---|---|
| 8,400,411 B2 | 3/2013 | Sasaki et al. | |
| 9,001,082 B1 | 4/2015 | Rosenberg et al. | |
| 9,158,383 B2 | 10/2015 | Shaw et al. | |
| 2001/0008389 A1 | 7/2001 | Serban et al. | |
| 2002/0104369 A1 | 8/2002 | Baker et al. | |
| 2003/0151103 A1 | 8/2003 | Endo et al. | |
| 2005/0128047 A1 | 6/2005 | Watanabe et al. | |
| 2005/0259069 A1 | 11/2005 | Baker et al. | |
| 2006/0216846 A1* | 9/2006 | Oi | G01P 15/0802 438/455 |
| 2006/0257625 A1* | 11/2006 | Wakizaka | B32B 7/02 428/141 |
| 2014/0020484 A1 | 1/2014 | Shaw et al. | |
| 2015/0076632 A9 | 3/2015 | Murarka et al. | |
| 2018/0121004 A1* | 5/2018 | Xu | F21V 3/00 |
| 2018/0299997 A1 | 10/2018 | Isaacson et al. | |

FOREIGN PATENT DOCUMENTS

| | | |
|---|---|---|
| EP | 0 649 518 A1 | 4/1995 |
| JP | 2002-525564 A | 8/2002 |
| JP | 2008-203110 A1 | 9/2008 |
| JP | 2010015793 A | 1/2010 |
| JP | 6745409 B2 | 8/2020 |
| KR | 10-20150013439 A | 2/2015 |
| TW | 201033868 A | 9/2010 |
| WO | 00/16053 A1 | 3/2000 |

OTHER PUBLICATIONS

Communication pursuant to Rules 161(2) and 162 EPC issued in European Patent application No. 18784414.7, dated Nov. 21, 2019, 4 pages.
Japanese Notice of Allowance received for Japanese Patent Application Serial No. 2019-527312 dated Jun. 2, 2020, 5 pages (Including English Translation).
Japanese Office Action received for Japanese Patent Application Serial No. 2019-527312 dated Feb. 18, 2020, 7 Pages including English Translation.
Korean Office Action for Korean Application No. 10-2019-7013013 dated Mar. 30, 2021, 6 pages.
EP Office Action for EP Application No. 18784414.7 dated Jan. 14, 2021, 1 pages.
The extended European search report received for EP Patent Application Serial No. 18784414.7 dated Dec. 9, 2020, 13 pages.
First Office action received for China Patent Application serial No. 201880005167.3 dated Nov. 26, 2020, 8 pages.
Second Office action received for China Patent Application serial No. 201880005167.3 dated Jun. 24, 2021, 17 pages.
Notice of Reasons for Refusal received for Japanes application No. 2020-131716 dated May 11, 2021, 4 pages.
Decision to Grant a Patent received for Japanese Patent Application Serial No. 2020-131716 dated Oct. 19, 2021, 6 pages (Including English Translation).
Notice of Allowance dated Jan. 5, 2022 for Chinese Patent Application No. 201880005167.3, 7 pages (with translation).
Korean Office Action for Korean Application No. 10-2021-7013135 dated Aug. 8, 2022, 7 pages (with translation).
Office action received for Korean Patent Application serial No. 10-2019-7013013 dated Aug. 27, 2020, 8 pages.
Office Action dated Apr. 4, 2022 for European Patent Application No. 18784414.7, 25 pages.
Korean Office Action for Korean Application No. 10-2021-7013135 dated Mar. 7, 2023, 6 pages (with translation).

\* cited by examiner

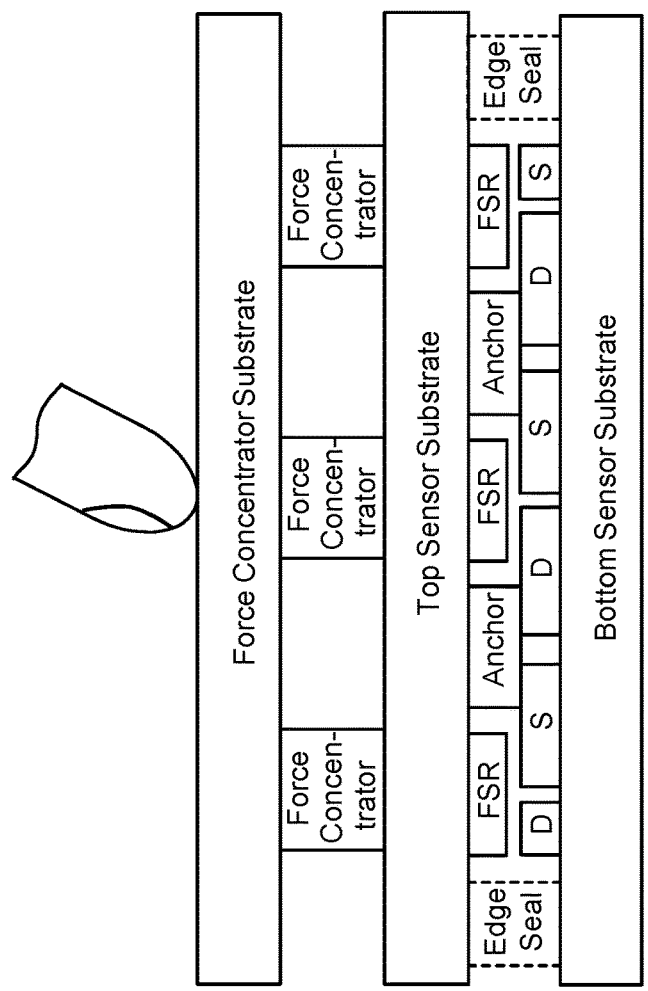
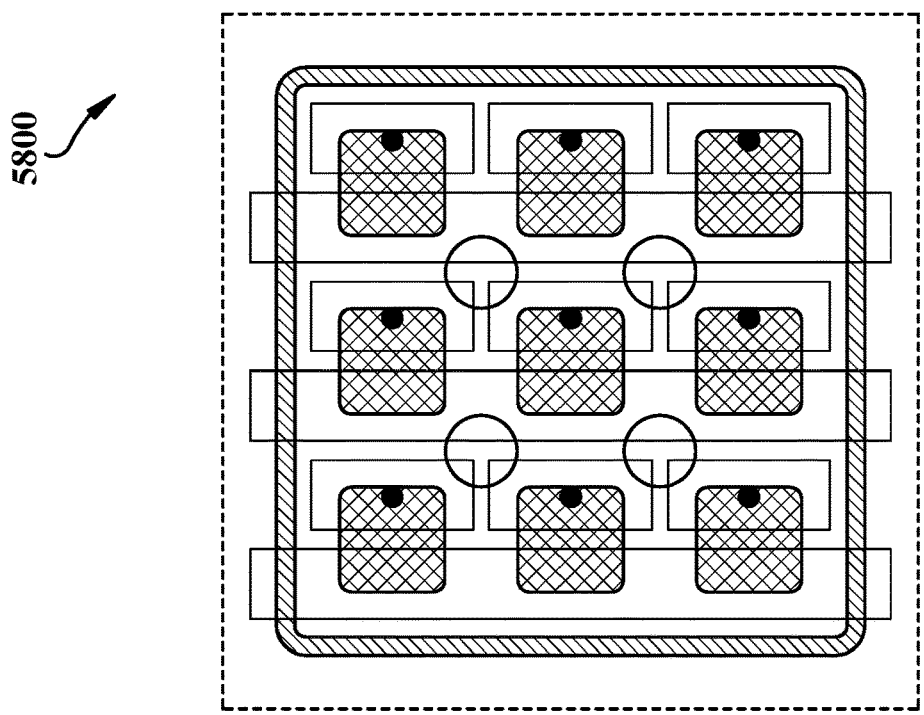
FIG. 58

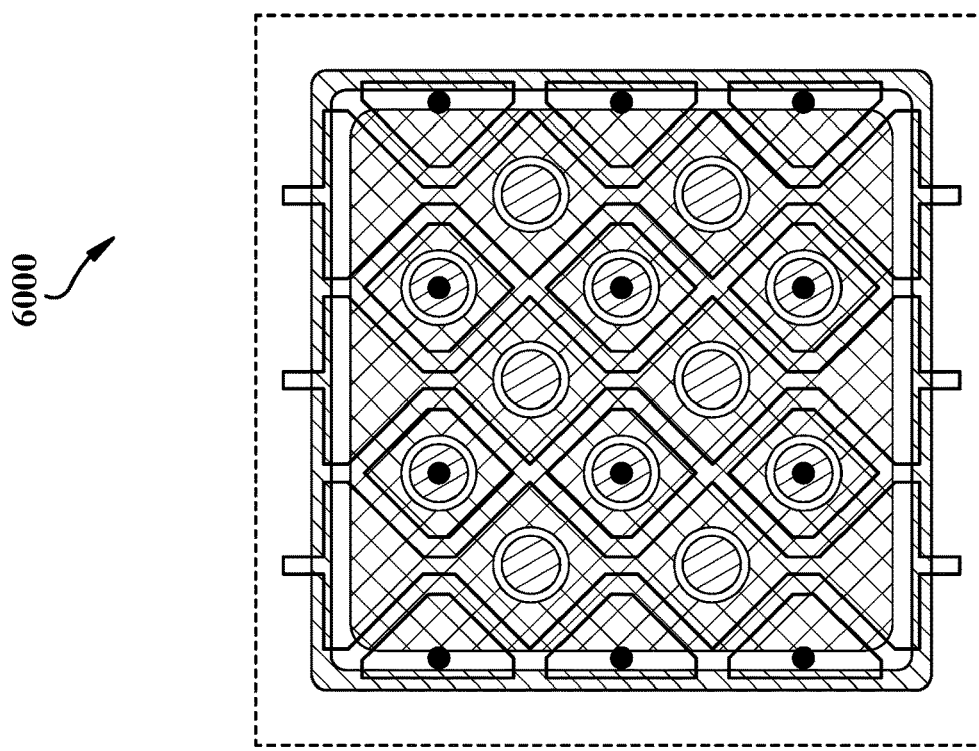
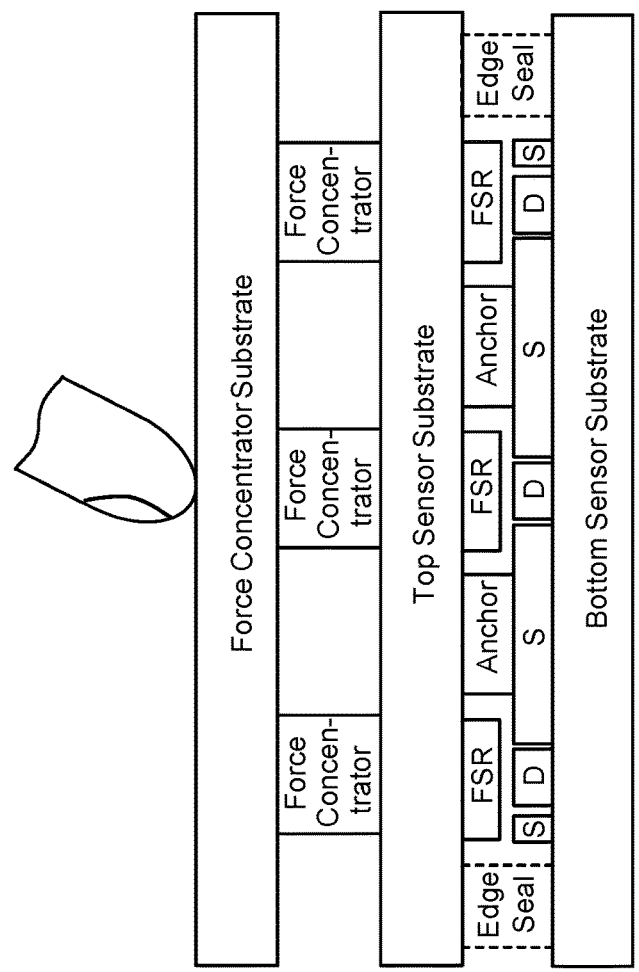
FIG. 60

SELECTIVELY ADHERED RESISTIVE FORCE SENSOR

CROSS REFERENCE TO RELATED APPLICATIONS

This application claims priority to U.S. Provisional Patent Application Ser. No. 62/485,893, titled: "TOUCH SENSOR HAVING SECTIONED FLEXIBLE HUMAN INTERACTIVE ELEMENTS FACING SENSOR ELEMENTS AND EACH SECTIONAL ELEMENT SELECTIVELY ATTACHED TO PLURALITY OF ADHESION REGIONS DISTRIBUTED ACROSS AREA OF A SENSOR PAD AND METHODOLOGY FOR MAKING SAME," filed Apr. 14, 2017, the disclosure of which is hereby incorporated herein by reference in its entirety.

TECHNICAL FIELD

The disclosed subject matter relates to the provision of selectively-adhered force sensors in which a flexible membrane is constrained at multiple points within the sensor active area.

BACKGROUND

Resistive touch sensor devices are generally constructed such that the conductive layer attached to the underside of a flexible membrane is suspended above groups of sensors (e.g., drive sensor electrodes and sense sensor electrodes). Resistive touch sensor devices generally rely on the same basic principles of using a conductive layer (e.g., force sensitive/sensing resistor (FSR) material) to create an electrical pathway between drive sensor electrodes and sense sensor electrodes when the flexible membrane is deflected or when the flexible membrane is depressed. To perform touch detection, a bias is applied across adjacent sensor electrodes. When a force is applied to deflect or depress the flexible membrane, the conductive layer (typically a conductive polymer composite) contacts a sensor electrode and creates a new electrical path. Depending on sensor design, the magnitude, location, area, and other characteristics of this force can be determined by measuring resistance or conductivity changes that can result from creation of new electrical path.

Generally, in most resistive touch sensor devices, an air gap typically separates the conductive layer from the sensor electrodes. A strict air gap can be created by using a ring spacer adhesive formed around a peripheral margin of the sensor and suspending the membrane above the central active area comprising the sensor electrodes. For larger devices where using a ring spacer adhesive formed to maintain a strict air gap is impractical, glass beads or adhesive dots can be used to separate the conductive layer from the sensor electrodes. In other designs, the flexible membrane can be allowed to rest gently on the sensor electrodes under the influence of gravity. In this case, the real contact area of the conductive layer with the sensor electrodes is much smaller than the apparent contact area, and generally is controlled by a flatness, waviness, and/or roughness of a first surface and a second surface.

BRIEF DESCRIPTION OF DRAWINGS

FIGS. 58-65 provide top-down illustration of shunt-mode and through-mode sensor devices fabricated in accordance with one or more disclosed embodiments.

DETAILED DESCRIPTION

Figure 1:
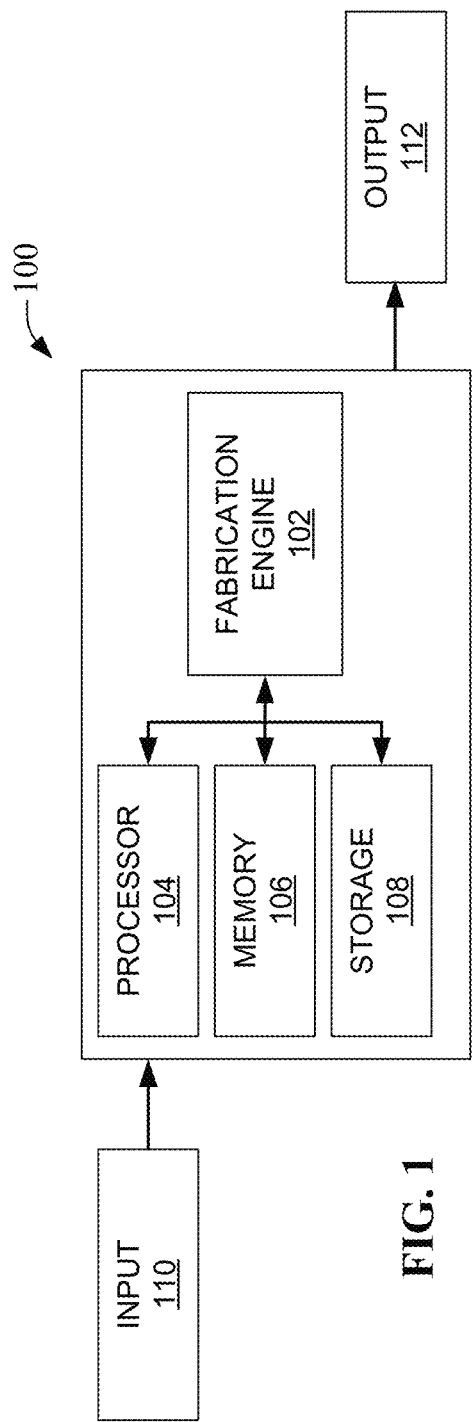
FIG. 1 is an illustration of a system for fabricating touch sensor devices having sectioned flexible human interactive elements facing sensor elements, wherein each sectional element is selectively attached to a plurality of adhesion areas of a sensor pad, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

It should be realized and appreciated by those of ordinary skill that the foregoing non-limiting example application is merely an illustration of a use of the disclosed and described solution and is provided only for the purposes of exposition. The described and disclosed subject matter is therefore not limited to the following example applications, but can find applicability in other more generalized circumstances and use applications.

This disclosure describes a selectively-adhered force sensor that provides solutions to the challenges of unconstrained flexible membranes, dramatically shrinks associated air gaps, and imparts improved functionality to the sensor. While the disclosure describes use of resistive force sensors as implementation examples, the selective adhesion concept has applicability in other types of sensors and devices.

A selectively-adhered force sensor can comprise an array of sensor electrodes with numerous adhesion areas within a sensor active area that selectively constrains a flexible membrane. The areas of constraint can be implemented in a variety of ways, including by using selectively-applied adhesive, by direct bonding of components, and/or by mechanical fastening. The areas of constraint can also be applied to different pairs of device components. For instance, a conductive layer can be bonded to sensor electrodes and/or to the electrode substrate, which may be an underlying printed circuit board (PCB). The flexible membrane can thus be constrained by virtue of being bonded to the conductive layer. Such dispersed constraint of the flexible membrane allows the traditional ring spacer adhesive seen in traditional resistive force sensors to be an optional feature rather than a functional requirement. Also described and disclosed are examples in which the conductive layer is patterned or segmented. In addition to the constraint types described above, this allows the flexible membrane to be bonded to the sensor electrodes or the underlying substrate. Also detailed is the addition of force-concentrating elements to all of the described and detailed designs. Force-concentrating elements allow forces impinging on the device from the external environment to be selectively transmitted to specific regions of a conductive layer-sensor electrode interface.

Adhesion areas that can selectively bond the conductive layer, sensor electrodes, PCB surface (e.g., an electrode substrate wherein electrodes can be situated atop of other disparate flexible substrates, flexible surfaces, rigid substrates, and/or rigid surfaces), and flexible membrane can be realized in a number of different ways and are described more fully herein. Typically, the adhesion areas and force concentrating features can be positioned such that they work in concert with one another to enhance or minimally interfere with sensor performance (e.g., sensitivity, accuracy, hysteresis, etc.). An optimal pattern can generally depend on the precise design of the force sensor, electrode pattern, and the primary application(s) for which the device is designed.

In regard to the aforementioned PCB surface or electrode substrate, it should be noted without loss of generality or unduly impinging on the ambit of the subject disclosure, that the PCB surface is not necessarily constrained or limited to a printed circuit board (PCB). Varied combinations of a flexible substrate, flexible surface, rigid surface, and/or rigid substrates can be utilized to achieve a similar functionalities. For instance, in one or more embodiments, a two-dimensional array of electrodes can be positioned over a flexible substrate. In further embodiments, the array of electrodes can be situated over a rigid surface.

The necessity for an air gap between the conductive layer and the sensor electrodes can present significant challenges for touch sensor performance and manufacturability. Some touch sensor devices require a strict air gap with no contact between the conductive layer and the sensor. In this case, the membrane must be stiff enough such that sagging of the membrane due to gravity does not bring the conductive layer into contact with the sensor. This can reduce sensitivity, since the stiffness of the membrane must be overcome in order for sensor activation (e.g. the membrane must be mechanically deformed (depressed or deflected) before it comes into contact with the sensor). Even when a strict air gap is not necessary and the conductive layer can be allowed to rest (unadhered) to the sensor electrodes, some force can be necessary to deform the flexible membrane before the conductive layer makes enough contact with the sensor electrodes to be detected.

The air gap also creates a travel distance of tens or hundreds of microns associated with bringing the conductive layer into contact with the sensor electrodes. This can reduce the apparent sensitivity of the device and can lead to a disconnect between the moment when an object (e.g., a finger, stylus, etc.) contacts the flexible membrane and when the sensor is activated by the conductive layer coming into contact with the sensor electrodes.

By leveraging the selective adhesion concept, the membrane and the conductive layer can be brought into a much closer proximity to the sensor electrodes because the adhesion areas can constrain and can control the membrane-sensor separation. Furthermore, the minimum stiffness of the flexible sensor can be significantly reduced. These changes allow for much greater sensor sensitivity, especially when minimal forces are exerted on the membrane.

In traditional resistive force sensor designs, the active area is generally adhesive free and usually unconstrained, so the membrane typically must be fixed to the sensor in a small margin around the peripheral or circumferential edges of the active area. The width of this peripheral or circumferential margin area is generally created or formed to be large enough to provide sufficient constraint of the flexible membrane. Because the perimeter of the device, however, must generally be devoted to constraint rather than serving the purposes of sensing, there can be formed a bezel-like margin of the device that is not force-sensitive. Such a bezel is often undesired in relation to a resistive force sensor design and user experience perspective.

Furthermore, the flexible membrane and air gap are nearly always offset from the neutral axis of the sensor stack. This means, (for flexible sensor designs) that when the sensor is bent (deformed, deflected, or placed under strain) such that the flexible membrane becomes convex, the air gap can collapse, leading to contact between the conductive layer and the electrodes and false touch detection events. When the sensor is bent (deformed, deflected, or placed under stress) such that the flexible membrane becomes concave, the air gap can either grow (leading to reduced sensitivity and degraded user experience) or the air gap can collapse (leading to false touch detection events).

The selective adhesion concept resolves both of the foregoing challenges. By constraining the flexible membrane within the active area rather than around a peripheral margin of the device, the bezel margin can be completely eliminated. Furthermore, by constraining the flexible membrane with the active area the membrane can be stabilized when the device is flexed or folded, ensuring a consistent separation between the conductive layer and the sensor electrodes and allowing the sensor to be placed under stresses and strains to a greater extent than current devices.

Utilizing selective adhesion also allows for increased modularity of sensor design and function. Because the adhesive regions can be used to partially or fully isolate certain regions of the sensor, measurements from each distinct defined region can specifically be calibrated, adjusted, or correlated with reduced influence from neighboring defined or definable regions of the sensor. For instance, sensitivities can be different for different regions, as a function of, for instance, the size of particular region or location of a specific region. Also, as the materials and/or air gap spacing associated with various regions can change or deteriorate over time during the life of the device, measurements from various defined or definable regions can be modified, changed, or tuned, (e.g. at a repair facility or adaptively in the field by performing periodic testing using device firmware).

Real flexible membranes are typically never perfectly flat, nor do they perfectly conform to an underlying surface. Therefore, when a flexible membrane in a touch sensor is depressed, the conductive layer can at first contact the sensor at a position a significant distance away from the actual point of contact, reducing accuracy.

In resistive touch sensors without strict air gaps, the flexible membrane typically rests on the sensor electrodes under the influence of its own weight. This can cause several light but detectable contact points which can register as touch detection events. Such events, for the most part, are undesirable, as they correspond to internal contacts rather than application(s) of externally applied forces. Furthermore, when the membrane is subjected to loads (compressive, shear, etc.), these contact points can change location. Due to these challenges, aggressive baselining algorithms can be utilized to artificially modify (e.g., subtract) or filter out the influence of these internal contacts. These baselining algorithms can add to the development cost and complexity of touch sensor devices. Aggressive baselining can also reduce overall sensitivity of the sensor as well.

Applying the disclosed enhanced selective adhesion concepts eliminates the foregoing issues. The adhesion areas can constrain the flexible membrane such a manner that the conductive layer no longer contacts areas that are distinct from the true contact point. In addition, the constraints restrict unwanted lateral movement of the flexible membrane due to shear loads.

Many of the challenges of manufacturing resistive force sensors with air gaps stem from the need to affix flexible membranes to surfaces containing sensor electrodes by constraining only a small margin around a perimeter of the active area(s). This can necessitate the use of high-strength adhesives with creep resistant properties. Furthermore, care must be taken to implement and maintain a correct and controlled amount of tension in the flexible membrane when it is affixed to the sensor. As sensor size increases, the stresses over the surface area of the flexible membrane can translate to higher forces on the ring adhesive, exacerbating the above challenges and making it more difficult to perform a uniform and taut lamination. Using the described enhanced selective adhesion concept can simplify the lamination and constraint of the flexible membrane to the sensor by eliminating the ring adhesive and instead adhering the membrane at a multitude of points spread across the active area of the sensor.

Under the influence of a force that pulls the flexible membrane away from the sensor (e.g., gravity), viscoelastic creep of the membrane and/or the ring adhesive can cause the membrane to sag and pull away from the sensor electrodes. This can create a "bubble" or "pillowing" effect in which the air gap distance (e.g., distance between the electrodes and the conductive layer) can increase, leading to reduced sensitivity and a significant increase in the incidence of false positives (e.g., false detection of touch events).

Furthermore, because a significant volume of air can be trapped between the sensor and the conductive layer, an air vent generally must be integrated into the sensor design to allow for equilibration of air pressure between the inside and outside of the device. Moisture, water, dust, and particulates can enter through the air vent and collect inside the air gap cavity, leading to degradation in device performance.

Selectively adhering the flexible membrane at defined or definable points within the sensor active area resolves these reliability challenges. The formation of "bubbles" of "pillowing" effects can be eliminated, since the force of gravity acting on the membrane can be transferred to multiple adhesion points within the active area instead of to a single adhesive ring, thereby significantly reducing the viscoelastic deformation of the flexible membrane and the adhesive regions.

Utilizing selective adhesive patterns can also confer to a sensor enhanced protection against water, moisture, dust, and particulate ingress. The adhesive patterns can be designed to present more barriers to ingress of contaminants, and the adhesive's constraint can lead to a smaller volume in which any contaminants can accumulate.

The disclosed and described techniques and/or methods for producing selectively adhered force sensors reliably controls, implements and maintains the extent, uniformity, spacing, size and integrity of an air gap, both in and out of the sensor plane. The described techniques resolve the above elucidated challenges associated with air gaps in resistive touch sensors by constraining the flexible membrane and conductive layer within the active area of the sensor, thereby replacing a standard air gap with a plurality of air gaps that can be dramatically smaller in their lateral and out-of-plane dimensions.

With reference to FIG. 1 depicts a system 100 that in accordance with various embodiments provides a system, machine, apparatus, or device for fabricating touch sensor devices having sectioned flexible human interactive elements facing sensor elements, wherein each sectional element is selectively attached to a plurality of adhesion areas of a sensor pad. System 100, for purposes of illustration, can be any type of mechanism, machine, device, facility, apparatus, and/or instrument that includes a processor and/or is capable of effective and/or operative communication with wired and/or wireless network topologies. Mechanisms, machines, apparatuses, devices, facilities, and/or instruments that can comprise system 100 can include tablet computing devices, handheld devices, server class computing devices, machines, and/or databases, laptop computers, notebook computers, desktop computers, cell phones, smart phones, consumer appliances and/or instrumentation, industrial devices and/or components, hand-held devices, personal digital assistants, and/or consumer and/or industrial appliances and/or instrumentation.

As illustrated, system 100 can comprise fabrication engine 102 that can be in operative communication with processor 104, memory 106, and storage 108. Fabrication engine 102 can be in communication with processor 104 for facilitating operation of computer-executable instructions or machine-executable instructions and/or components by fabrication engine 102, memory 106 for storing data and/or computer-executable instructions or machine-executable instructions and/or components, and storage 108 for providing longer term storage of data and/or machine-readable instructions and/or computer-readable instructions. Additionally, system 100 can receive input 110 for use, manipulation, and/or transformation by fabrication engine 102 to produce one or more useful, concrete, and tangible result, and/or transform one or more article to different states or things. Further, system 100 can also generate and output the useful, concrete, and tangible result and/or the transformed one or more article as output 112.

There are several possible and contemplated techniques by which the selectively adhered sensor can be manufactures. Fabrication engine 102, in the context of a cure-and-release fabrication technique and in response to detecting an array of sensor electrodes or sensor elements (or a matrix of sensor electrodes or matrix of sensor elements) surrounded by co-planar (or nearly co-planar) adhesion posts (or anchors) can initiate instructions to: (1) facilitate application of a conductive layer to the sensor electrode(s) and/or the adhesion post(s) (or anchor(s)) by causing a device to apply an uncured or partially-cured conductive layer (e.g., a conductive polymer composite or a conductive polymer) to the sensor electrode(s) and/or the adhesion post surface(s); and (2) allowing the conductive layer to cure and bond to the underlying adhesion posts (or anchors). The array of sensor electrodes can comprise row(s) of drive sensor electrodes and/or column(s) of sense sensor electrodes formed into matrix.

Curing of the conductive layer can cause a volume change, typically a decrease in volume for most polymers and polymer composites, which in turn can induce both stress in the conductive layer (e.g., a tensile stress in the case of shrinkage during cure) and stresses at the interface between the conductive layer and the electrodes and anchors or adhesive posts. With a proper choice of materials and processing conditions, this developed stress can typically be sufficient to delaminate the conductive layer from the sensor electrodes while the conductive layer remains bonded to the anchors or adhesion posts. Nevertheless, in certain embodiments it can be necessary for fabrication engine 102 to facilitate a device to implement a process such as mechanical agitation or thermal shock to assist with the release of the conductive layer from the sensor electrodes.

In the context of the curing phase facilitated by fabrication engine 102, after the uncured or partially-cured conduction layer is applied to the electrode/adhesive post (or anchor) surface, the conductive layer can be implemented through a variety of processes, including thermal curing, laser heating, UV curing, radical-initiated curing, and solvent evaporation. The curing facilitated by fabrication engine 102 ensures that the conductive layer adheres to the adhesion posts/anchors through a chemical reaction and/or interdiffusion.

Curing of the conductive layer, facilitated by fabrication engine 102, can (for most materials) cause a volume contraction of the material. Since the conductive layer is generally designed to strongly adhere to the adhesion posts/anchors and very weakly adhere to surfaces of the sensor electrodes, the conductive layer typically spontaneously releases (delaminates) from the surfaces of the sensor electrodes. If the curing-induced tensile forces are insufficient to delaminate the conductive layer from the electrode surfaces, additional stimuli can be needed to release the cured conductive material from the electrode surfaces. Such stimuli can involve fabrication engine 102 facilitating a device to pass a roller over the surface of the flexible membrane. Pressure can be applied and the roller can be heated, textured, or sticky (e.g., to apply a degree of tensile and shear stress). Other stimuli can include fabrication engine 102 facilitating a device to perform a thermal shock treatment (e.g., a heat gun, cold gas spray, etc.) or rubbing the flexible membrane surface.

In regard to applying a conductive layer to sensors fabrication engine 102 can facilitate deposition of a conductive layer onto a flexible membrane. The flexible membrane can be made of any flexible material, including poly(ethylene terephthalate), polycarbonate, polyimide, silicone, thin glass, etc. Once the conductive layer has been deposited on the flexible membrane, fabrication engine 102 can initiate machine-executable operations to facilitate an apparatus to immobilize the conductive layer, such that the conductive layer does not drip or flow off of the flexible membrane. Immobilization of the conductive layer can be achieved, for example, through solvent evaporation or a partial cure. After immobilization fabrication engine 102 can initiate machine-executable instructions to facilitate a device to laminate the flexible membrane to a sensor surface so that the conductive layer comes into contact with and wets surfaces of the adhesion posts/anchors. If necessary, fabrication engine 102 can cause execution of machine-executable instructions to facilitate application of a thermal treatment and/or pressure to ensure sufficient wetting (e.g., the ability of a liquid to maintain contact with a solid surface, resulting from intermolecular interactions when the two are brought together. The degree of wetting (wettability) is determined by a force balance between adhesive and cohesive forces. Wetting deals with the three phases of materials: gas, liquid, and solid).

In an additional or alternative embodiment, fabrication engine 102, in the context of applying a conductive layer to sensors can cause the execution of machine-executable instructions to facilitate an apparatus to directly deposit a conductive layer onto sensor electrodes and adhesive posts/anchors through a variety of methods, such as printing, extrusion, and the like. The conductive material can be deposited, for example, in a flood coat to cover the entire surface or it can be deposited in a patterned or segmented fashion over the sensor electrodes and/or adhesion posts/anchors. Fabrication engine 102 can thereafter initiate the execution of machine-executable instructions to facilitate devices to laminate or adhere a flexible membrane to the conductive layer. Laminating or adhering the flexible membrane to the conductive layer can involve, for example, direct bonding of the flexible membrane to the conductive layer material or lamination of the flexible membrane and conductive layer with an adhesive, such as pressure sensitive adhesive, phase change adhesive, and the like. In accordance with some embodiments, and without limitation or loss of generality, a flexible membrane can be unnecessary; based on material choice, the conductive layer itself could also serve as a flexible membrane.

In a further embodiment fabrication engine 102 can initiate execution of machine-executable instructions to facilitate a patterned adhesive fabrication, wherein fabrication engine 102 can initiate execution of machine-executable instructions to deposit adhesive regions within an active area of a force sensor and thereafter to execute additional machine-executable instructions to selectively adhere a conductive layer (and flexible membrane) to a sensor surface comprising an array of sensor electrodes. It should be noted that in a patterned adhesive fabrication, the requirements for the sensor electrode materials are typically less stringent than in the cure-and-release fabrication technique described above. For example, it can be advantageous to coat the sensor electrodes with a material that is conductive and that protects against corrosion, but adhesion resistance is not as critical as in the cure-and-release method. Some example materials that can meet these criteria are, for example, gold, silver, copper, nickel, aluminum, and their associated alloys. It can also be important to consider the adhesive materials. In described patterned adhesive fabrication technique, the adhesive itself forms the adhesive "posts" or "anchors" that bridge and adhere the conductive layer (and/or flexible membrane) and the printed circuit board or other electrode substrate surface. A variety of different adhesives can fulfill this purpose, including thermosetting adhesives, pressure-sensitive adhesives, and phase-change adhesives, and the like.

Fabrication engine 102, as noted above, can cause the execution of machine executable instructions to cause the deposition of a defined or definable adhesive pattern (e.g., using modalities associated with artificial intelligence devices, neural networks, and the like) in selected adhesion areas by one or more of: screen printing, gravure, flexography, inkjet, or other deposition techniques. Adhesive can be printed, for instance, on the conductive layer, on the sensor electrodes, on the printed circuit board or other electrode substrate between the sensor electrodes, or even filling the sensor electrode vias. A number of adhesive patterns are possible. As in the cure-and-release technology detailed above, these patterns can be selected for each embodiment so as to minimize an air gap in three dimensions and to minimally interfere with (or even enhance) the force sensing functionality of the device.

After adhesive deposition fabrication engine 102 can initiate performance of machine-executable instructions to facilitate lamination of the membrane the sensor surface using a variety of lamination techniques. An appropriate amount of pressure can then be applied to the membrane during or after lamination to ensure sufficient wetting of the adhesive.

Depending on the type of adhesive used, the adhesive can require curing at elevated temperatures to ensure strong adhesion. For most adhesive types, this curing can cause a volumetric shrinkage in the adhesive. This volumetric shrinkage can be leveraged to create a pre-loaded sensor, in which the conductive layer is drawn closer to the sensor electrodes through the contraction of the patterned adhesive. Such pre-loaded sensors typically can exhibit enhanced sensitivity because the air gap is essentially eliminated.

Figure 2:
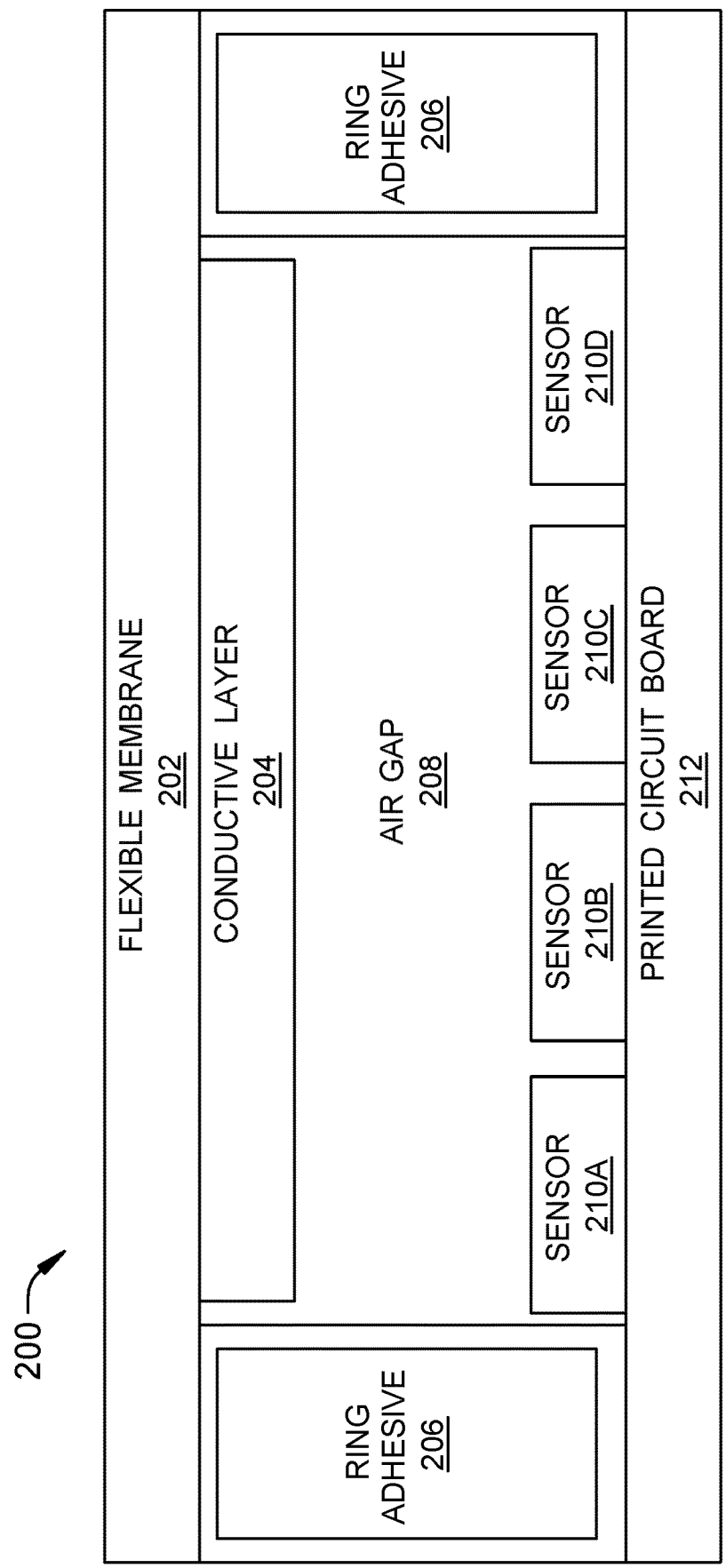
FIG. 2-11 that provide various cross-sectional depictions of fabricated selectively-adhered resistive force sensor devices fabricated, in accordance with aspects of the subject disclosure.

With reference to FIGS. 2-11 that provide depictions, in cross-section, of selectively-adhered resistive force sensor devices fabricated in accordance with one or more disclosed embodiments set forth herein, FIG. 2 provides illustration of a fabricated resistive force sensor device 200, with the flexible membrane 202 constrained and held apart from a grouping of sensor electrodes 210A, 210B, 210C, and 210D by a ring adhesive 206 around the margin of the sensor active area. As illustrated, the fabricated resistive force sensor device 200 can comprise a flexible membrane 202, a conductive layer 204, an enclosed air gap 208, the grouping of sensor electrodes 210A, 210B, 210C, and 210D formed on a printed circuit board or other electrode substrate 212, wherein the flexible membrane 202 is held apart from the printed circuit board or other electrode substrate 212 and over from the grouping of sensor electrodes 210A, 210B, 210C, and 210D formed on the printed circuit board or other electrode substrate 212 by the ring adhesive 206. It should be noted in regard to the grouping of sensor electrodes 210A, 210B, 210C, and 210D formed on the printed circuit board or other electrode substrate, that while the grouping is illustrated as comprising four sensor electrodes (e.g., sensor electrodes 210A, 210B, 210C, and 210D), fewer or greater numbers of sensor electrodes formed on the printed circuit board or other electrode substrate 212 is contemplated by the applicants and thus fall within the purview of the subject disclosure. It should further be noted in regard to the subject disclosure that the pattern formed by the grouping of sensor electrodes 210A, 210B, 210C, and 210D can be a N-dimensional array, wherein N is an integer.

Figure 3:
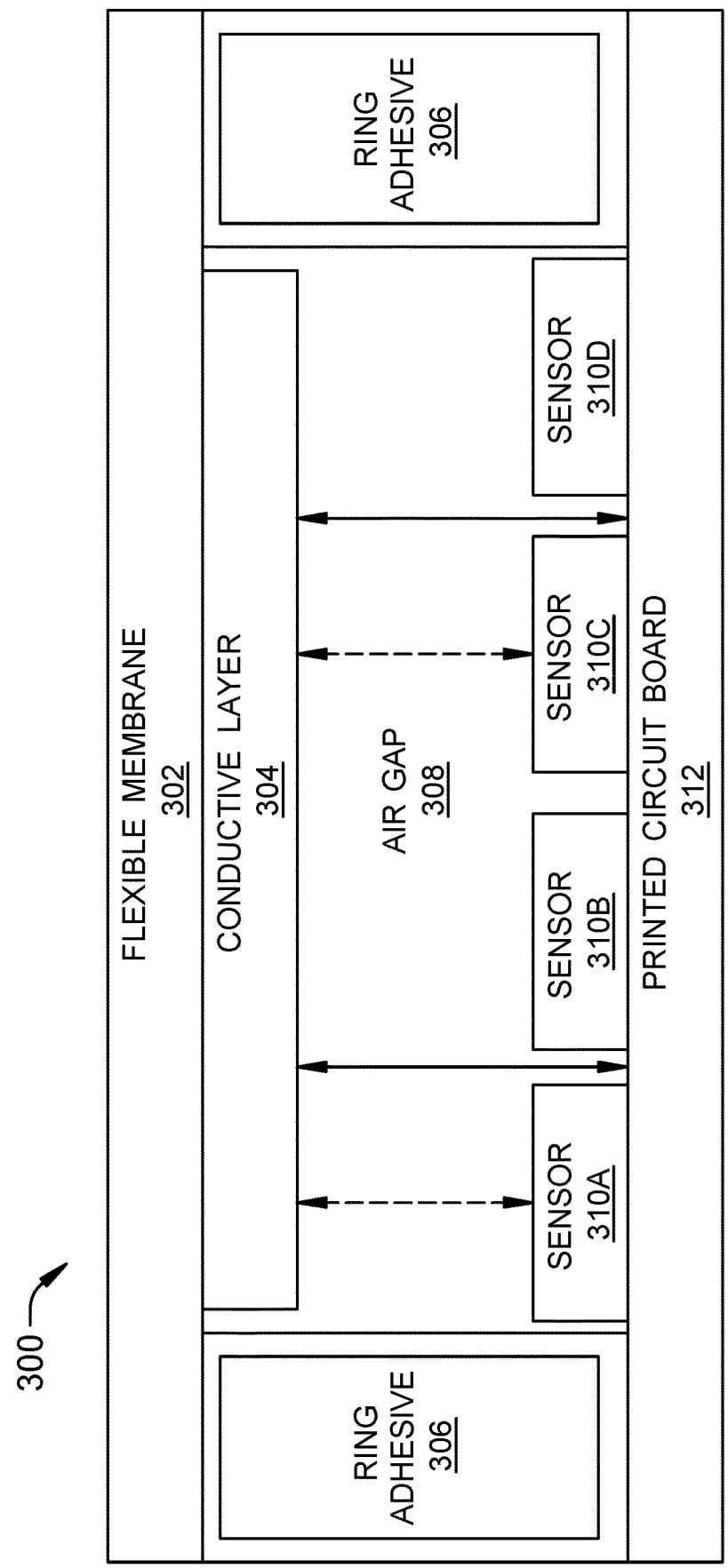

FIG. 3 provides illustration of a fabricated selectively-adhered resistive force sensor device 300 in which the conductive layer 304 can be bonded to either the sensor electrodes (depicted as dashed lines/arrows connecting sensor electrode 310A and sensor electrode 310C to conductive layer 304) or the underlying printed circuit board or other electrode substrate surface 312 (e.g., illustrated as solid line/arrow connecting printed circuit board or other electrode substrate 312 to conductive layer 304). As illustrated, fabricated selectively-adhered resistive force sensor device 300 can comprise flexible membrane 302, conductive layer 304, an air gap 308 that can separate sensor electrodes 310A, 310B, 310C, and 310D presented on a printed circuit board or other electrode substrate 312 from the flexible membrane 302 laminated with the conductive layer 304. Also illustrated is a ring adhesive 306 formed around a margin of the sensor active area. In regard to ring adhesive 306 (and ring adhesive 406 and ring adhesive 506 illustrated in FIGS. 4-5), in one or more embodiments, formation of a ring adhesive can be optional.

Figure 4:
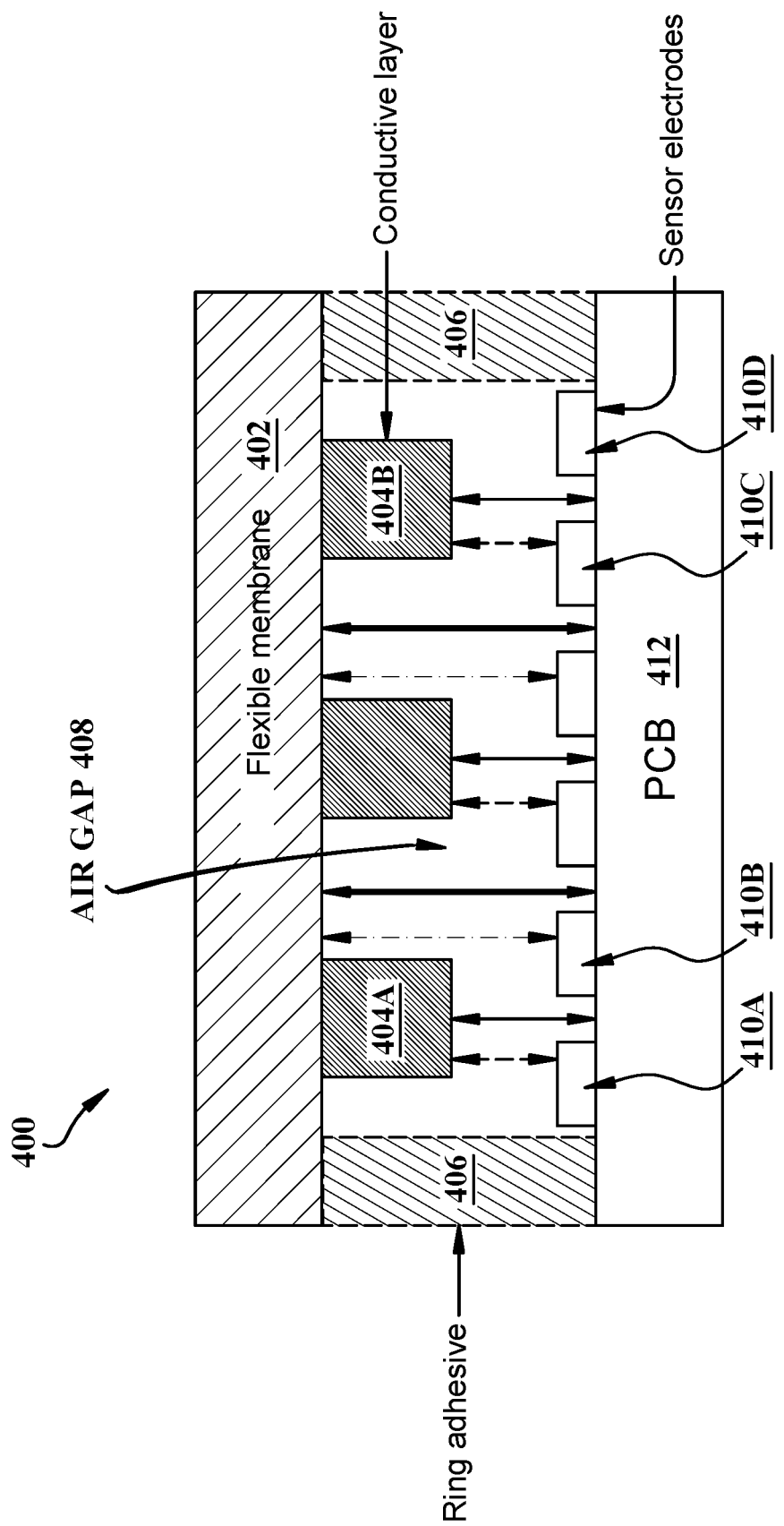

FIG. 4 provides illustration of a further fabricated selectively-adhered resistive force sensor device 400, in accordance with an embodiment, in which the conductive layer 404A and 404B has been segmented and/or patterned in manner such that the flexible membrane 402 can have been bonded to individual (or groups of) sensor electrodes 410A, 410B, 410C, and 410D and/or the underlying printed circuit board or other electrode substrate 412. In this depiction, it will be observed that the conductive layer 404A can be bonded to sensor 410A or to the printed circuit board or other electrode substrate 412 and that conductive layer 404B can be adhered to sensor 410C or to printed circuit board or other electrode substrate 412. Additionally, it will be observed that flexible membrane 402 can be bonded to the printed circuit board or other electrode substrate 412 (illustrated as a dashed line/arrow connecting flexible membrane 402 to printed circuit board or other electrode substrate 412.) These bonding locations and techniques may not all be used in the same time and may be used in various combinations.

Figure 5:
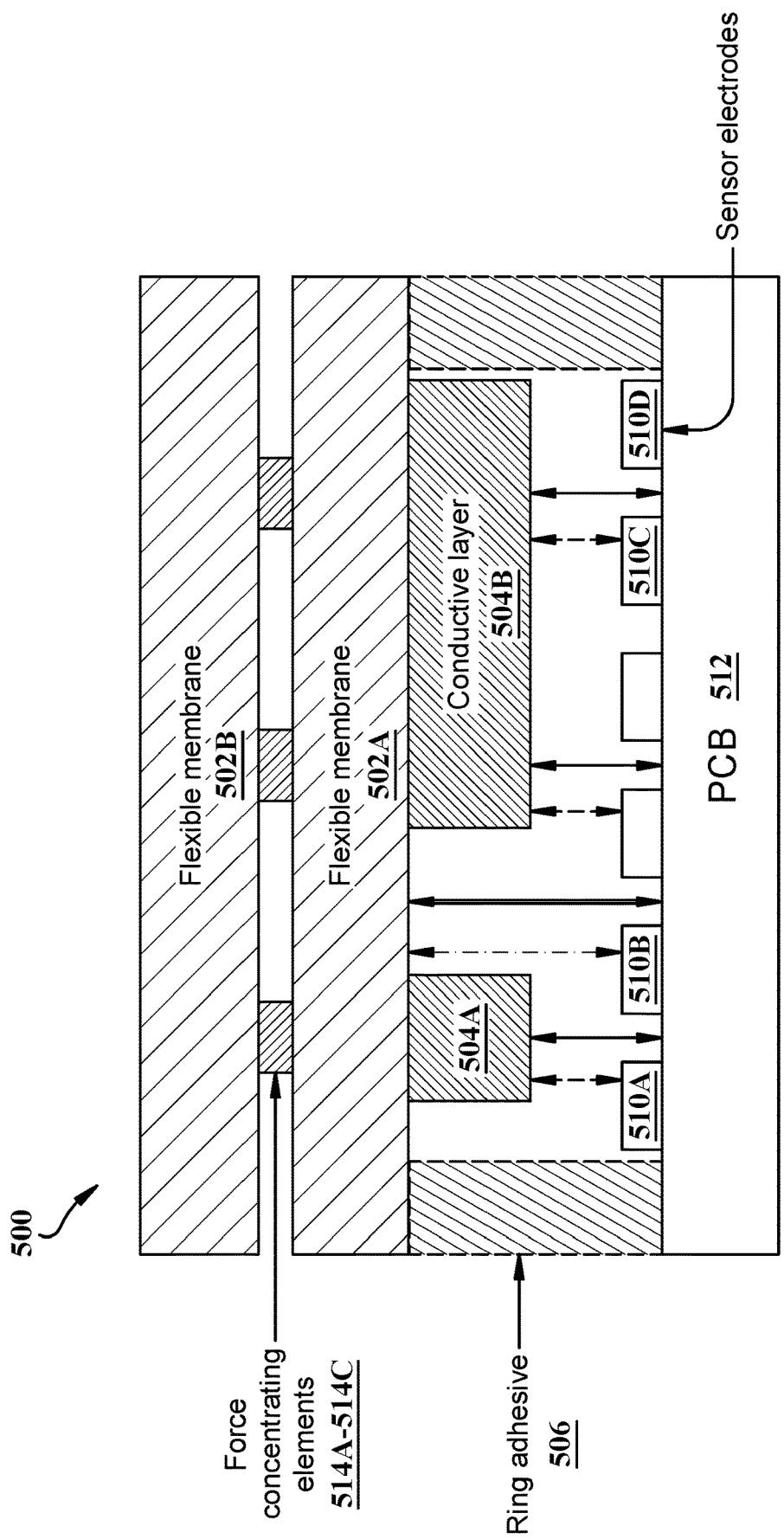

FIG. 5 depicts another fabricated selectively-adhered resistive force sensor device 500 formed in accordance with the disclosure, wherein the fabricated selectively-adhered resistive force sensor device 500 has been formed with either flood-coated or segmented conductive layers 504A and 504B, wherein force concentrating elements 514A-514C have been added above the conductive layer 504A and 504B to allow forces from the external environment to be concentrated onto specific regions of the conductive layer-sensor electrode interface. In accordance with the aspect, two flexible membrane components 502A and 502B are depicted, wherein force concentrating elements 514A-514C are selectively sandwiched or laminated between the first flexible membrane 502A and the second flexible membrane 502B.

In regard to FIGS. 4 and 5 and the foregoing depicted and described associations, patterning, adhesions, and/or bonding of the flexible membrane (e.g., 402/502A) to individual (or groups of) sensor electrodes (e.g., 410A-410D/510A-510D) and/or the underlying printed circuit board or other electrode substrate (e.g., 412/512), it should be noted, without loss of generality, that the associations, patterning, bonding, and/or adhesions are illustrative possible combinations of bonding, patterning, associations, and/or adhesions that can be implemented. Additional and/or alternative combinations and permutations of associations, patterning, bonding, and adhesions are possible and will fall within the scope of this disclosure.

Also in the context of FIGS. 4 and 5, it should be noted that when attachment(s) between the flexible membrane (e.g., 402/502A) and/or one or more of the individual (or groups of) sensor electrodes (e.g., 410A-410D/510A-510D) and/or the underlying printed circuit board or other electrode substrate is formed, the air gap (e.g., 408/508) can be bounded or constrained by the attachment point(s) thereby forming and/or patterning distinct and separated air gaps within the disclosed selectively-adhered resistive force sensor device.

Figure 6:
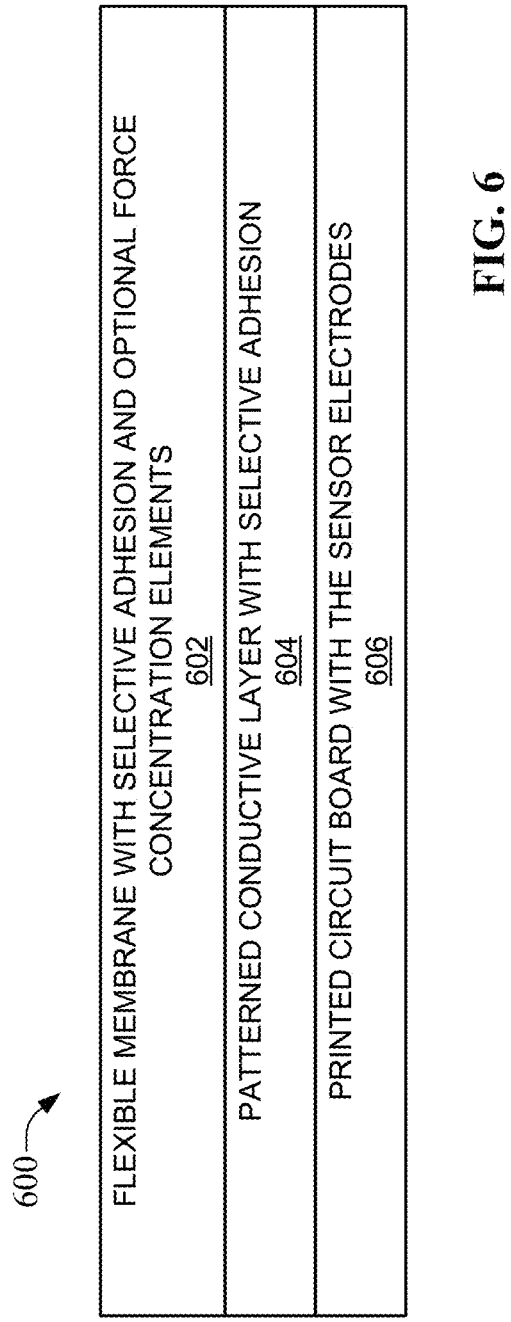

FIG. 6 provides a generalized depiction of a selectively-adhered resistive force sensor formed utilizing the concepts disclosed herein. As illustrated, the selectively-adhered resistive force sensor 600 can comprise a flexible membrane 602 with selective adhesive and optional force concentrating elements, a conductive layer 604 with selective adhesion, and printed circuit board or other electrode substrate 606 with the sensor electrodes. The sensor electrodes distributed and formed on the printed circuit board or other electrode substrate can contain drive sensor electrodes and/or sense sensor electrodes formed into an array or matrix formation. Further, in some embodiments, the conductive layer 604 can be patterned and selectively adhered to the printed circuit board or other electrode substrate 606. Additionally, the flexible membrane 602 can selectively be adhered to the printed circuit board or other electrode substrate 606 and also comprise force concentration features.

Figure 7:
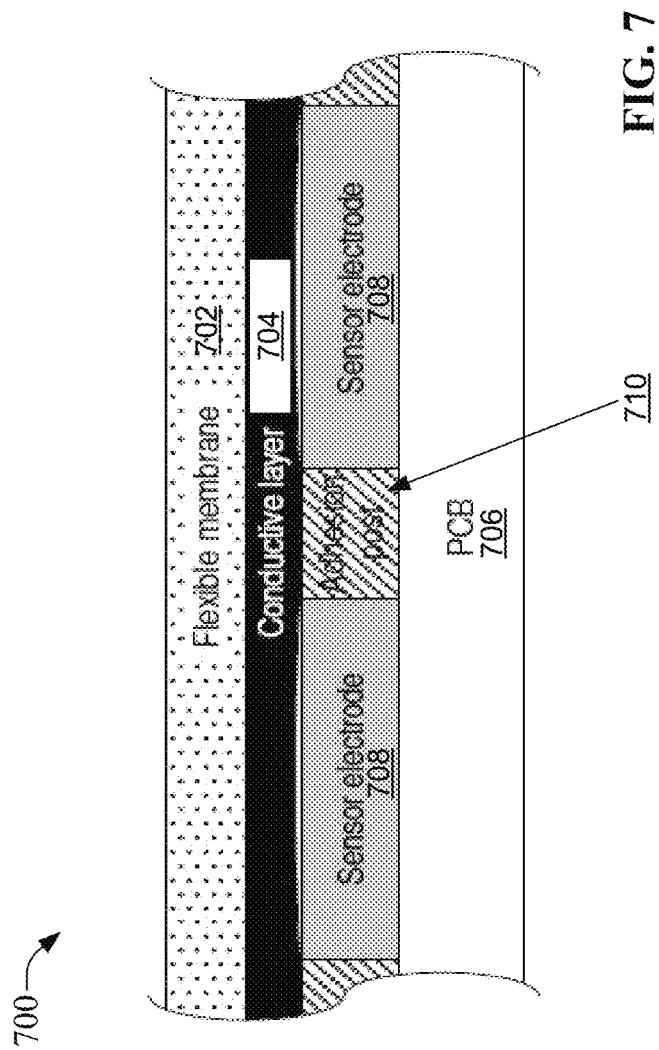
Figure 8:
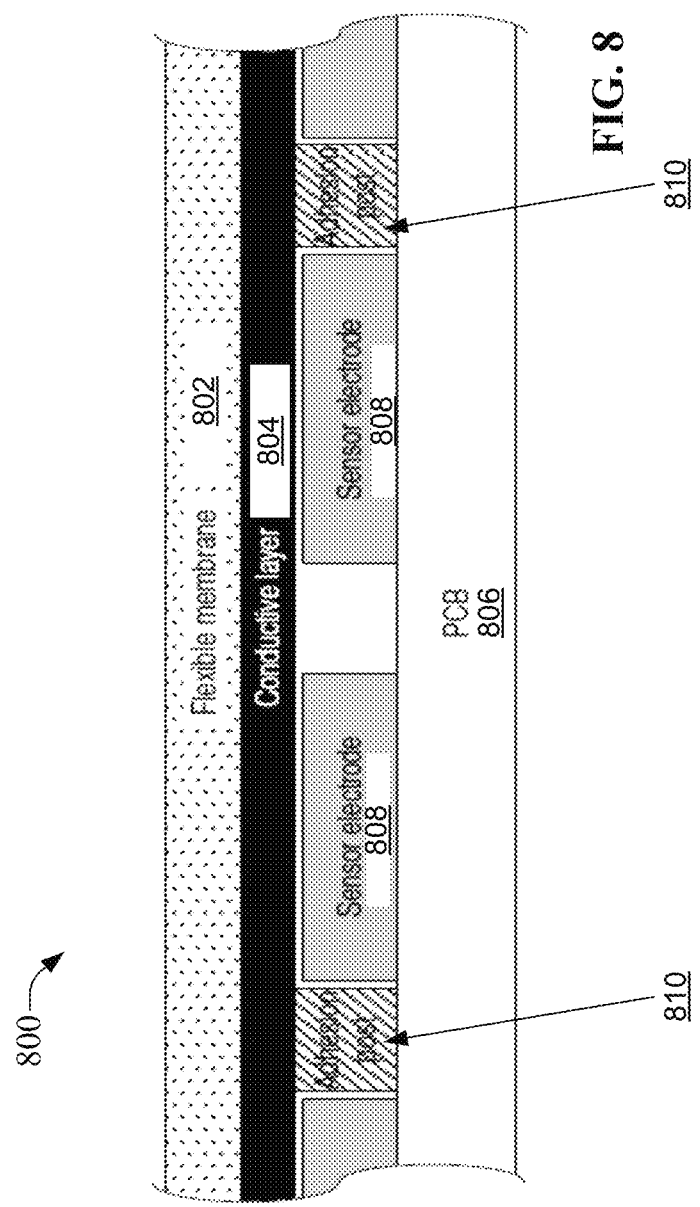
Figure 9:
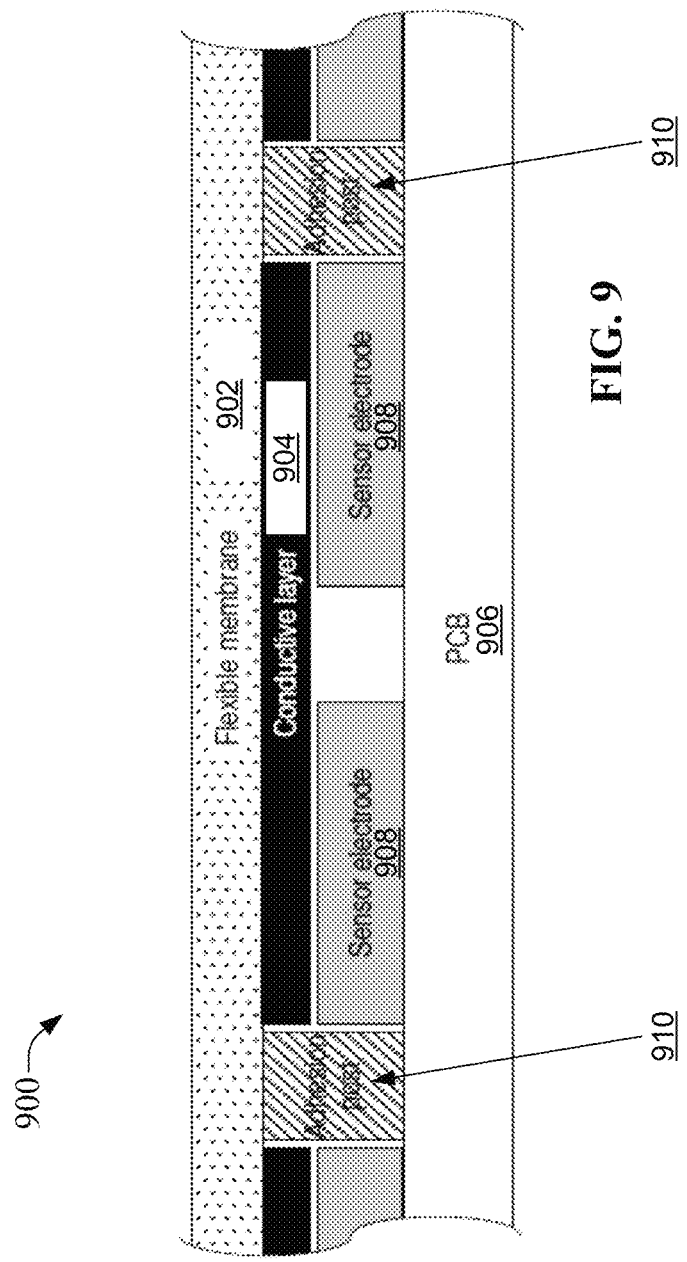
Figure 10:
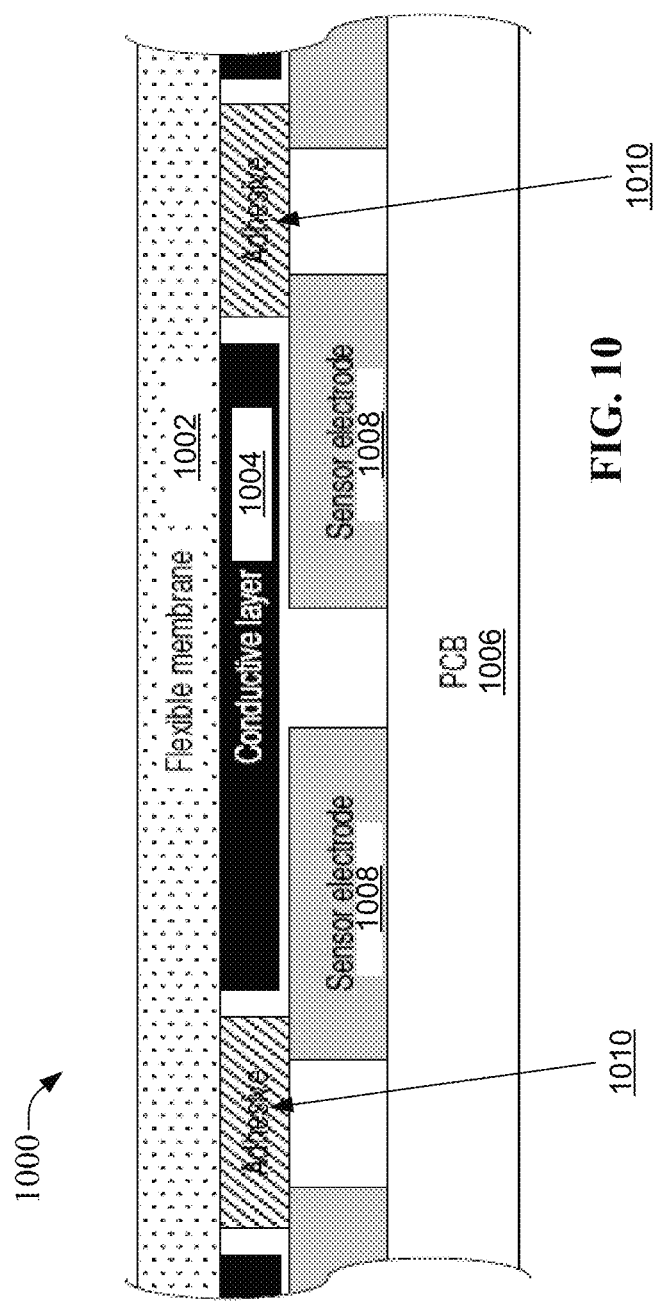
Figure 11:
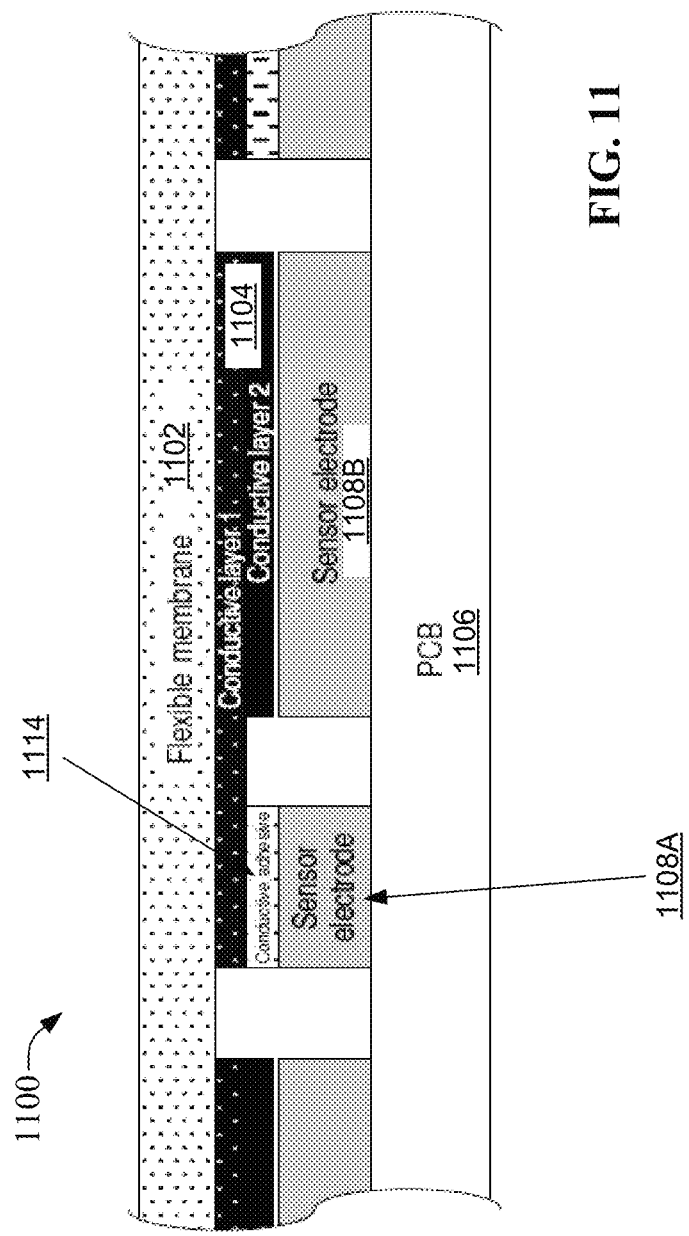

FIGS. 7-11 illustrate various generalized cross sections of sensor devices that can be fabricated utilizing the techniques elucidate herein. In FIG. 7, an alternating sequence of abutting sensor electrodes 708 and adhesive posts or anchors 710 can be patterned on a printed circuit board or other electrode substrate 706. In FIG. 8 the printed circuit board or other electrode substrate 806 can be patterned with a formation comprising a sequence of sensor electrode 808, adhesive post or anchor 810. It will be noted in context of FIG. 8 the adhesive posts or anchors 810 can contact conductive layer 804 and in so doing can provide support for the laminate comprising flexible membrane 802 and conductive layer 804. In FIG. 9 the printed circuit board or other electrode substrate 906 can be patterned with a formation comprising a sequence of adhesive post or anchor 910 and sensor electrode 908. It will be observed in regard to FIG. 9 that the adhesive posts or anchors 910 contact flexible membrane 902, thereby effectively and selectively partitioning or segmenting conductive layer 904. With regard to FIG. 10 the printed circuit board or other electrode substrate 1006 can be patterned with a formation comprising a sequence of sensor electrodes 1008. Also in regard to FIG. 10 it will be noted that in this instance the adhesive posts or anchors 1010 have been formed on the flexible membrane 1002, wherein the adhesive posts or anchors 1010 selectively segment conductive layer 1004 in a defined or definable pattern. In relation to FIG. 11 the printed circuit board or other electrode substrate 1106 can be patterned with a sequence of blocks comprising a first sensor electrode 1108A and a second sensor electrode 1108B. The first sensor electrode 1108A is patterned with a conductive adhesive post or anchor 1114 that electrically connects the first sensor electrode with the first conductive layer. The conductive adhesive post or anchor 1114 can be patterned into a cavity that can have been etched into conductive layer 1104. As an alternative to etching, the conductive adhesive can also be printed along with a second conductive layer (conductive layer 2) so they are at the same height when the sensor is laminated together.

With reference to the flowcharts in FIGS. 12-15. For purposes of simplicity of explanation, example method disclosed herein is presented and described as a series of acts; however, it is to be understood and appreciated that the disclosure is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, the disclosed example method can be implemented in combination with one or more other methods, to accomplish one or more aspects herein described. It should be further appreciated that the example method disclosed throughout the subject specification are capable of being stored on an article of manufacture (e.g., a computer-readable medium) to allow transporting and transferring such methods to computers for execution, and thus implementation, by a processor or for storage in a memory.

Figure 12:
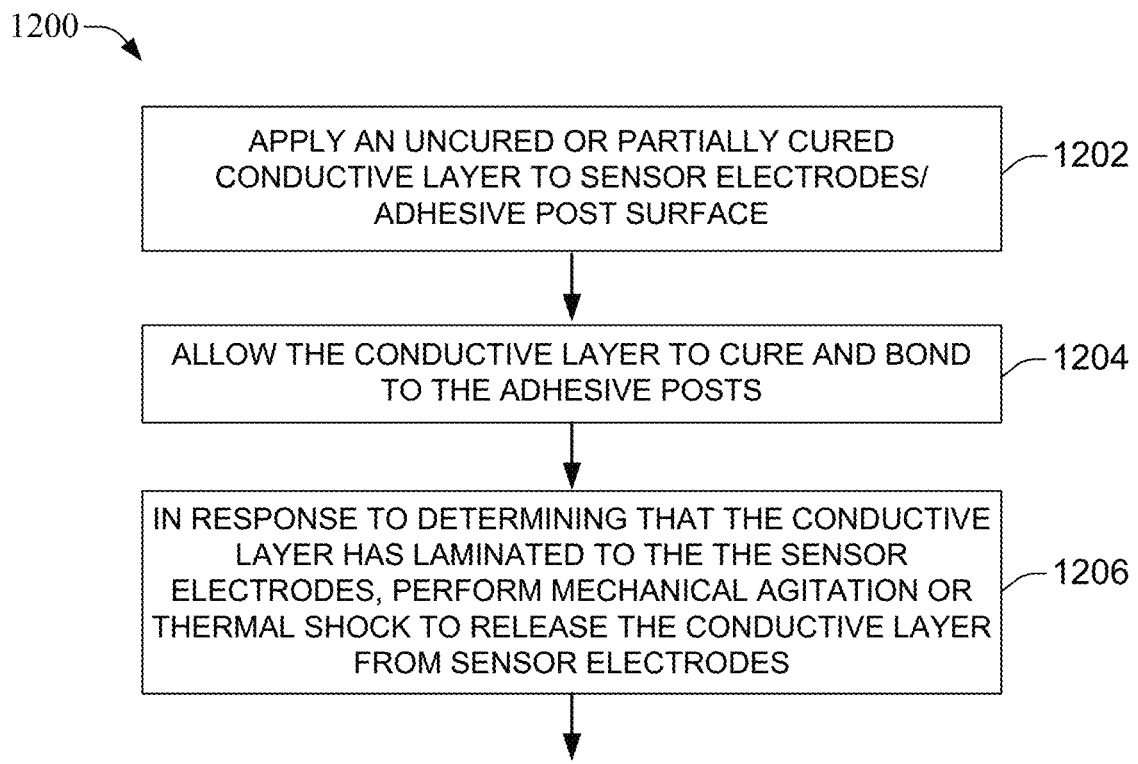
FIG. 12 provides illustration of a flow or method for fabricating touch sensor devices having sectioned flexible human interactive elements facing sensor elements, wherein each sectional element is selectively attached to a plurality of adhesion areas of a sensor pad, in accordance with aspects of the subject disclosure.

There are several possible methods by which selectively adhered sensors can be fabricated and/or manufactured. At a high level, there are two main techniques: (a) cure-and-release (CAR); and (b) patterned adhesive. With reference to FIG. 12 a cure-and-release fabrication methodology 1200 is illustrated and described. To an array of sensor electrodes (or a matrix of sensor electrodes) that are surrounded by co-planar adhesion posts (or "posts") or non-adhesive "anchors" a conductive layer can be adhered to the sensor electrode(s) and/or the adhesion post(s) or anchor(s) by applying, at 1202, an uncured or partially-cured conductive layer (e.g., a conductive polymer composite or a conductive polymer) to the sensor electrode(s) and/or the adhesion post surface(s) or anchor(s) and allowed to cure and bond, at 1204, to the underlying adhesion posts or anchors. The array of sensor electrodes can comprise row(s) of drive sensor electrodes and/or column(s) of sense sensor electrodes formed into matrix.

Curing of the conductive layer can cause a volume change, typically a decrease in volume for most polymers and polymer composites, which in turn can induce both stress in the conductive layer (e.g., a tensile stress in the case of shrinkage during cure) and stresses at the interface between the conductive layer and the electrodes and adhesive posts or anchors. With a proper choice of materials and processing conditions, this developed stress can typically be sufficient to delaminate the conductive layer from the sensor electrodes while the conductive layer remains bonded to the anchors or adhesion posts. It can be necessary to implement a process such as mechanical agitation or thermal shock, at 1206, to assist with the release of the conductive layer from the sensor electrodes. The detailed cure-and-release fabrication methodology 1200 can result in a conductive layer that is selectively adhered to adhesion posts or anchors and that is in close proximity to—but is un-bonded to/from—the sensor electrodes.

In the context of curing the conductive layer at 1204, after the uncured or partially-cured conduction layer is applied to the electrode/adhesive post or anchor surface, the conductive layer is cured. This curing can take place through a variety of processes, including thermal curing, laser heating, UV curing, radical-initiated curing, and solvent evaporation.

The curing performed at 1204 adheres the conductive layer to the adhesion posts or anchors through a chemical reaction and/or interdiffusion.

Curing of the conductive layer, at 1204, can (for most materials) cause a volume contraction of the material. Since the conductive layer is designed to strongly adhere to the adhesion posts or anchors and very weakly adhere to gold surfaces, it typically spontaneously releases (delaminates) from the surfaces of the sensor electrodes. If the curing-induced tensile forces are insufficient to delaminate the conductive layer from the electrode surfaces, additional stimuli can be needed to release the cured conductive material from the electrode surfaces. Such stimuli can involve passing a roller over the surface of the flexible membrane. Pressure can be applied and the roller can be heated, textured, or sticky (e.g., to apply a degree of tensile and shear stress). Other stimuli can include a thermal shock treatment (e.g., a heat gun, cold gas spray, etc.) or manually rubbing the flexible membrane surface by hand.

Use of the cure-and-release methodology for fabricating force sensors can lead to large increases in sensitivity. Because the conductive layer is applied to the sensor electrodes before the conductive layer is fully cured, the conductive layer conforms to the surface texture of the electrodes, which can lead to a very intimate (but not bonded) contact between the conductive polymer layer and the sensor surface, wherein the contours of the respective interfaces between the laminated flexible membrane/conductive layer and the sensor electrode can conform to and mirror one another, resulting in enhanced force sensitivity.

In some embodiments, adhesive posts or anchors slightly above or below the sensor plane can be used. The adhesive post or anchor height above or below the sensor plane can depend on fabrication process characteristics and limitations such as volume changes upon conductive layer curing, thermal expansion and/or contraction, adhesion strengths, roughness, etc. The heights of the adhesive posts or anchors above or below the sensor plane can be different for different regions depending, for example, on size of a region. For example, a region covered by a larger membrane can include taller adhesive posts or anchors than a region covered by a smaller membrane to allow for larger sagging of the flexible membrane/conductive layer.

In the context of the cure-and-release fabrication methodology, the material(s) chosen to comprise sensor electrodes can significantly influence device performance. For instance, it can be advantageous to coat sensor electrodes with a material that is conductive, protects against corrosion, and is adhesion resistant. Some example materials that may meet these criteria are noble metals such as ruthenium, rhodium, palladium, osmium, iridium, platinum, gold, silver, as well as rhenium, copper, mercury and their associated alloys. Generally, a gold coating has been found to be a preferred choice from a functionality perspective, as it is both corrosion resistant and very difficult to adhere to; silver typically has been found to have high conductivity but also has been found to typically have a higher adhesion strength to other materials than gold. It has also been observed that copper can often be difficult to adhere to, but copper has been found to corrode easily.

It is also important to consider the materials chosen to comprise the adhesion posts or anchors. For example, materials used for the adhesion posts or anchors could be various metals with good adhesion properties (e.g., aluminum, titanium, steel, etc.), glass, or various polymeric materials (e.g., silicones, acrylics, epoxies, and/or other plastics commonly used in the manufacture of printed circuit boards (PCBs). To improve adhesion of the adhesive posts or anchors to the conductive layer, an adhesion promotion treatment can be applied. Such treatments include application of primers (e.g., Dow-Corning® 92-023), oxygen plasma, ultra violet/ozone, corona, and flame treatments. The surface of the adhesive posts or anchors can also be textured, patterned, or roughened to increase surface area, induce mechanical interlocking and pullout effects, and thereby improve adhesion to the conductive layer. It should noted without limitation or loss of generality that adhesion promotion treatments can be optional in some embodiments.

Figure 13:
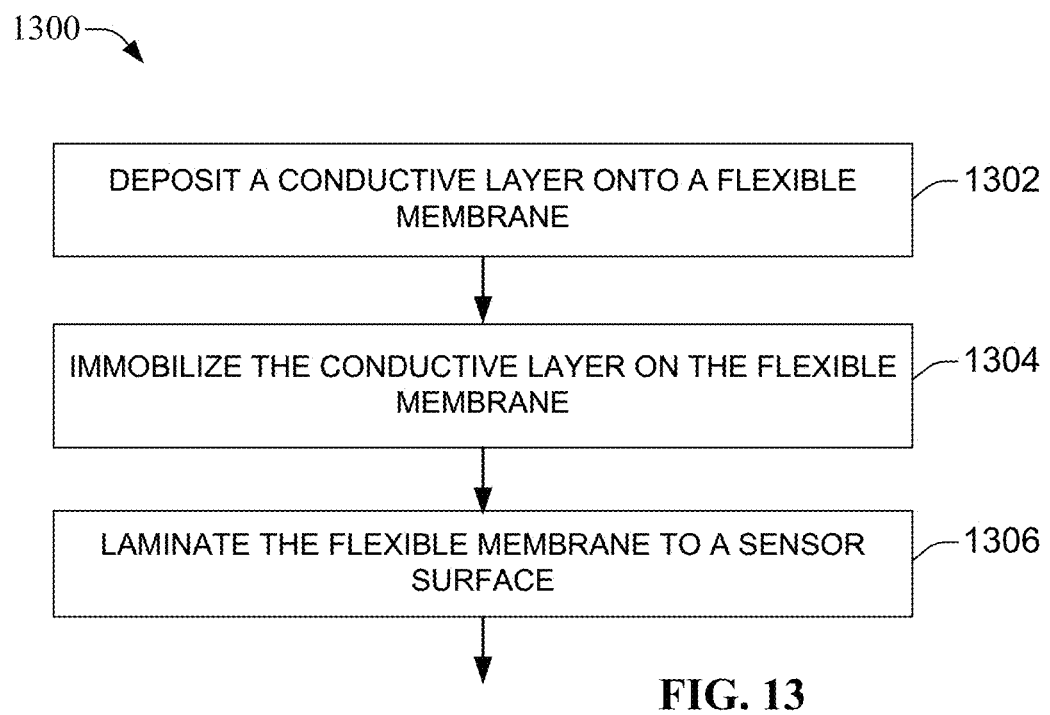
FIG. 13 provides illustration of an additional flow or method for fabricating touch sensor devices having sectioned flexible human interactive elements facing sensor elements, wherein each sectional element is selectively attached to a plurality of adhesion areas of a sensor pad, in accordance with aspects of the subject disclosure.

FIG. 13 illustrates a first method 1300 for applying a conductive layer to sensors in accordance with various embodiments. Method 1300 can commence at 1302 wherein a conductive layer can be deposited onto a flexible membrane. The flexible membrane can be made of any flexible material, including poly(ethylene terephthalate), polycarbonate, polyimide, silicone, thin glass, etc. Once the conductive layer has been deposited on the flexible membrane, at 1302, the conductive layer can be immobilized, at 1304, such that the conductive layer does not drip or flow off of the flexible membrane. Immobilization of the conductive layer, at 1304, can be achieved, for example, through solvent evaporation or a partial cure. After immobilization, at 1304, the flexible membrane can be laminated to a sensor surface, at 1306, such that the conductive layer comes into contact with and wets surfaces of the adhesion posts or anchors. If necessary, a thermal treatment and/or pressure can be applied, at 1306, to ensure sufficient wetting (e.g., the ability of a liquid to maintain contact with a solid surface, resulting from intermolecular interactions when the two are brought together. The degree of wetting (wettability) is determined by a force balance between adhesive and cohesive forces. Wetting deals with the three phases of materials: gas, liquid, and solid).

Figure 14:
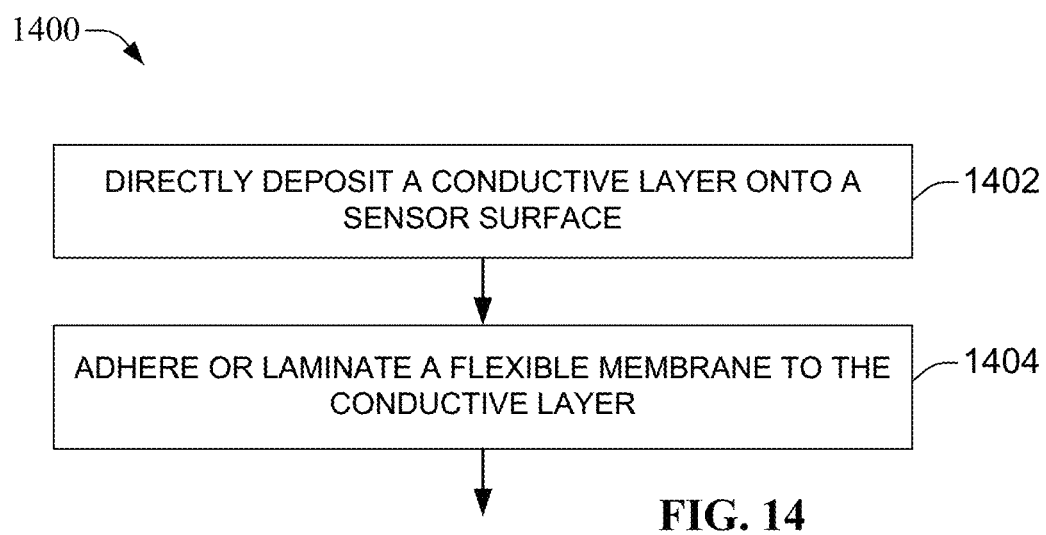
FIG. 14 provides illustration of a further flow or method for fabricating touch sensor devices having sectioned flexible human interactive elements facing sensor elements, wherein each sectional element is selectively attached to a plurality of adhesion areas of a sensor pad, in accordance with aspects of the subject disclosure.

FIG. 14 illustrates an additional or alternative method 1400 for applying a conductive layer to sensors in accordance with various disclosed embodiments. Method 1400 can commence at 1402 directly depositing a conductive layer onto sensor electrodes and adhesive posts or anchors through a variety of methods (e.g. printing, extrusion, etc.). The conductive material can be deposited, at 1402, in a flood coat to cover the entire surface or it may be deposited in a patterned or segmented fashion over the sensor electrodes and/or adhesion posts or anchors. At 1404, a flexible membrane can be laminated or adhered to the conductive layer. Act 1404 can involve, for example, direct bonding of the flexible membrane to the conductive layer material or lamination of the flexible membrane and conductive layer with an adhesive (e.g., pressure sensitive adhesive, phase change adhesive, etc.). In accordance with some embodiments, and without limitation or loss of generality, a flexible membrane can be unnecessary; based on material choice, the conductive layer itself could also serve as a flexible membrane.

Figure 15:
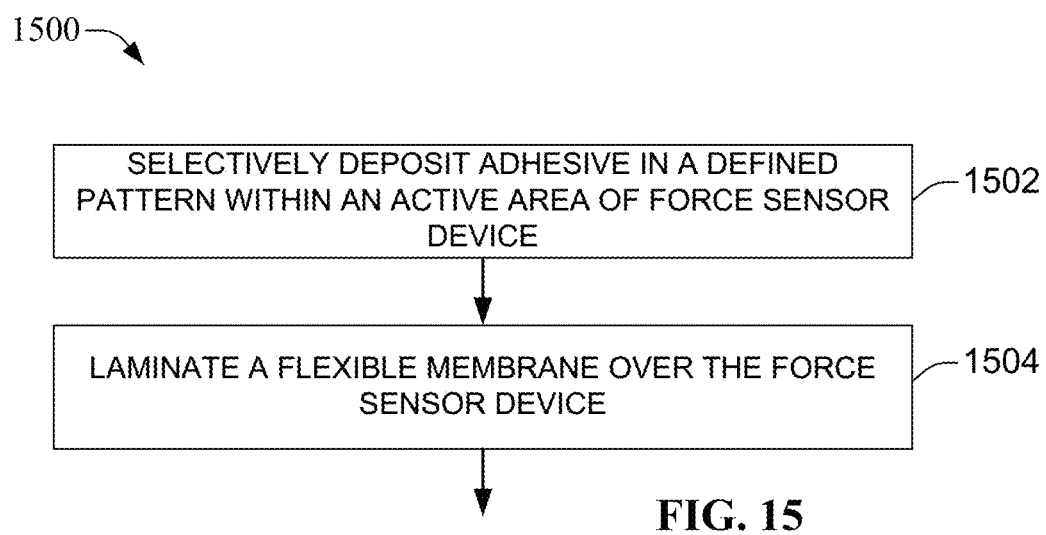
FIG. 15 provides illustration of another flow or method for fabricating touch sensor devices having sectioned flexible human interactive elements facing sensor elements, wherein each sectional element is selectively attached to a plurality of adhesion areas of a sensor pad, in accordance with aspects of the subject disclosure.

FIG. 15 illustrates a methodology 1500 for patterned adhesive fabrication, wherein adhesive regions can be deposited within an active area of a force sensor and act to selectively adhere a conductive layer (and flexible membrane) to a sensor surface comprising an array of sensor electrodes. In this fabrication method, the requirements for the sensor electrode materials are typically less stringent than in the cure-and-release methodology described above. For example, it can be advantageous to coat the sensor electrodes with a material that is conductive and that protects against corrosion, but adhesion resistance is not as critical as in the cure-and-release method. Some example materials that can meet these criteria are, for example, gold, silver, copper, aluminum, and their associated alloys. It can also be important to consider the adhesive materials. In described the patterned adhesive method 1500, the adhesive itself forms the adhesive "posts" that bridge and adhere the conductive layer (and/or flexible membrane) and the printed circuit board or other electrode substrate surface. A variety of different adhesives can fulfill this purpose, including thermosetting adhesives, pressure-sensitive adhesives, and phase-change adhesives, and the like.

Method 1500 can commence at 1502 whereupon an adhesive pattern can be deposited in selected adhesion areas by one or more of: screen printing, gravure, flexography, inkjet, or other deposition techniques. The adhesive can be printed on the conductive layer, on the sensor electrodes, on the printed circuit board or other electrode substrate between the sensor electrodes, or even filling the sensor electrode vias. A number of adhesive patterns are possible. As in the cure-and-release method detailed above, these patterns can be selected for each embodiment so as to minimize the air gap in three dimensions and to minimally interfere with the force sensing functionality of the device.

After adhesive deposition, at 1502, the membrane can be laminated to the sensor surface using a variety of lamination techniques at 1504. An appropriate amount of pressure should be applied to the membrane during or after lamination to ensure sufficient wetting of the adhesive.

Depending on the type of adhesive used, the adhesive can require curing at elevated temperatures to ensure strong adhesion. For most adhesive types, this curing can cause a volumetric shrinkage in the adhesive. This volumetric shrinkage can be leveraged to create a pre-loaded sensor, in which the conductive layer is drawn closer to the sensor electrodes through the contraction of the patterned adhesive. Such pre-loaded sensors typically can exhibit enhanced sensitivity.

While the cure-and-release technique and the patterned adhesive techniques for fabricating resistive touch sensors have been elucidated as distinct and independent methodologies, it is possible to combine these two strategies in a variety of hybrid fabrication approaches. For instance, without limitation or loss of generality, a partially-cured conductive layer can be deposited on a flexible membrane in a segmented pattern. In exposed regions of the flexible membrane, an adhesive pattern can be deposited. The flexible membrane can then be laminated to the sensor, followed by a curing act (e.g., cure the conductive layer and possibly the adhesive) and thereafter an optional delamination act. Other variations on combining the cure-and-release and patterned adhesive fabrication strategies are also possible.

In accordance with some embodiments, a laser can be used to selectively adhere the flexible membrane or conductive layer to the sensor. After the flexible membrane with a conductive layer is laminated to the sensor, a laser could be shone at specified adhesion areas and used to selectively heat and adhere the membrane or the conductive layer to the sensor surface (e.g. an electrode, and adhesion post, etc.). To aid in bonding, pressure can be applied to the flexible membrane during the laser melting and cooling process. Additionally and/or alternatively, a vacuum can be used to pull on a sensor side of a sensor-membrane stack. A cosmetic flexible membrane can also be laminated onto the original flexible membrane subsequent to completion of the laser melting process to mask burn marks that can have been created by the laser.

In additional embodiments, the array of sensor electrodes can contain microvias or other features that can form a depression, void, cavity, or hole in the electrode or printed circuit board or other electrode substrate surface. These depressions, voids, cavities, or holes can serve as anchor points for the flexible membrane through employment of a variety of different fastening techniques. For example, the flexible membrane can have a deposited adhesive pattern that aligns with the depressions, voids, cavities, or holes in the sensor electrodes. When the flexible membrane is laminated to the array of sensors, the adhesive can flow into the depressions, voids, cavities, or holes (e.g., with the assistance of elevated temperature and/or pressure), selectively fastening the flexible membrane to the array of sensor electrodes through a combination of chemical (e.g. covalent bonding) and/or mechanical (e.g. frictional pullout) effects.

In further embodiments, the flexible membrane can comprise protrusions that can align with the electrode holes. These protrusions can be inserted into the electrode holes and fasten the flexible membrane to the electrodes through an interference fit or—in the case of electrode holes that penetrate the entire printed circuit board or other electrode substrate—a rivet-like fastening mechanism. Alternatively, holes can be created in the flexible membrane, and rivet- or nail-like fasteners can be threaded through the holes in the membrane and electrodes/printed circuit board or other electrode substrate.

In additional embodiments, a conductive layer can be deposited onto a flexible membrane or onto a sensor surface in a patterned (e.g., segmented) fashion. The conductive layer pattern generally should at least partially overlap with the array of sensor electrodes, but the specific pattern used can vary depending on the desired embodiment. This patterned conductive layer can be paired with a selective adhesion concept to create a sensor containing a patterned conductive layer that is selectively adhered to the sensor surface within the active area of the sensor.

The two-dimensional adhesive pattern must typically be chosen such that it is compatible with both the conductive layer pattern and the pattern of the sensor electrodes. For instance, a patterned conductive layer (and, where applicable, flexible membrane) comprising force concentrating elements can be overlaid over an array of sensor electrodes comprising sense electrodes and drive electrodes, wherein row electrodes of the array of sensor electrodes can be connected by microvias. The conductive layer comprising the force concentrating elements can be selectively positioned over selected sense electrodes and/or drive electrodes, and further the conductive layer including the force concentrating elements can be selectively adhered to and/or bonded to a pattern of adhesive posts or anchors. Generally, a flexible membrane can exist between the conductive layer and the force concentrating elements. Additionally, the pattern of adhesive posts or anchors typically can have been bonded to a printed circuit board or other electrode substrate that can underlie the array of sensor electrodes. Further, the force concentrating elements can, if required, bridge adjacent conductive segments, allowing forces transferred to force concentrating elements to be spread over larger regions and activating more sensor electrodes. Force spreading can be beneficial in instances where very localized forces must be detected with high positional accuracy (e.g., stylus interactions).

In the context of the foregoing, adhesive can be deposited either onto a flexible membrane (e.g., between conductive layer patterns) or onto the printed circuit board or other electrode substrate. In the case of adhesive deposition onto the flexible membrane, the adhesive can contact sensor electrodes and/or the printed circuit board or other electrode substrate in channels that can exist between sensor electrodes during lamination. In the case of adhesive deposition onto the printed circuit board or other electrode substrate (e.g., on and/or between the sensor electrodes), the adhesive can contact the flexible membrane during lamination. In both cases, curing of the adhesive can be necessary after lamination based on or as a function of the adhesive used.

Resistive force sensors typically are designed so that a conductive layer makes little or no electrical contact with drive and sense electrodes when an external force is absent. This "no load, no contact" (NLNC) design paradigm persists because in general it is challenging to avoid situations in which the conductive layer makes contact with both drive and sense electrodes, creating a current path between electrodes and potentially resulting in a false touch detection events.

The described and disclosed selective adhesion concept renders the no load, no contact design paradigm generally unnecessary. Instead of avoiding contact with all electrodes, the conductive layer can instead be placed into permanent electrical contact with one type of electrode (e.g., either drive electrodes or sense electrodes). When an external force is applied to the sensor, the conductive layer can make contact with the other type of electrode and detect a force. This new design can be referred to as permanent selective contact (PSC).

The permanent selective contact configuration has several advantages over traditional no load, no contact designs. When an external force is applied, the conductive layer only needs to make contact with any electrode surface to register a touch; there is no minimum contact size. In contrast, no load, no contact devices require the conductive layer to contact at least one drive and one sense electrode before any touch can be detected. Furthermore, traditional no load, no contact designs typically contain similar drive and sense electrode surface areas within the sensor active area. This can be done to maximize the area in which drive-sense connections can be made for small contact areas (e.g. at low forces). For the permanent selective contact configuration, there is no longer a reason to keep the drive and sense electrodes approximately equal in area. For example, if the conductive layer is permanently adhered to the drive electrodes, the relative size of the sense electrodes can be increased such that they cover a majority of the sensor active area. This can increase sensitivity and improve tracking accuracy.

There are a number of methods by which the conductive layer can be permanently bonded to one set of electrodes. For example, a conductive adhesive (e.g. electrically conductive pressure sensor adhesive or electrically conductive pressure sensor epoxy) can be used to selectively adhere the conductive layer to one set of electrodes. Additionally and/or alternatively, an uncured or partially cured conductive layer can be directly bonded to one set of electrodes. This method can be performed in a manner similar to the cure-and-release method described above, except with one set of electrode materials chosen for strong adhesion.

In a resistive force sensor, force is typically detected when a conductive layer comes into contact with sensor electrodes. When an external force is applied to the flexible membrane, this force is transmitted through the flexible membrane and is spread evenly (to a first approximation) across an interface between the conductive layer and the sensor electrodes. Nevertheless, not all regions of this interface contribute equally to the sensitivity of the device. For example, in some sensor designs regions nearest to an intersection between a drive and sense electrode can be more sensitive than regions more distant from such an intersection. For selectively adhered sensors such as those described herein, external forces transmitted through the interface between the conductive layer and the sensor electrodes can contribute to sensing, but forces transmitted through the adhesive regions generally do not.

Therefore, the sensitivity of resistive force sensors can be enhanced by incorporating force concentrating features into the flexible membrane that increase the fraction of the externally applied force that is transmitted through the most sensitive regions of the interface between the conductive layer and the sensor electrodes. These force-concentrating features can take the form of raised regions (or "bumps") on one of the layers that comprise the flexible membrane. The force concentrating bumps can be constructed out of a variety of different materials, including inks, plastics (e.g., Polyethylene Terephthalate (PET) plastics, Polycarbonate (PC) plastics, silicones, etc.) or adhesives (e.g. pressure-sensitive adhesives, phase-change adhesives, thermosetting adhesives, etc.). The force-concentrating features can generally be positioned in locations above the most sensitive regions of the conductive layer-electrode interface.

It should be noted in the context of incorporating force concentrating features into the flexible membrane, that in instances where force concentrating features are laminated between two flexible membranes using a pressure sensitive adhesive, the force concentrating features generally should use materials with higher stiffness than the surrounding utilized pressure sensitive adhesive. As will be clear to those having ordinary skill, the laminated flexible membrane comprising: a first flexible membrane, one or more force concentrating features distributed in a prescribed pattern within a fabric of pressure sensitive adhesive to form an interlining, and a second flexible membrane, can be adhered and bonded to a conductive layer. In instances where the force concentrating features are not laminated within a interlining fabric of pressure sensitive adhesive between two flexible membranes, but rather the force concentrating features overlay a non-laminated flexible membrane, or where a laminate of the flexible membrane and pressure sensitive adhesive overlay the force concentrating features (e.g., without incorporation of force concentrating features into the pressure sensitive adhesive), or where the force concentrating elements are interposed or interspersed between a first flexible membrane and a second flexible membrane without the force concentrating elements being incorporated into the pressure sensitive adhesive, the force concentrating elements can be made of essentially any solid material.

Beyond increasing device sensitivity by transmitting more force through the most sensitive regions of the sensor, incorporating force concentrating features into sensor design can also lead to additional benefits. For example, the force concentrating features can enhance the lateral spreading of a point force applied to the flexible membrane, which can be desirable for some applications. Furthermore, because the force concentrating features reduce the fraction of force transmitted through the adhesive material (in some embodiments), adhesive-related hysteresis in the sensor response can be reduced.

In accordance with an embodiment, as detailed above, the subject disclosure describes a sensor device, comprising: a flexible membrane comprising a conductive layer; and a printed circuit board or other electrode substrate comprising a sensor electrode and an adhesive post or an anchor. The sensor electrode can be selectively secured to the conductive layer. In accordance with an aspect, the conductive layer can be partitioned into first areas and second areas, the adhesive post or anchor can be selectively secured to the first areas and/or selectively secured to the second areas. The flexible membrane, the printed circuit board or other electrode substrate, and the adhesive post or anchor can patterned to enclose an air gap. Additionally, force concentrating elements can have been formed on a first or second surface of the flexible membrane. The force concentrating element can have been positioned on the first surface or the second surface of the flexible membrane to be in proximity of the sensor electrode.

In accordance with an additional described embodiment, the subject application elucidates a fabrication system, fabrication device, fabrication apparatus, and/or fabrication machine that can comprise: a processor; and a memory that stores executable instructions that, when executed by the processor, facilitate performance of operations. The operations can comprise facilitating association of a conductive layer to a first surface comprising a sensor electrode by bringing the conductive layer in proximity to the first surface and/or facilitating application of the conductive layer to the first surface comprising the sensor electrode; and facilitating placement and/or curing of the conductive layer to the first surface. Additional operations can comprise, when the first surface comprises an array of sensor electrodes, determining whether or not the conductive layer has adhered to the array of sensor electrodes, and in response to the determination, facilitating mechanical agitation of the conductive layer to release the conductive layer from the array of sensor electrodes, and/or facilitating a thermal shock to the conductive layer to release the conductive layer from the array of sensor electrodes.

In the context of the foregoing, the conductive layer can be an uncured conductive polymer composite and/or a partially-cured conductive polymer. The first surface can comprise an array of sensor electrodes patterned on a printed circuit board or other electrode substrate in a defined or definable pattern or arrangement, wherein the conductive layer can be applied over the array of sensor electrodes. Further, the first surface can comprise an adhesive post or anchor, wherein the adhesive post or anchor is selectively patterned on a printed circuit board or other electrode substrate in a defined or definable pattern, wherein the conductive layer can be applied over the adhesive post or anchor.

In accordance with a still further embodiment, the subject disclosure describes a machine readable storage medium, a computer readable storage device, or non-tangible machine readable media comprising instructions that, in response to execution, cause a computing system comprising at least one processor to perform operations. The operations can include: facilitating application of a laminate comprising a flexible membrane and a conductive layer to a first surface, wherein the first surface comprises a group of sensor electrodes patterned on a printed circuit board or other electrode substrate and a selectively positioned post or anchor formed on the printed circuit board or other electrode substrate; and facilitating curing of the conductive layer to the selectively positioned post or anchor. Additional operations can include: in response to determining that the conductive layer has become adhered to a sensor electrode comprising the group of sensor electrodes, facilitating release of the conductive layer from the sensor electrode through implementation of mechanical agitation.

Figure 16:
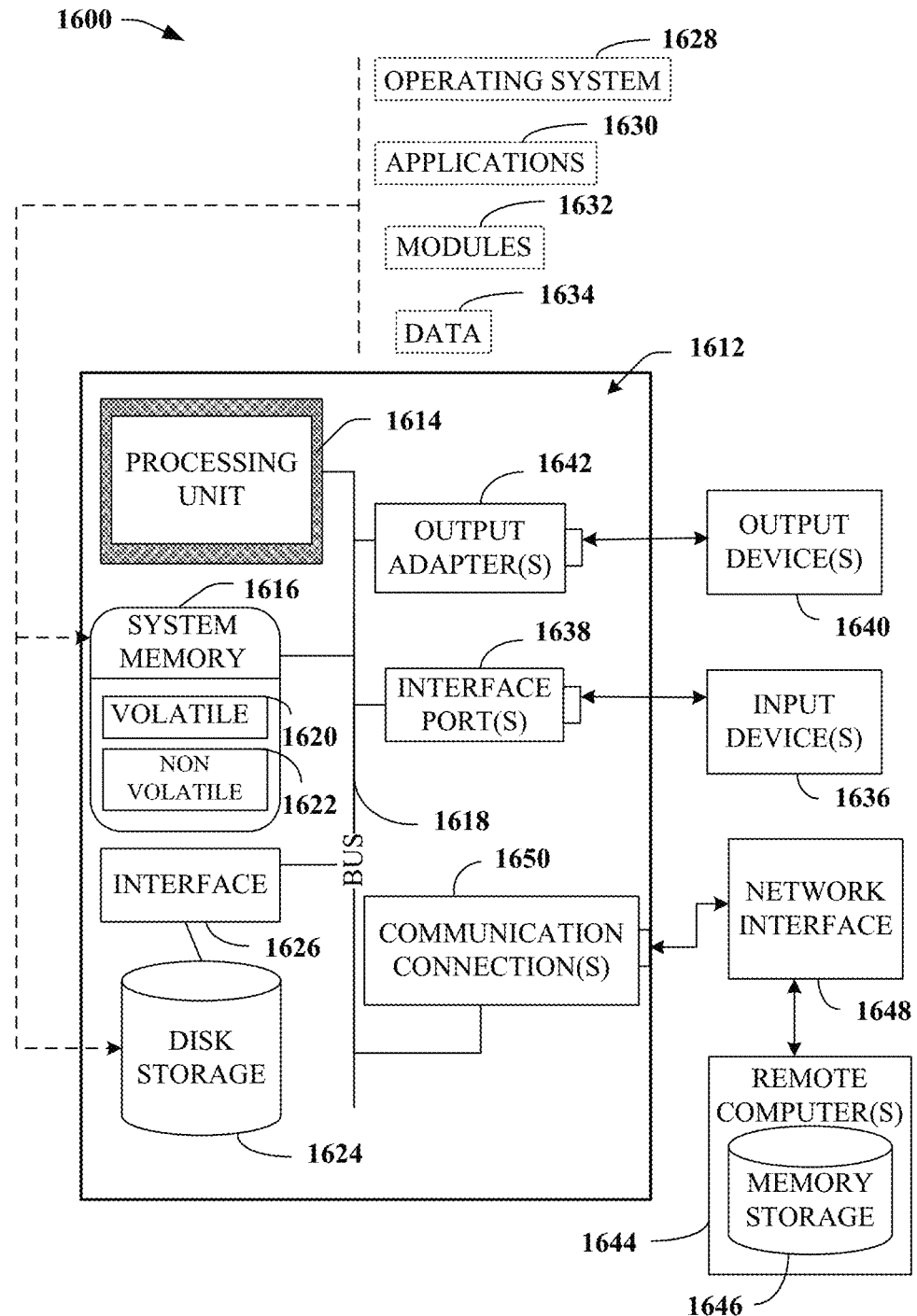
FIG. 16 illustrates a block diagram of a computing system operable to execute the disclosed systems and methods in accordance with an embodiment.

In order to provide a context for the various aspects of the disclosed subject matter, FIG. 16, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1620 (see below), non-volatile memory 1622 (see below), disk storage 1624 (see below), and memory storage 1646 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 16 illustrates a block diagram of a computing system 1600 operable to execute the disclosed systems and methods in accordance with an embodiment. Computer 1612, which can be, for example, part of the hardware of system 160, includes a processing unit 1614, a system memory 1616, and a system bus 1618. System bus 1618 couples system components including, but not limited to, system memory 1616 to processing unit 1614. Processing unit 1614 can be any of various available processors. Dual microprocessors and other multiprocessor architectures also can be employed as processing unit 1614.

System bus 1618 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MS A), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1616 can include volatile memory 1620 and nonvolatile memory 1622. A basic input/output system (BIOS), containing routines to transfer information between elements within computer 1612, such as during start-up, can be stored in nonvolatile memory 1622. By way of illustration, and not limitation, nonvolatile memory 1622 can include ROM, PROM, EPROM, EEPROM, or flash memory. Volatile memory 1620 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1612 can also include removable/non-removable, volatile/non-volatile computer storage media. FIG. 16 illustrates, for example, disk storage 1624. Disk storage 1624 includes, but is not limited to, devices like a magnetic disk drive, floppy disk drive, tape drive, flash memory card, or memory stick. In addition, disk storage 1624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1624 to system bus 1618, a removable or non-removable interface is typically used, such as interface 1626.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 16 describes software that acts as an intermediary between users and computer resources described in suitable operating environment 1600. Such software includes an operating system 1628. Operating system 1628, which can be stored on disk storage 1624, acts to control and allocate resources of computer system 1612. System applications 1630 take advantage of the management of resources by operating system 1628 through program modules 1632 and program data 1634 stored either in system memory 1616 or on disk storage 1624. It is to be noted that the disclosed subject matter can be implemented with various operating systems or combinations of operating systems.

A user can enter commands or information into computer 1612 through input device(s) 1636. As an example, mobile device and/or portable device can include a user interface embodied in a touch sensitive display panel allowing a user to interact with computer 1612. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1614 through system bus 1618 by way of interface port(s) 1638. Interface port(s) 1638 include, for example, a serial port, a parallel port, a game port, a universal serial bus (USB), an infrared port, a Bluetooth port, an IP port, or a logical port associated with a wireless service, etc. Output device(s) 1640 use some of the same type of ports as input device(s) 1636.

Thus, for example, a USB port can be used to provide input to computer 1612 and to output information from computer 1612 to an output device 1640. Output adapter 1642 is provided to illustrate that there are some output devices 1640 like monitors, speakers, and printers, among other output devices 1640, which use special adapters. Output adapters 1642 include, by way of illustration and not limitation, video and sound cards that provide means of connection between output device 1640 and system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. Remote computer(s) 1644 can be a personal computer, a server, a router, a network PC, cloud storage, cloud service, a workstation, a microprocessor based appliance, a peer device, or other common network node and the like, and typically includes many or all of the elements described relative to computer 1612.

For purposes of brevity, only a memory storage device 1646 is illustrated with remote computer(s) 1644. Remote computer(s) 1644 is logically connected to computer 1612 through a network interface 1648 and then physically connected by way of communication connection 1650. Network interface 1648 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1650 refer(s) to hardware/software employed to connect network interface 1648 to bus 1618. While communication connection 1650 is shown for illustrative clarity inside computer 1612, it can also be external to computer 1612. The hardware/software for connection to network interface 1648 can include, for example, internal and external technologies such as modems, including regular telephone grade modems, cable modems and DSL modems, ISDN adapters, and Ethernet cards.

Figure 17:
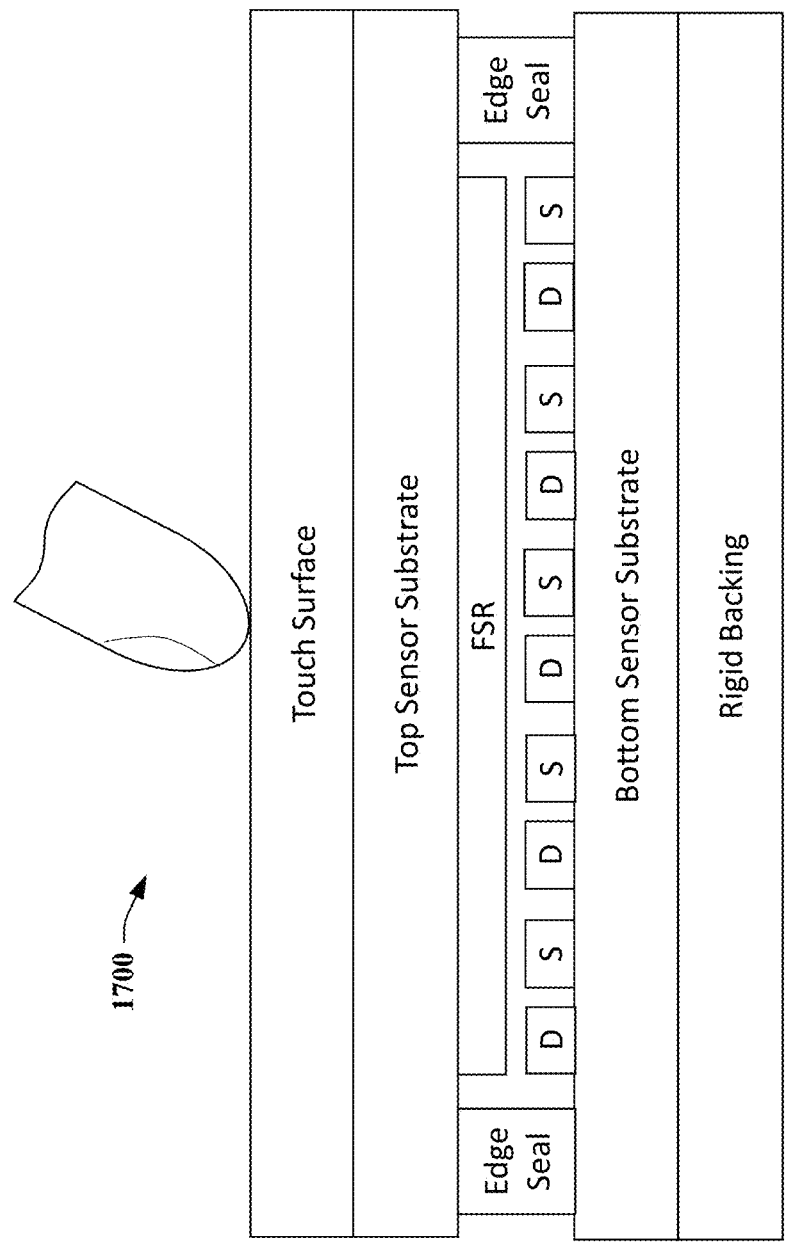
FIGS. 17-54 illustrate various selectively adhered resistive force sensor devices in accordance with aspects of the subject disclosure.
Figure 18:
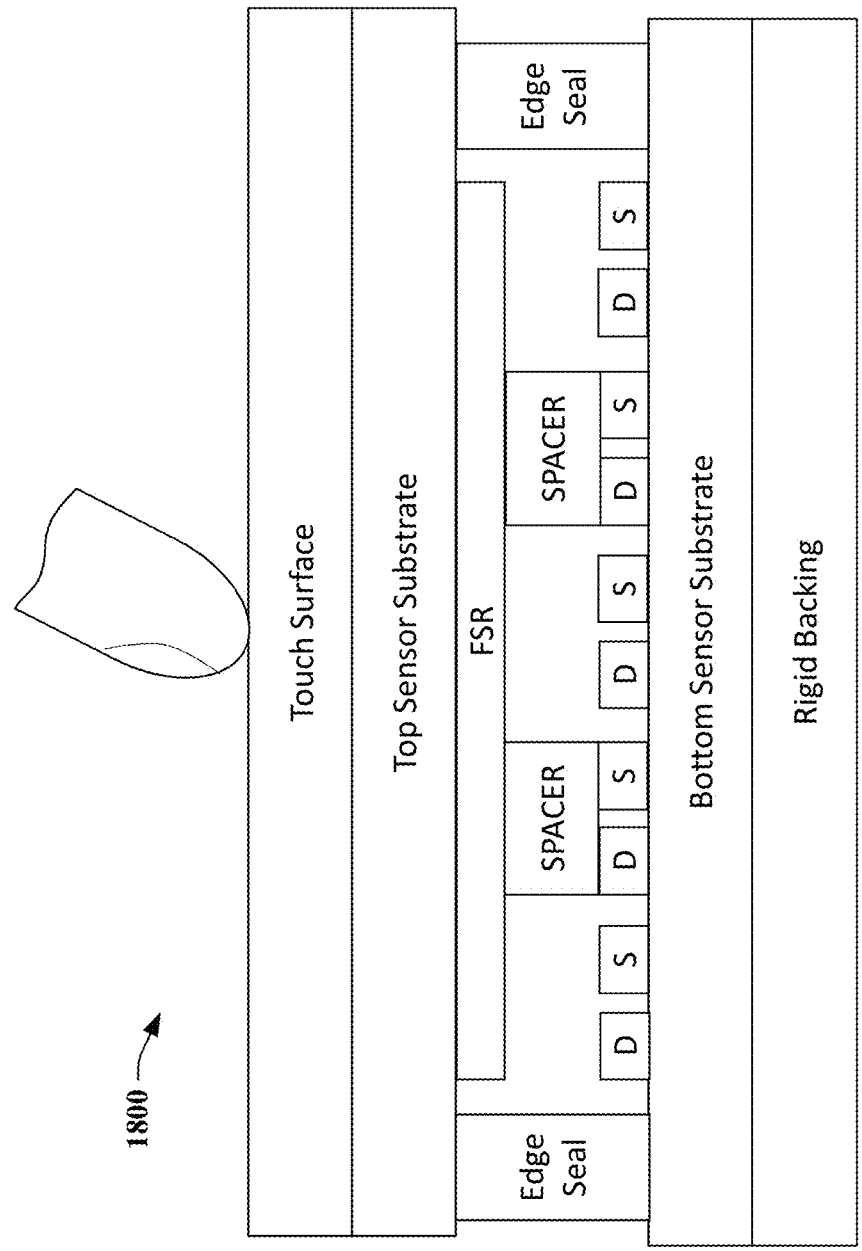

With reference to FIGS. 17-18 illustrated are selectively adhered resistive force sensor device 1700 and 1800 in accordance with various embodiments set forth in this disclosure. As illustrated in FIG. 17 selectively adhered resistive force sensor device 1700 can comprise a touch surface, a top sensor substrate, a force sensing resistive (FSR) layer, sensor elements (represented as an array of drive sensor elements "D" and sensor elements "S"), edge seals (that can be optional), bottom sensor substrate, and a rigid backing. As illustrated in FIG. 18 selectively adhered resistive force sensor device 1800 can comprise a touch surface, a top sensor substrate, a force sensing resistive (FSR) layer, spacers, sensor elements, edge seals, bottom sensor substrate, and a rigid backing. It will be noted in the context of FIGS. 17-18 that represented therein is a human digit that can be in contact or in near proximate contact with the top sensor substrate.

Figure 19:
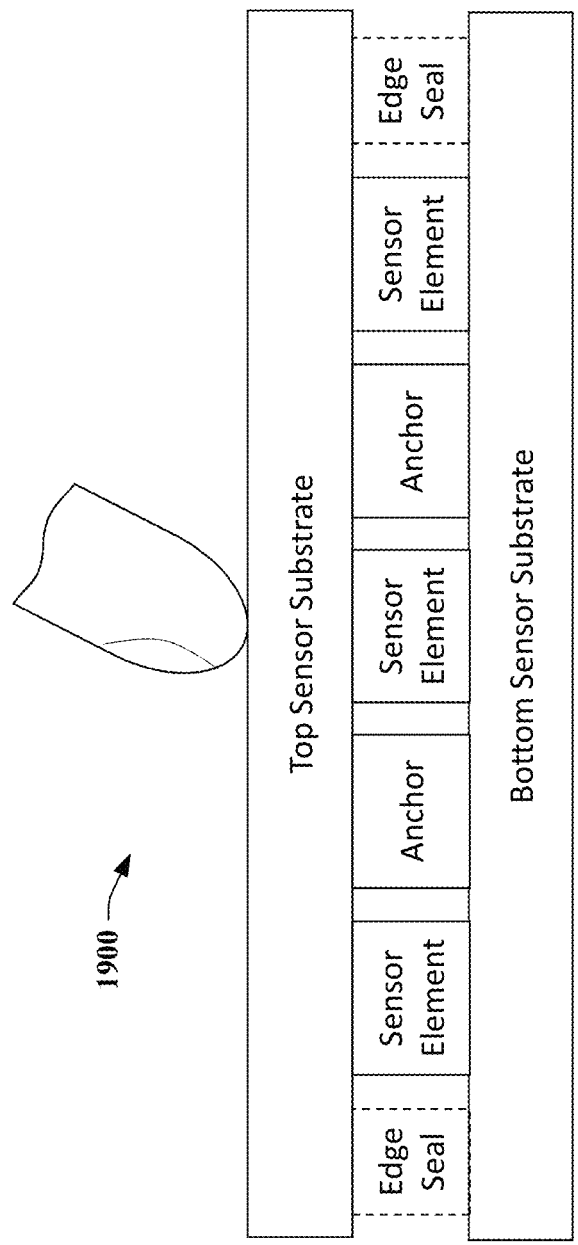
Figure 20:
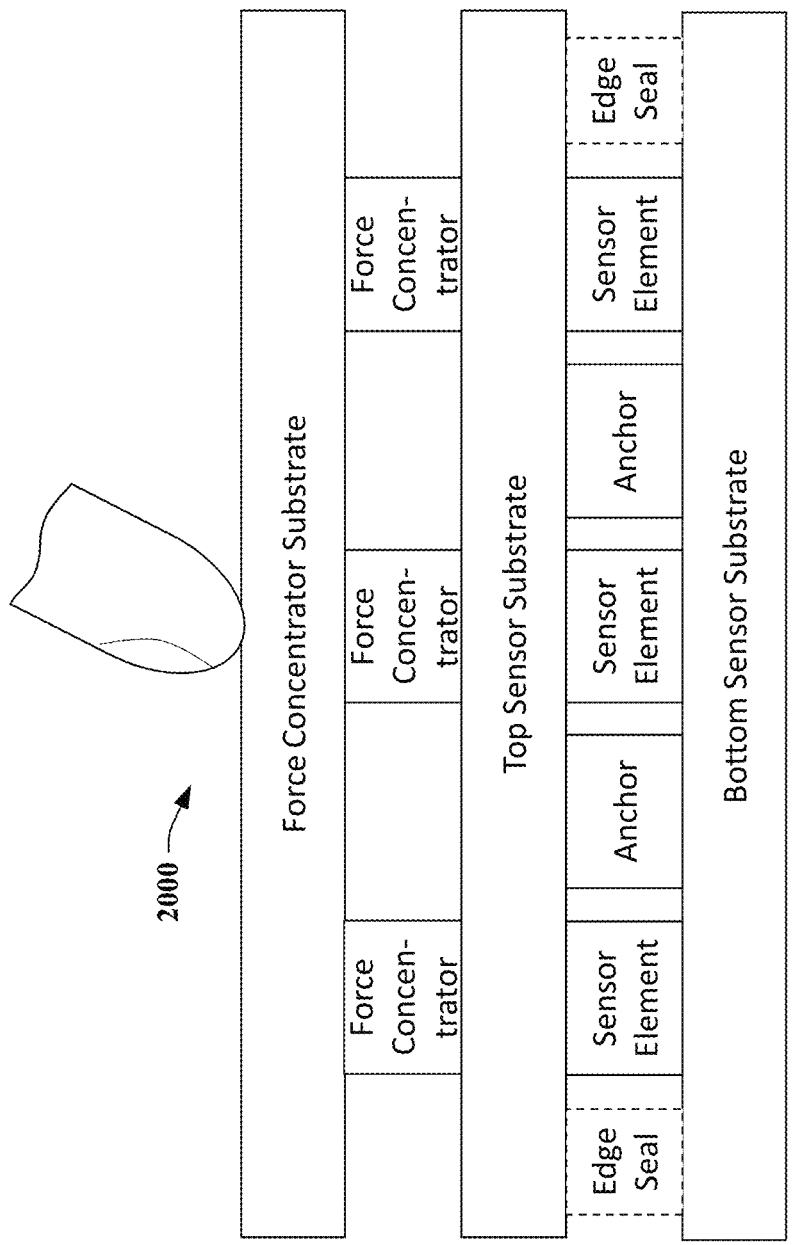
Figure 21:
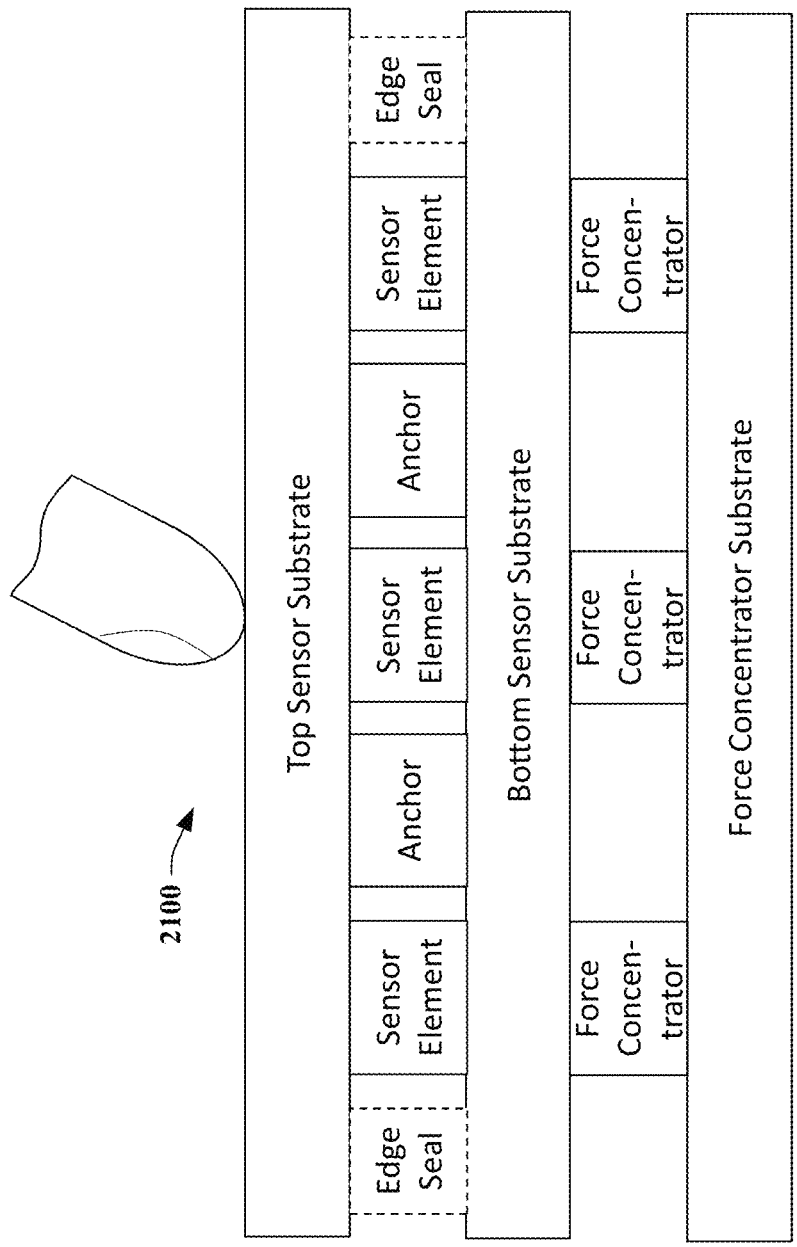

In regard to FIGS. 19-21 illustrated are example designs for selectively adhered resistive force sensor device(s) 1900, 2000, and 2100, in accordance with various embodiments set forth in the subject disclosure. As depicted in FIG. 19 selectively adhered resistive force sensor device 1900 can comprise a top sensor substrate, and a bottom sensor substrate, wherein interposed between the top sensor substrate and the bottom sensor substrate are sensor elements and anchors that can be variously arranged. Also depicted in the context of selectively adhered resistive force sensor device 1900 edge seals. The depicted edge seals can be an optional component in regard to selectively adhered resistive force sensor device 1900.

With regard to FIG. 20, the selectively adhered resistive force sensor device 2000 can comprise a force concentrator substrate, a top sensor substrate, and a bottom sensor substrate, wherein interposed between the force concentrator substrate and the top sensor substrate can be variously arranged force concentrator elements, and interposed between the top sensor substrate and the bottom sensor substrate can be variously arranged sensor elements and anchors.

FIG. 21 provides further illustration of a selectively adhered resistive force sensor device 2100 that can comprise a top sensor substrate, a bottom sensor substrate, and a force concentrator substrate, wherein interposed between the top sensor substrate and the bottom sensor substrate can be variously arranged sensor elements and anchors (and optional edge seals), and interposed between the bottom sensor substrate and the force concentrator substrate can be variously arranged force concentrating elements.

Figure 22:
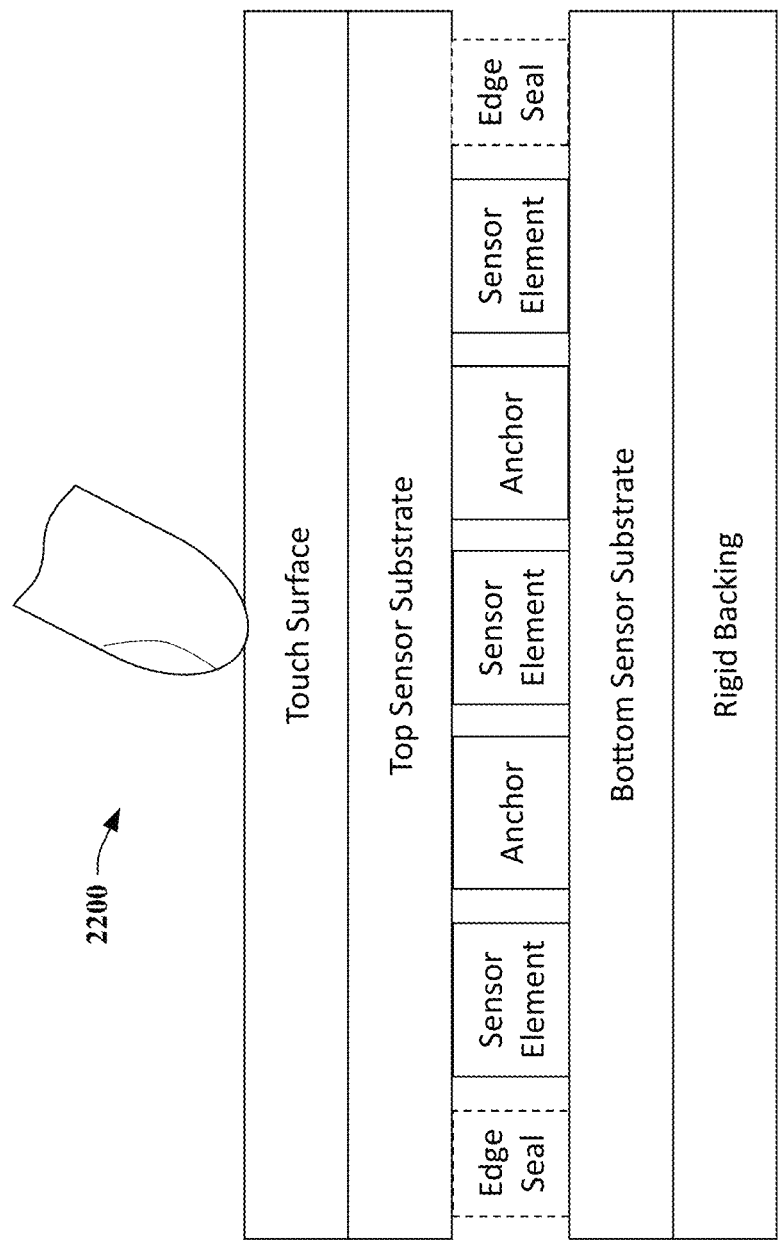

FIGS. 22-31 illustrates example application of selectively adhered resistive force sensor devices in the context of trackpad display devices and/or device comprising curved surfaces. In this regard, the trackpad design can apply to any touch-sensitive surface can be used, for example, as robot skin, car steering wheels, floor mats, and the like. In accordance with various disclosed embodiments and as depicted in FIG. 22 a selectively adhered resistive force sensor device 2200 can comprise a top surface, a top sensor substrate, a bottom sensor substrate, and a rigid backing. As illustrated, interposed between the top sensor substrate and the bottom sensor substrate can be variously arranged sensor elements and/or anchor elements that can be encapsulated between optional edge seals. In regard FIG. 22, it should be noted that in some embodiments the touch surface and the top sensor substrate can be one and the same, and/or the bottom sensor substrate and the rigid backing can be one and the same.

Figure 23:
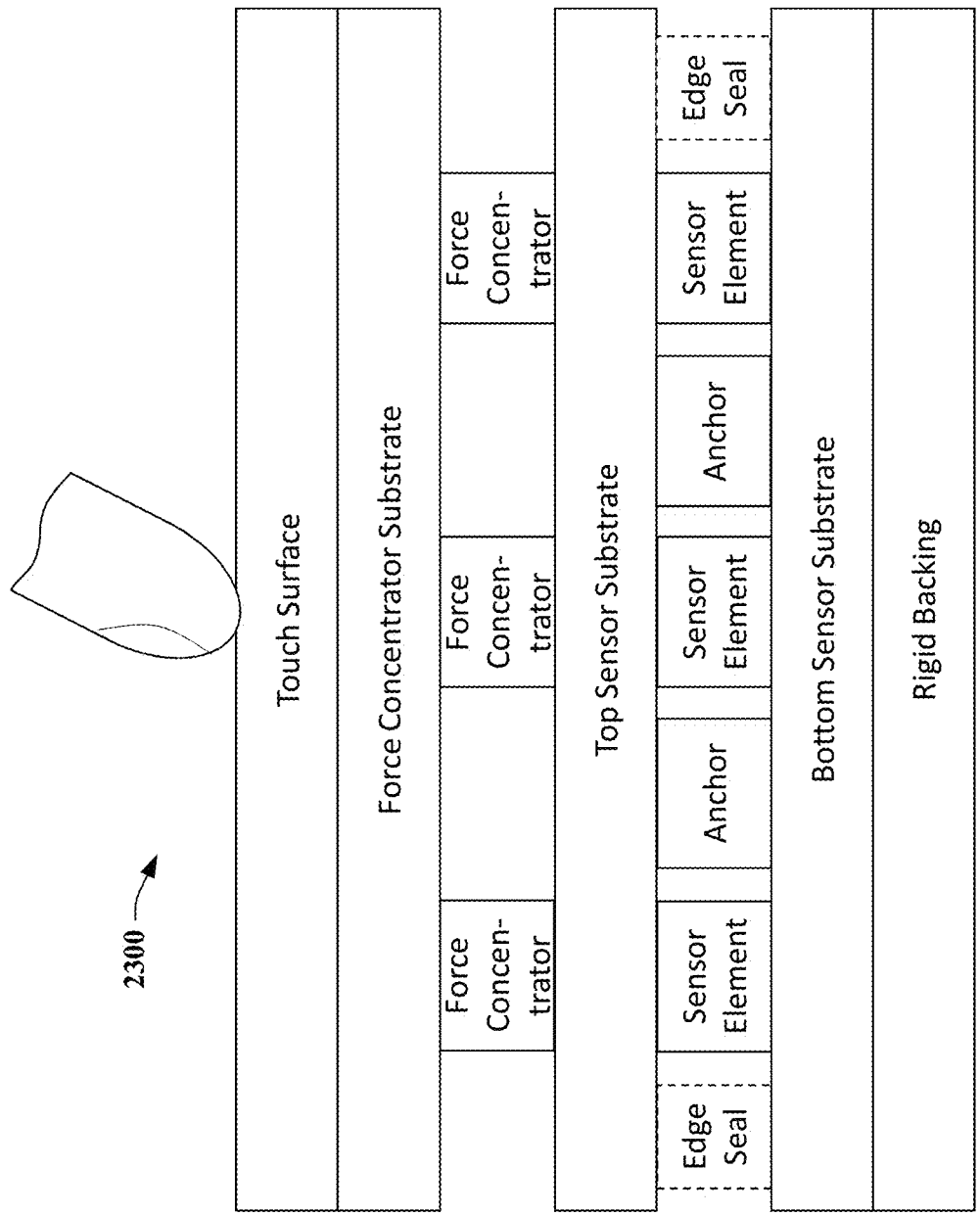

FIG. 23 illustrates a selectively adhered resistive force sensor device 2300 that can comprise, in various embodiments, a touch surface, a force concentrator substrate, a top sensor substrate, a bottom sensor substrate, and a rigid backing, wherein interposed between the force concentrator substrate and the top sensor substrate can be variously arranged force concentrating elements, and interposed between the top sensor substrate and the bottom sensor substrate can be variously arranged sensor elements, anchor elements, and/or optional edge seals. In the context of FIG. 23, it should be noted that in various embodiments the touch surface and the force concentrator substrate can be one and the same, and/or the bottom sensor substrate and the rigid backing can be one and the same.

Figure 24:
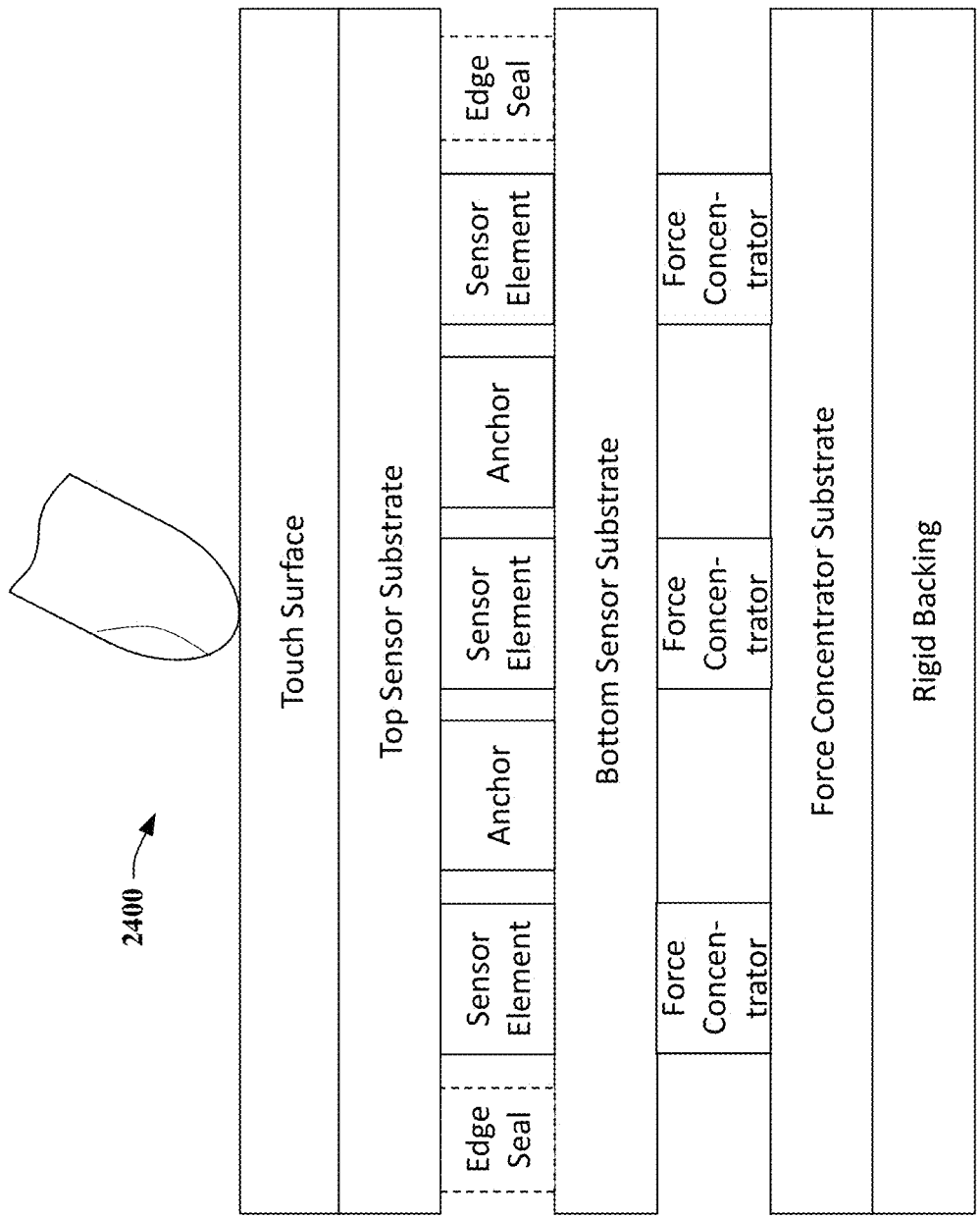

FIG. 24 illustrates a further selectively adhered resistive force sensor device 2400 that can comprise, in one or more various embodiments, a touch surface, a top sensor substrate, a bottom sensor substrate, a force concentrator substrate, and a rigid backing. In selectively adhered resistive force sensor device 2400, interposed between the top sensor substrate and the bottom sensor substrate can be variously arranged sensor elements, anchor elements, and/or optional edge seals, and interposed between the bottom sensor substrate and the force concentrator substrate can be variously arranged force concentrating elements. In regard to selectively adhered resistive force sensor device 2400, it should be noted that, in embodiments, the touch surface and the top sensor substrate can be one and the same, and/or the force concentrator substrate and the rigid backing can be one and the same.

Figure 25:
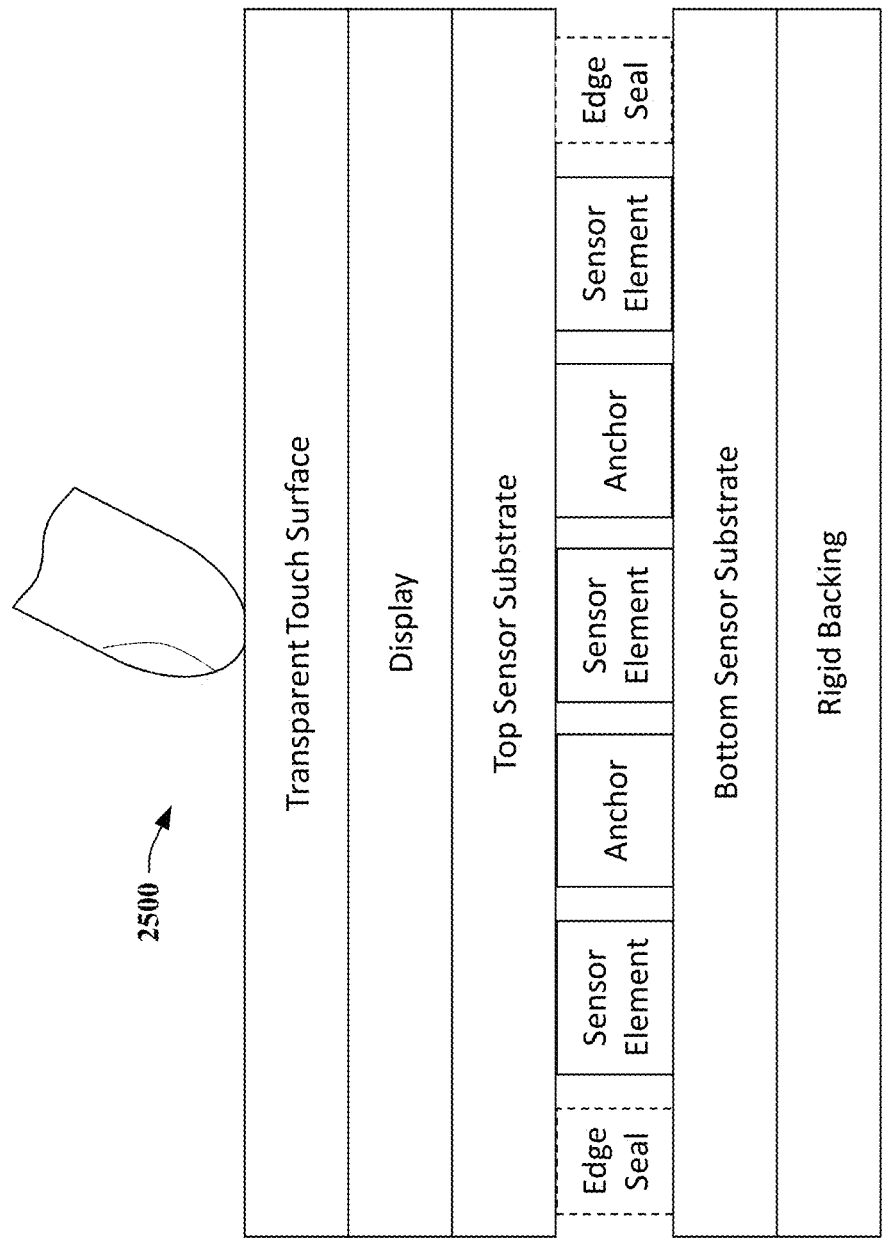

FIG. 25 provides illustration an additional selectively adhered resistive force sensor device 2500 that can comprise, in one or more various embodiments, a transparent touch surface, a display, a top sensor substrate, a bottom sensor substrate, and a rigid backing. As depicted, selectively adhered resistive force sensor device 2500, can have interposed between the top sensor substrate and the bottom sensor substrate variously arranged sensor elements, anchor elements, and/or edge seals. As has been noted in prior embodiments, the edge seals can be optional. In regard to selectively adhered resistive force sensor device 2500, it should be noted that, in embodiments, the display and top sensor substrate can be one and the same, and the bottom sensor substrate and the rigid backing can be one and the same.

Figure 26:
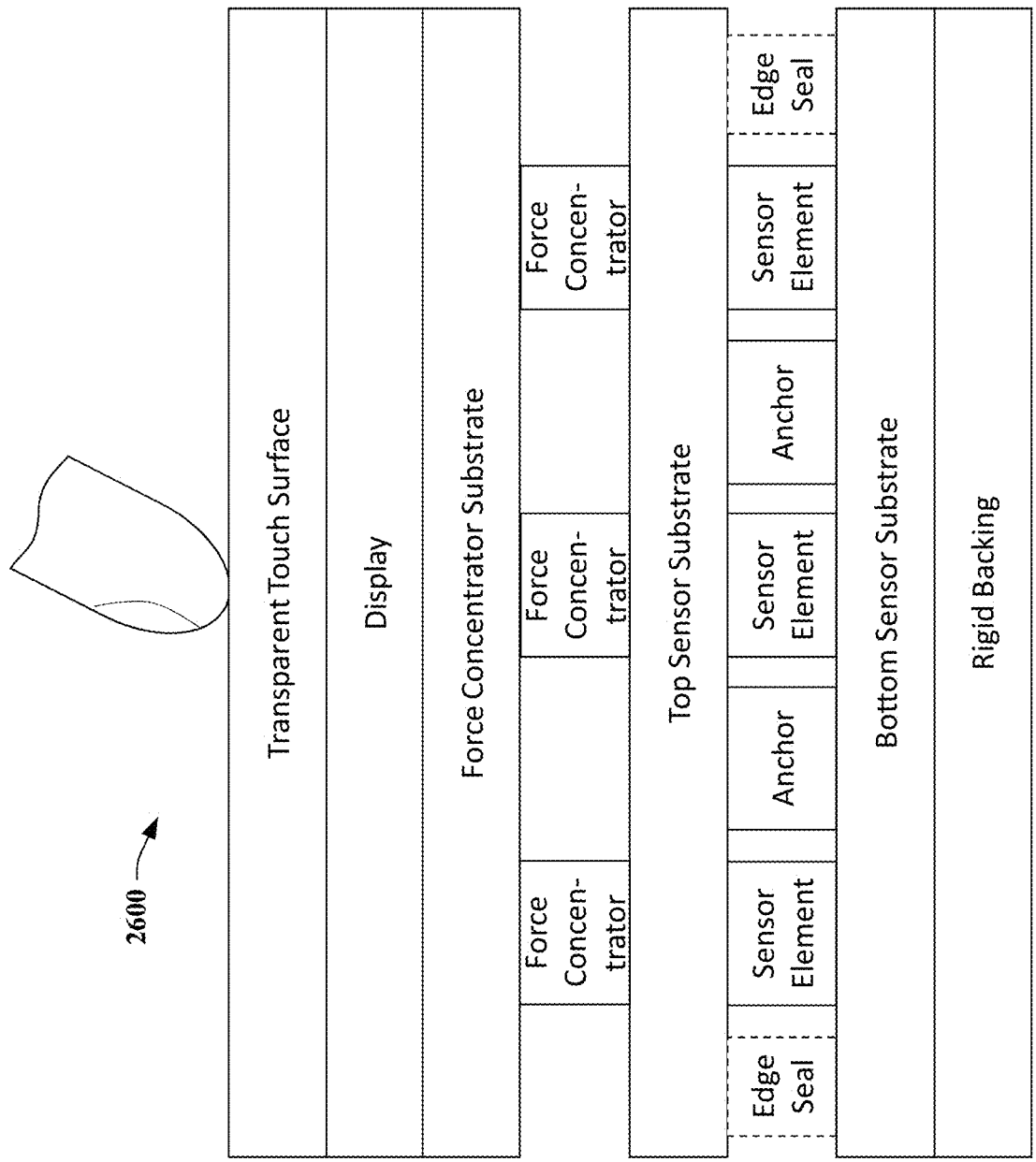

FIG. 26 provides additional illustration of a selectively adhered resistive force sensor device 2600 that can comprise, in various described embodiments, a transparent touch surface, a display surface, a force concentrator substrate, a top sensor substrate, a bottom sensor substrate, and a rigid backing, wherein interposed between the force concentrator substrate and the top substrate can be variously positioned force concentrating elements, and between the top sensor substrate and the bottom sensor substrate can be variously located sensor elements, anchor elements, and/or edge seals. With regard to the depicted selectively adhered resistive force sensor device 2600, the display surface and the force concentrator substrate can be one and the same, and the bottom sensor substrate and the rigid backing can be one and the same.

Figure 27:
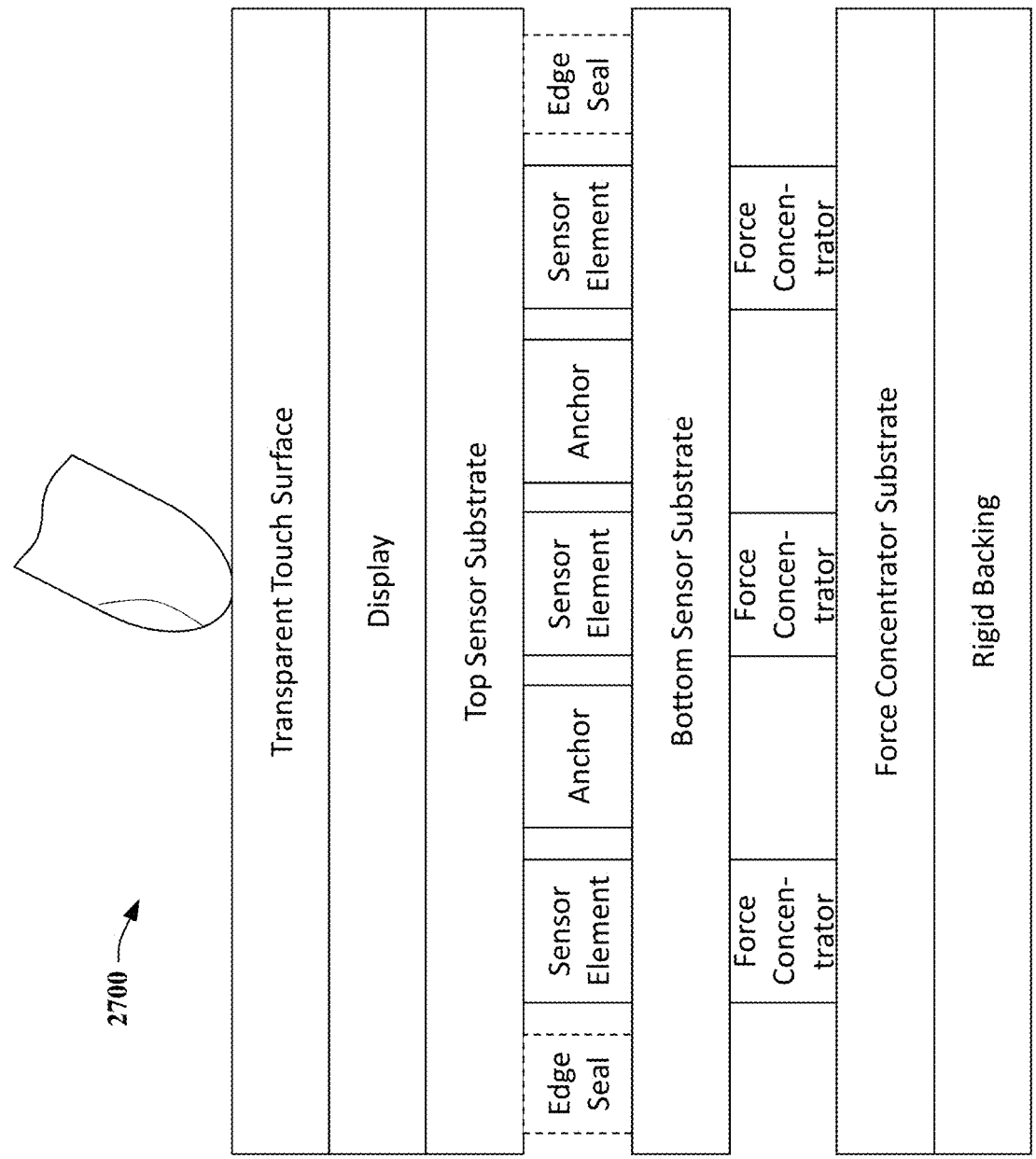

FIG. 27 provides further illustration of a selectively adhered resistive force sensor device 2700 that can comprise, in one or more described embodiments, a transparent touch surface, a display surface, a top sensor substrate, a bottom sensor substrate, a force concentrator substrate, and a rigid backing. Interposed between the top sensor substrate and the bottom sensor substrate can be variously positioned sensor elements, anchor elements, and edge seals, wherein the variously located sensor elements and anchor elements can be enclosed between edge seals. Interposed between the bottom sensor substrate and the force concentrating substrate can be variously located force concentrating elements. It should be noted in regard to selectively adhered resistive force sensor device 2700, the display surface and the top sensor substrate can be one and the same, and the force concentrator substrate and the rigid backing can be one and the same.

Figure 28:
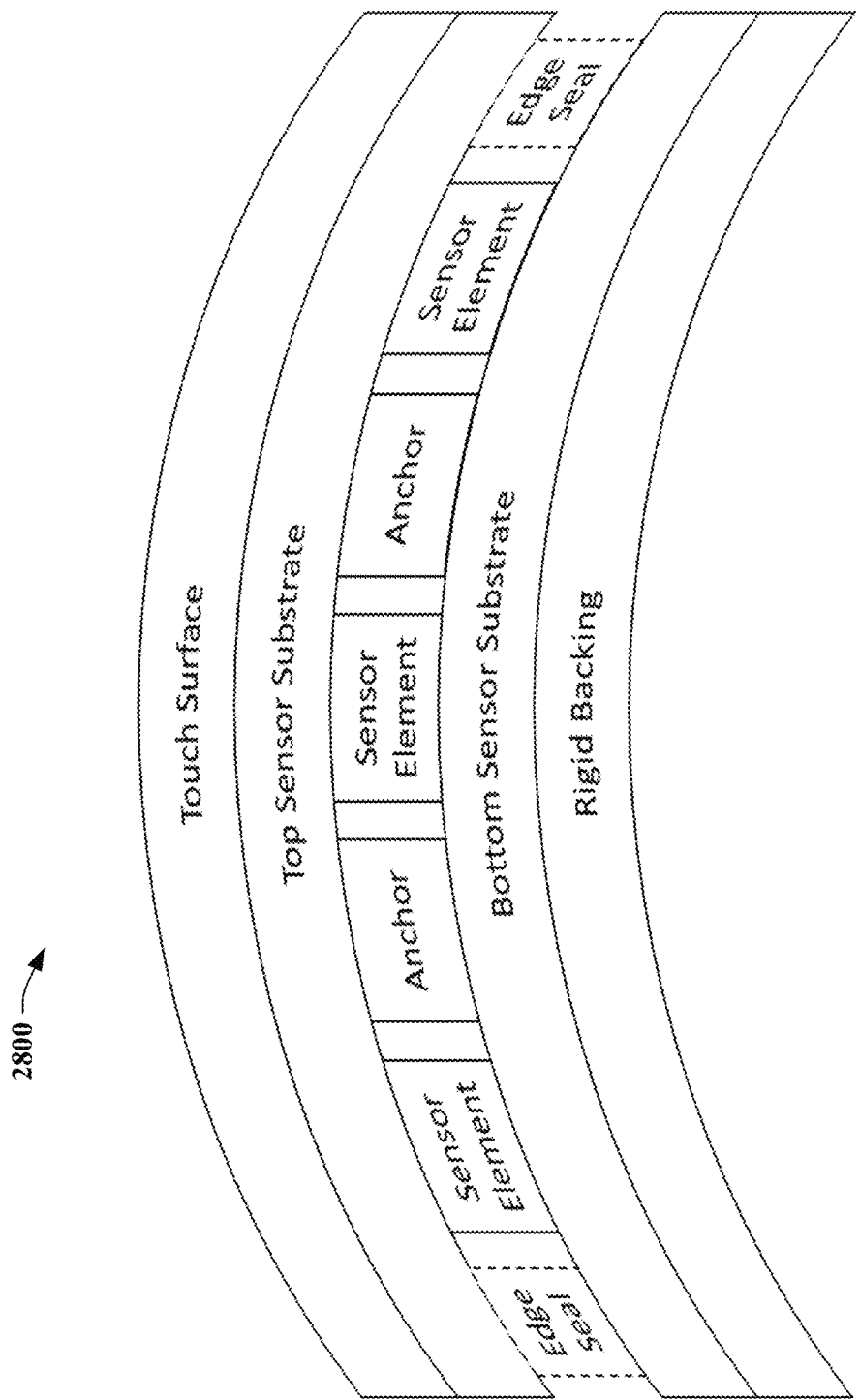

FIG. 28 illustrates an additional selectively adhered resistive force sensor device 2800 in accordance with one or more described embodiments. Selectively adhered resistive force sensor device 2800 can comprise a touch surface, a top sensor surface, a bottom sensor surface, and a rigid backing, wherein interposed between the top sensor substrate and the bottom sensor substrate can be variously positioned sensor elements, anchor elements, and edge seals, and wherein the variously located sensor elements and anchor elements can be encapsulated/enclosed between corresponding edge seals. As depicted, selectively adhered resistive force sensor device 2800 can be curved (e.g., concave, convex, or other complex shapes) by attaching the various layers to to a rigid backing of a desired shape.

Figure 29:
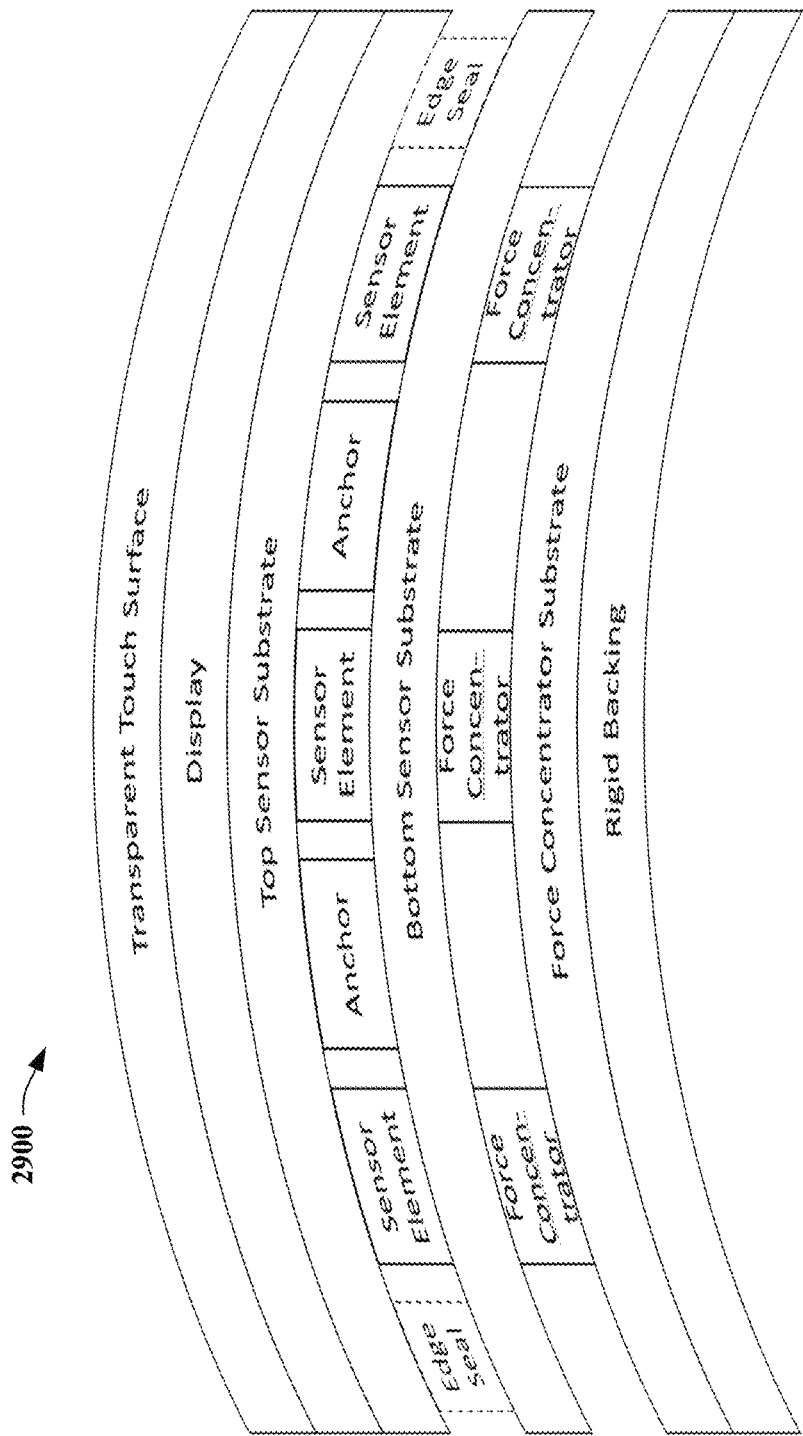

FIG. 29 illustrates a further selectively adhered resistive force sensor device 2900 in accordance with various described embodiments. Selectively adhered resistive force sensor device 2900 can comprise a transparent touch surface, a display surface, a top sensor substrate, a bottom sensor substrate, a force concentrator substrate, and a rigid backing. Interspersed between the top sensor substrate and the bottom center substrate can be variously positioned sensor elements, anchor elements, and/or edge seals, wherein the variously located sensor elements and anchor elements can be interspersed between end-cap edge seals. Interspersed between the bottom sensor substrate and the force concentrator substrate can be variously positioned force concentrating elements. As with selectively adhered resistive force sensor device 2800, selectively adhered resistive force sensor device 2900 can be arbitrarily curved (e.g., concave, convex, or other complex shapes) by attaching the various layers to a rigid back conforming to a desired shape.

Figure 30:
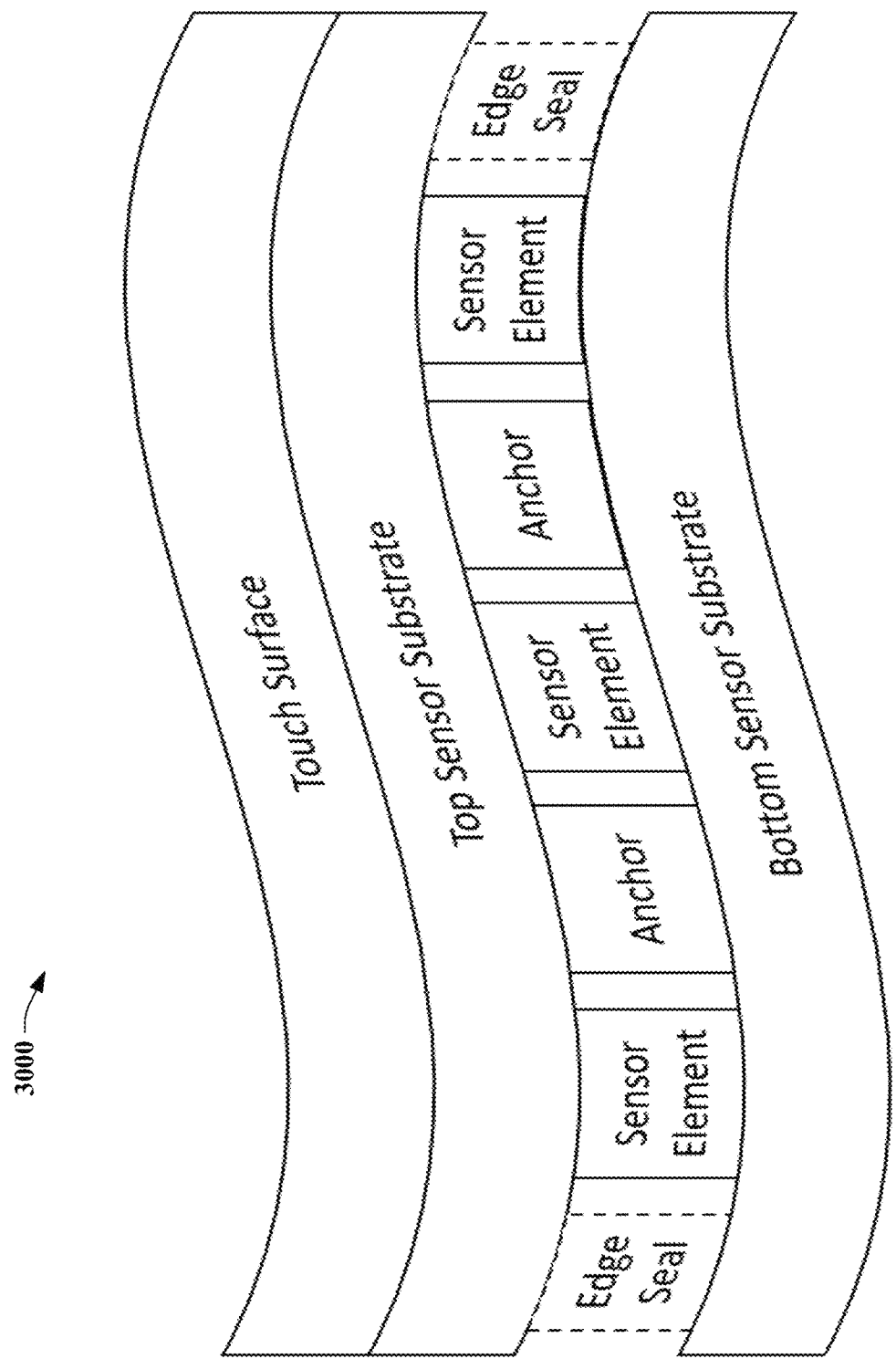

FIG. 30 illustrates an additional selectively adhered resistive force sensor device 3000 in accordance with one or more embodiments. Selectively adhered resistive force sensor device 3000 can comprise a touch surface, a top sensor substrate, and a bottom sensor substrate. Interposed or interspersed between the top sensor substrate and the bottom sensor substrate can be variously positioned sensor elements, anchor elements, and/or edge seals. In this depiction, selectively adhered resistive force sensor device 3000 can be a flexible touch sensor or a flexible touch display device since the rigid backing has been removed.

Figure 31:
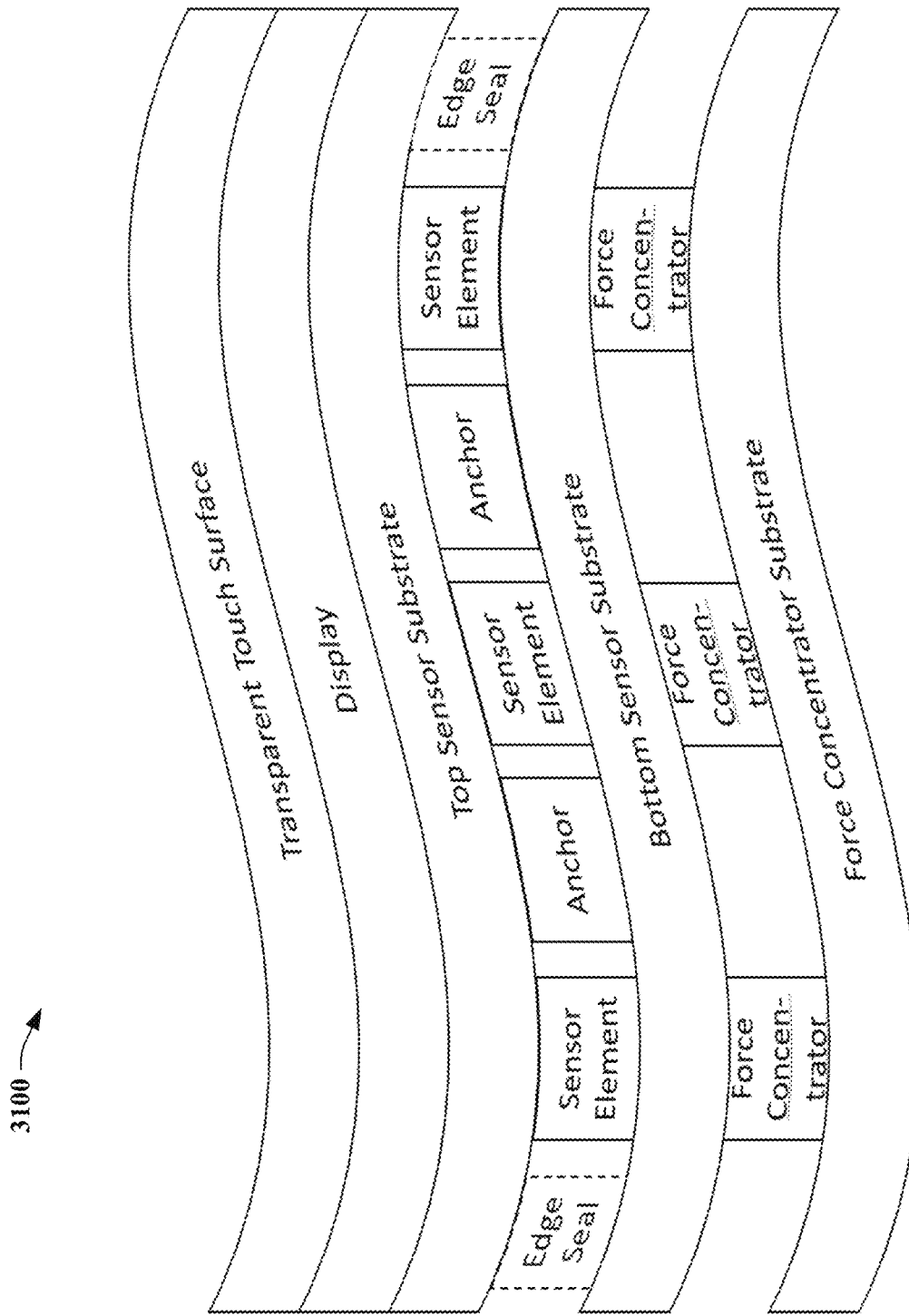

FIG. 31 illustrates a further selectively adhered resistive force sensor device 3100 in accordance with one or more embodiments. Selectively adhered resistive force sensor device 3100 can comprise a transparent touch surface, a display surface, a top sensor substrate, a bottom sensor substrate, and a force concentrator substrate. Interposed between the top sensor substrate and the bottom sensor substrate can be variously located sensor elements, anchor elements, and/or edge seals. Interspersed between the bottom sensor substrate and the force concentrator substrate can be located in various positions force concentrating elements. As was noted above in the context of selectively adhered resistive force sensor device 3000, selectively adhered resistive force sensor device 3100 can be a flexible touch sensor device or a flexible touch display device since in this example, the various strata of the force sensor device 310 are generally not formed over a rigid backing, or if formed using a rigid backing, the rigid backing is removed to render a flexible device.

Figure 32:
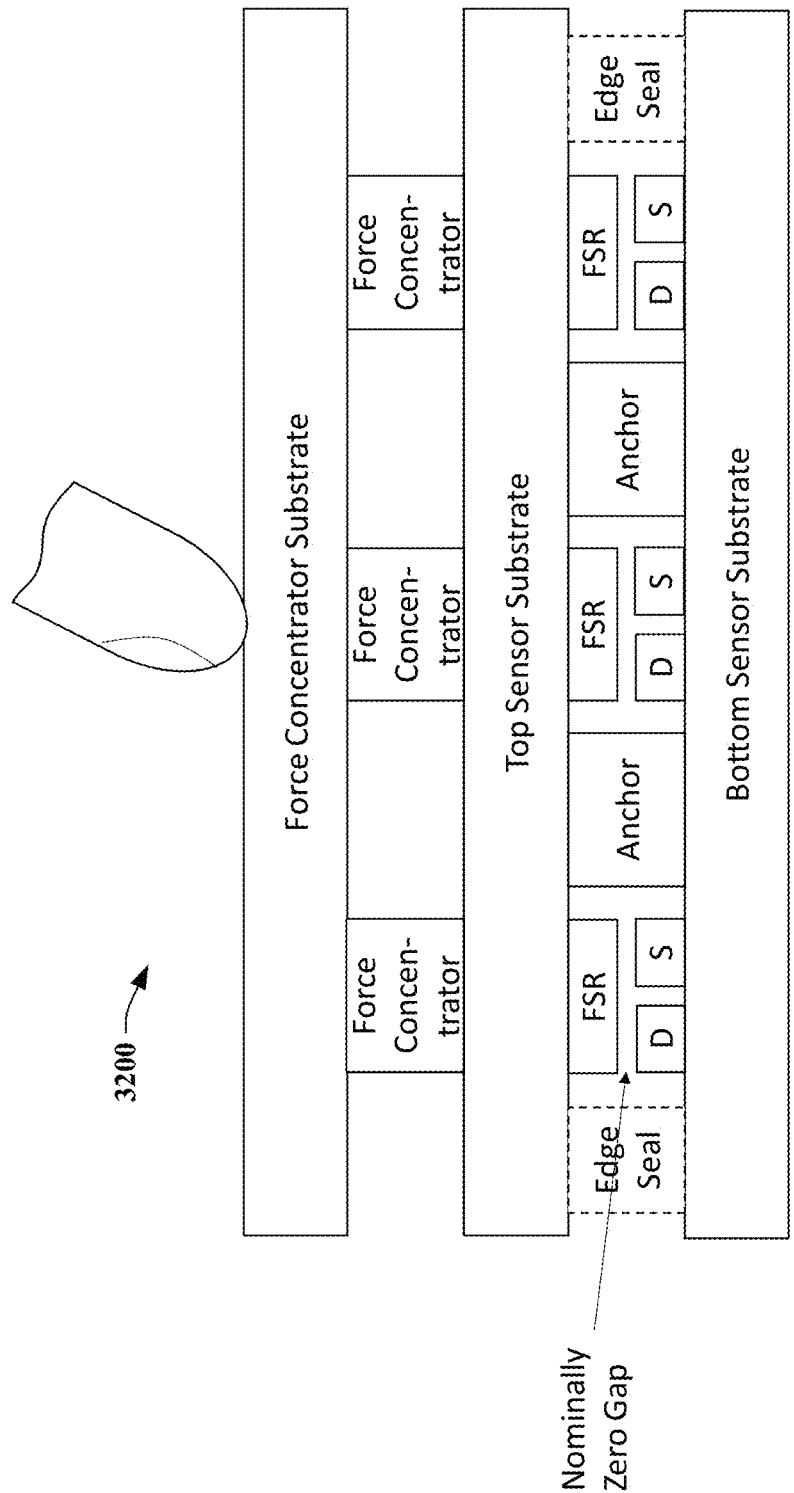

FIG. 32 illustrates an additional selectively adhered resistive force sensor device 3200 in accordance with various embodiments. Selectively adhered resistive force sensor device 3200 can be a shunt mode force sensor device and can comprise a force concentrator substrate, a top sensor substrate, and a bottom sensor substrate. Interposed between the force concentrator substrate and the top sensor substrate can be variously located force concentrator elements, and between the top sensor substrate and the bottom sensor substrate can be variously located force sensor resistors (FSR), drive sensor electrodes (D) and sense sensor electrodes (S), anchors, and one or more edge seals. In one or more embodiments, the drive and sense electrodes can be swapped. In an additional and/or alternative embodiments, the drive and sense electrodes can be on the top of the sensor substrate and the force sensor resistors on the bottom sensor substrate. In further additional and/or alternative embodiments, the force concentrator elements can be optional and/or can be positioned on the top sensor substrate or on the bottom sensor substrate. It will be observed that there can exist an nominally zero gap between the force sensor resistors and the drive sensor electrodes (D) and the sense sensor electrodes (S). It will also be observed that the anchor elements are interposed between the top sensor substrate and the bottom sensor substrate.

Figure 33:
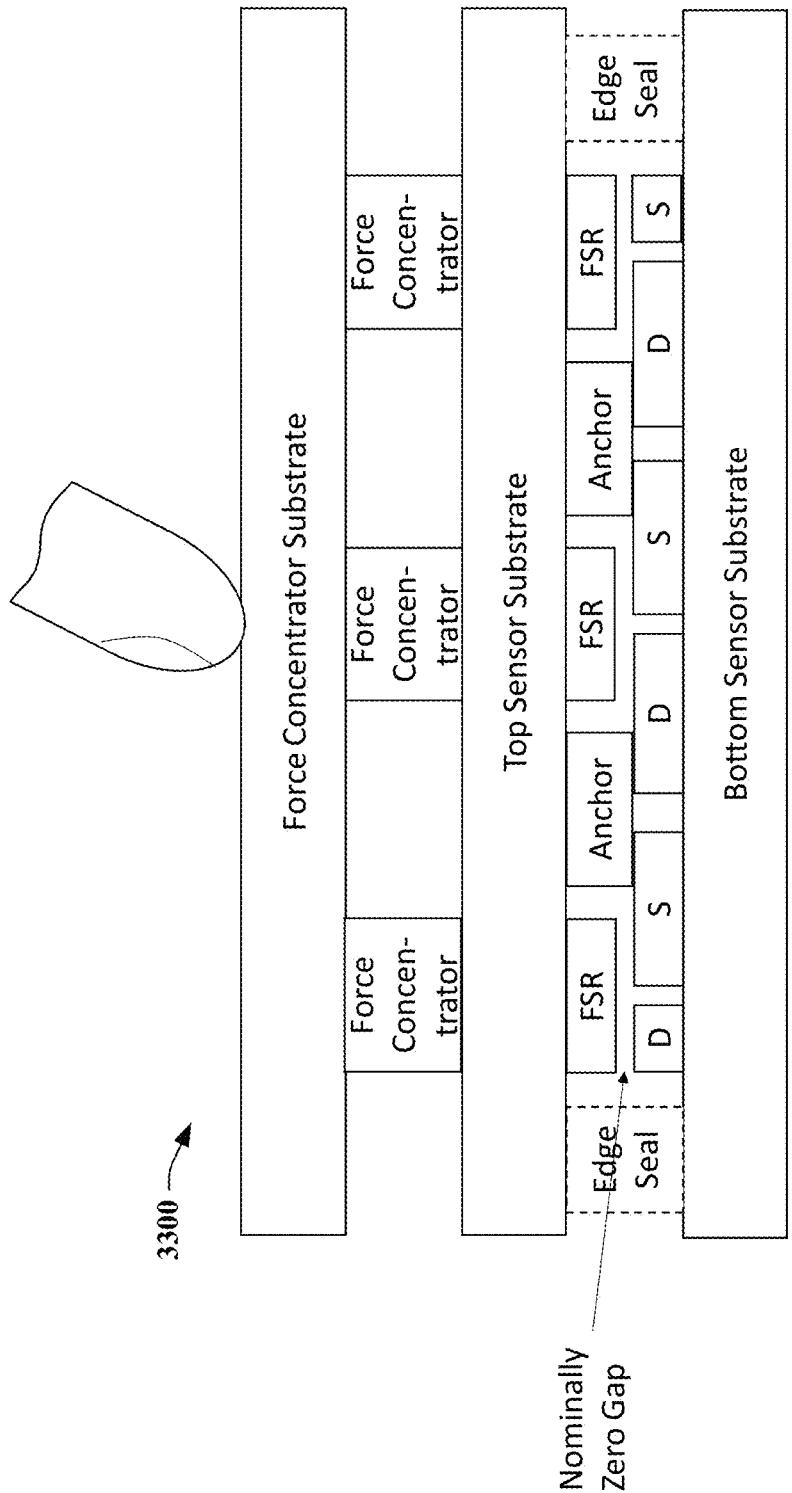

FIG. 33 provides additional illustration of a selectively adhered resistive force sensor device 3300 in accordance with various embodiments. Selectively adhered resistive force sensor device 3300 can be a shunt mode force sensor device and can comprise a force concentrator substrate, a top sensor substrate, and a bottom sensor substrate. Located between the force concentrator substrate and the top sensor substrate can be interspersed force concentrating elements. Located between the top sensor substrate and the bottom sensor substrate can be interspersed force sensor resistors;

drive sensor electrodes (D) and sense sensor electrodes (S); anchor elements that can be positioned over and/or proximate to one or more drive sensor electrode (D) and sense sensor electrode (S) pairs; and/or edge seals. In this instance, the drive and sense electrodes can be swapped, the drive and sense electrodes can be positioned on the top sensor substrate and the force sensor resistors can be located on the bottom sensor substrate, and the force concentrators can be optional and can be located on the top sensor substrate or the bottom sensor substrate. As depicted there can exist a nominally zero gap between the force sensor resistors can the drive sensor electrodes (D) and the sense sensor electrodes (S).

Figure 34:
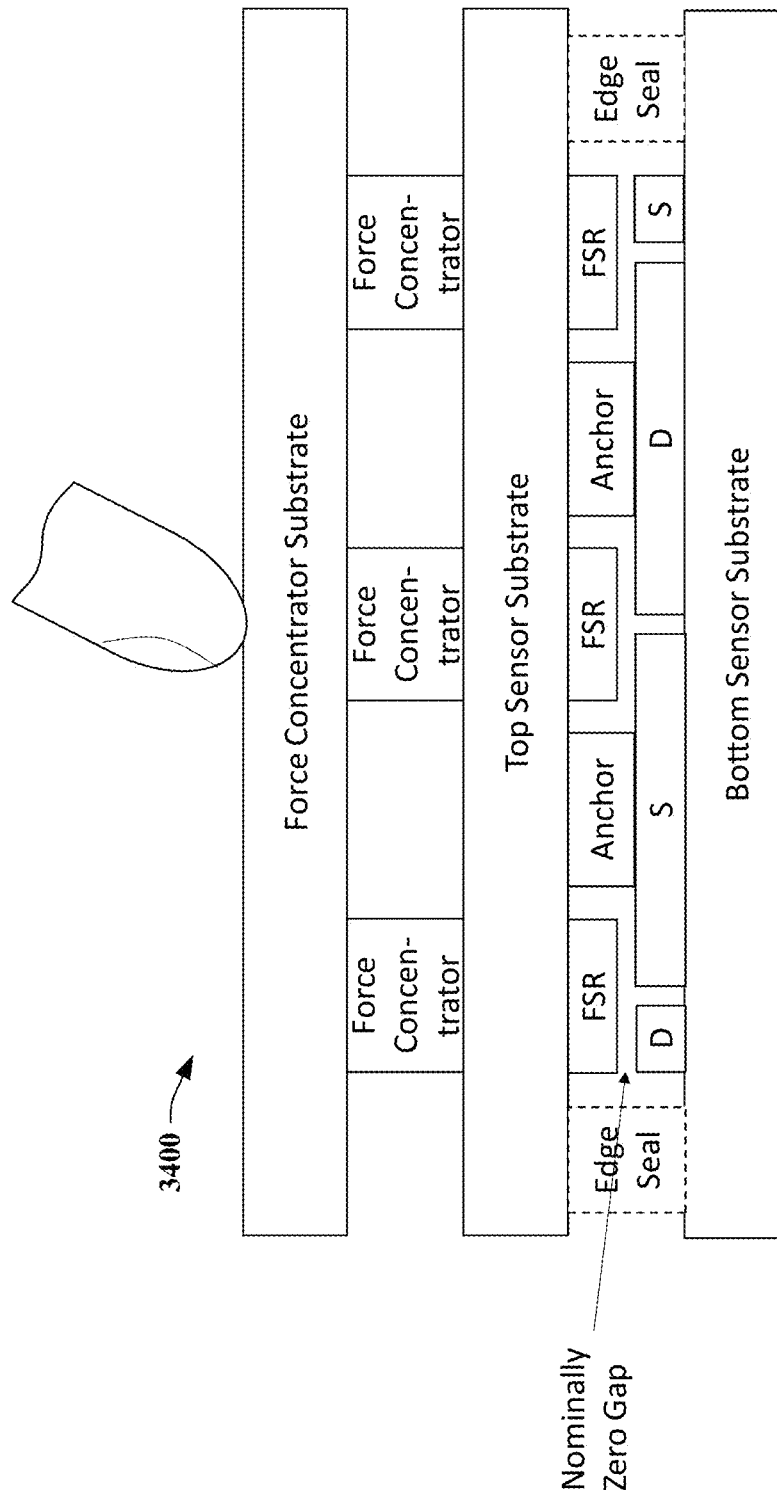

FIG. 34 provides an additional illustration of a selectively adhered resistive force sensor device 3400 in accordance with one or more embodiments. Selectively adhered resistive force sensor device 3400 can be a shunt mode force sensor resistive device and can comprise a force concentrator substrate, a top sensor substrate, and a bottom sensor substrate. Located between the force concentrator substrate and the top sensor substrate can be variously positioned force concentrator elements, located between the top sensor substrate and the bottom sensor substrate can be located or positioned force sensor resistive elements, drive electrodes (D) and sense sensor electrodes (S), and anchor elements. In accordance with this embodiment, the anchor elements can be anchored to the electrodes (e.g., either the drive electrode (D) and/or the sense sensor electrode (S)). A nominally zero gap can be extant between the force sensor resistive elements and the drive electrode (D) and/or the sense sensor electrode (S). In regard to this embodiment, the drive electrodes and the sense electrodes can be swapped, the drive electrodes and the sense electrodes can be on the top sensor substrate and the force sensor resistive elements can be positioned on the bottom sensor substrate, and the force concentrators can be optional and/or can be on the top sensor substrate or on the bottom sensor substrate.

Figure 35:
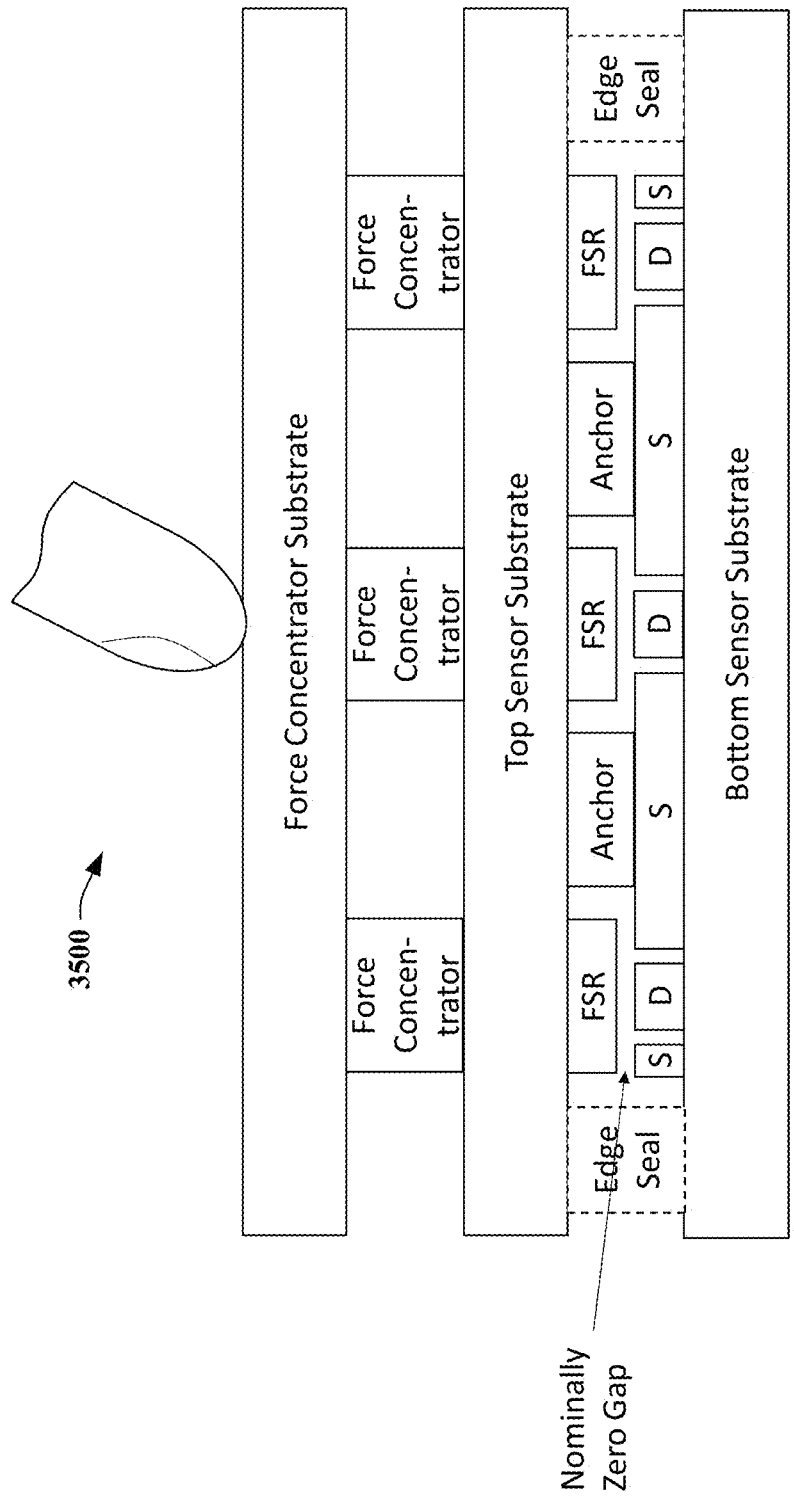

FIG. 35 illustrates a further selectively adhered resistive force sensor device 3500 in accordance with one or more embodiments. Selectively adhered resistive force sensor device 3500 can be a shunt mode force sensor resistive device and can comprise a force concentrator substrate a top sensor substrate, and a bottom sensor substrate, wherein between the force concentrator substrate and the top sensor substrate can be located one or more force concentrating elements, and between the top sensor substrate and the bottom sensor substrate can be located one or more force sensor resistive elements, drive electrodes (D) and sense sensor electrodes (S), and anchor elements. In this instance, the anchor elements can be anchored to electrodes (e.g., either drive electrode and/or the sense sensor electrode), and a nominally zero gap can be positioned between the force sensing resistive elements and the drive electrode (D) and/or the sense sensor electrode (S). In this example embodiment, drive electrodes and sense electrodes can be swapped, drive electrodes and sense electrodes can be on the top sensor substrate and the force sensor resistive elements can be positioned on the bottom sensor substrate, the force concentrating elements can be optional, but where the force concentrating elements are utilized these force concentrating elements can be positioned on the top sensor substrate and/or on the bottom sensor substrate.

Figure 36:
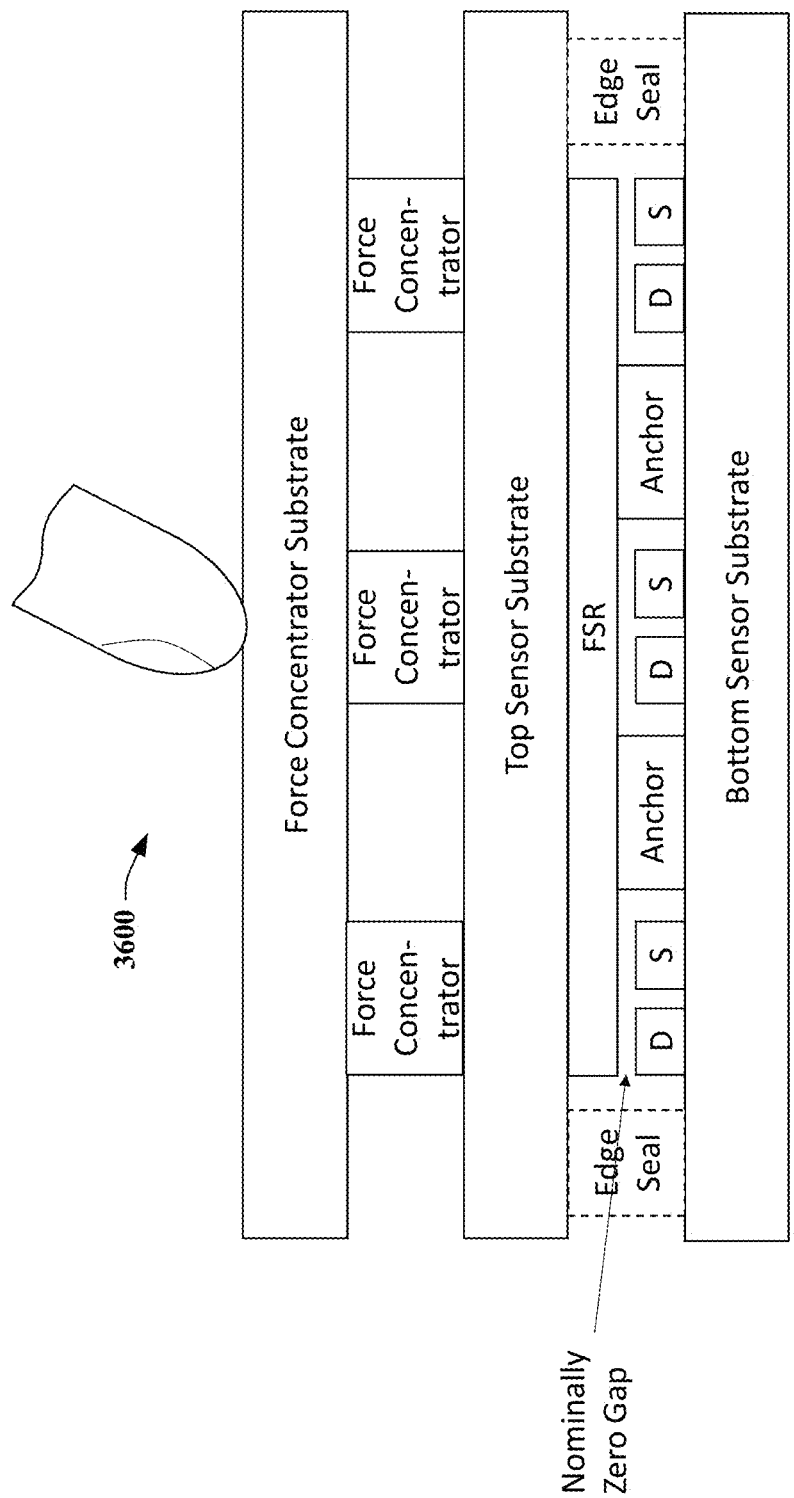

FIG. 36 provides illustration of an additional selectively adhered resistive force sensor device 3600 in accordance with one or more embodiments. Selectively adhered resistive force sensor device 3600 can be a shunt mode force sensor device and can comprise a force concentrator substrate, a top sensor substrate, and a bottom sensor substrate. Interposed between the force concentrator substrate and the top sensor substrate can be variously positioned force concentrating elements, and between the top sensor substrate and the bottom sensor substrate can be positioned force sensing resistive elements, drive electrodes (D) and/or sense sensor electrodes (S), and anchor elements. A nominally zero gap can be positioned between the force sensor resistive elements and the drive electrodes (D) and/or sense sensor electrodes (S). In this instance, the force sensor resistive elements can, as illustrated, be in contact with the anchor elements. As illustrated, the drive electrodes and the sense sensor electrodes can be swapped, the drive electrodes and the sense sensor electrodes can be positioned on the top sensor substrate and the force sensor resistive elements can be patterned on the bottom sensor substrate, and the force sensor concentrators can be optional. Nevertheless, where force concentrating elements are utilized these can be patterned on the top sensor substrate and/or on the bottom sensor substrate.

Figure 37:
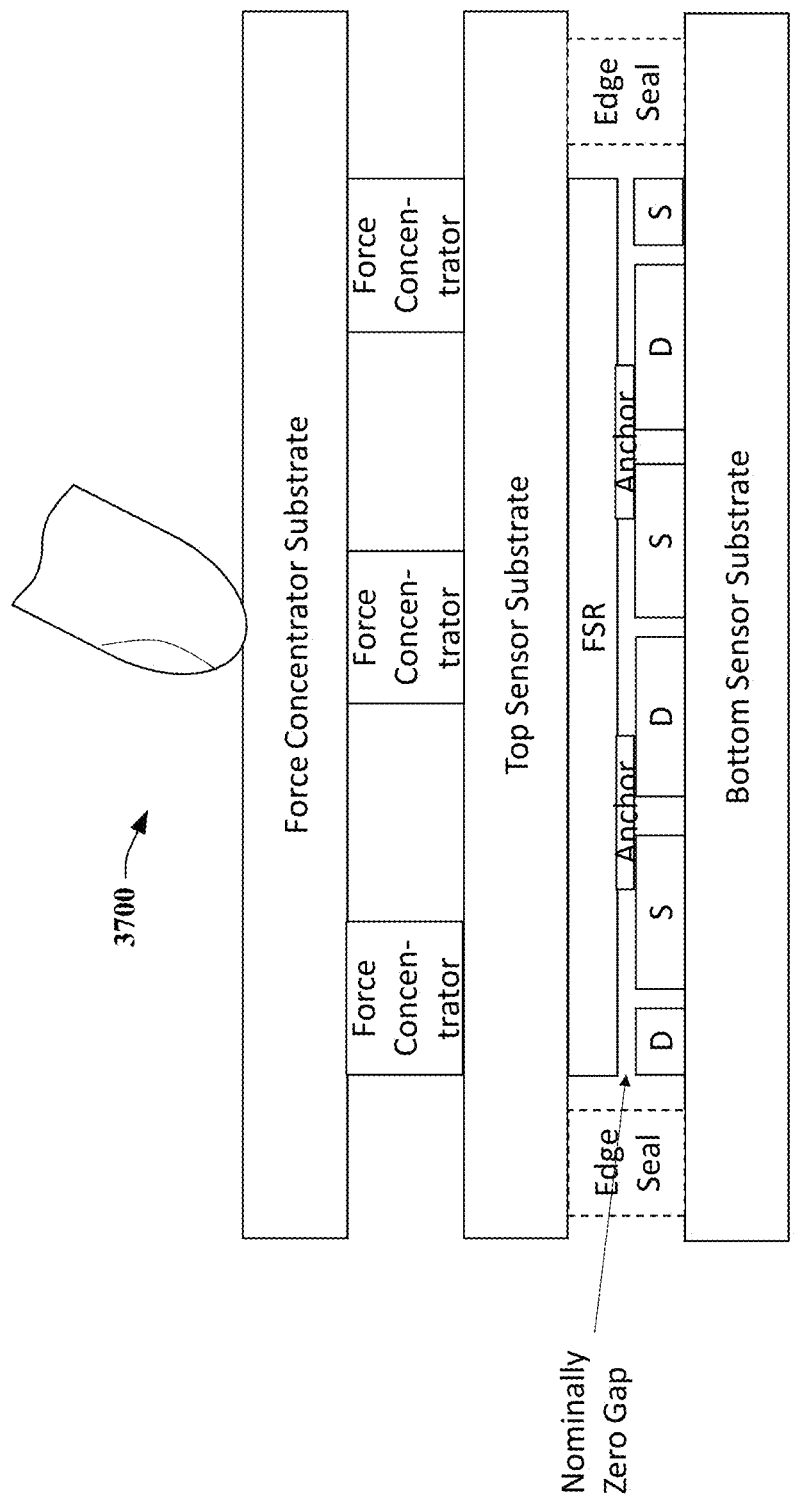

FIG. 37 illustrates a further selectively adhered resistive force sensor device 37 in accordance with various embodiments described herein. Selectively adhered resistive force sensor device 3700 can be a shunt mode force sensor device and can comprise a force concentrator substrate, a top sensor substrate, and a bottom sensor substrate. Interspersed between the force concentrator substrate and the top sensor substrate can be patterned force concentrator elements, and between the top sensor substrate and the bottom sensor substrate can be patterned force sensing resistive elements, drive electrodes (D) and sense sensor electrodes (S) and anchor elements. As depicted, the positioned force sensing resistive elements can rest on the anchor elements and the anchor elements can be positioned above the drive sensor electrodes (D) and/or the sense sensor electrodes (S). A nominally zero gap can also be utilized and positioned between the drive sensor electrodes (D) and/or the sense sensor electrodes (S). In this illustration, the drive sense electrodes (D) and the sense sensor electrodes (S) can be swapped, the drive sensor electrodes (D) and/or the sense sensor electrodes (S) can be patterned on the top sensor substrate and the force resistive elements can be patterned on the bottom sensor substrate, the force concentrators can be optional, though when force concentrators are employed these can be patterned on the top sensor substrate and/or on the bottom sensor substrate.

Figure 38:
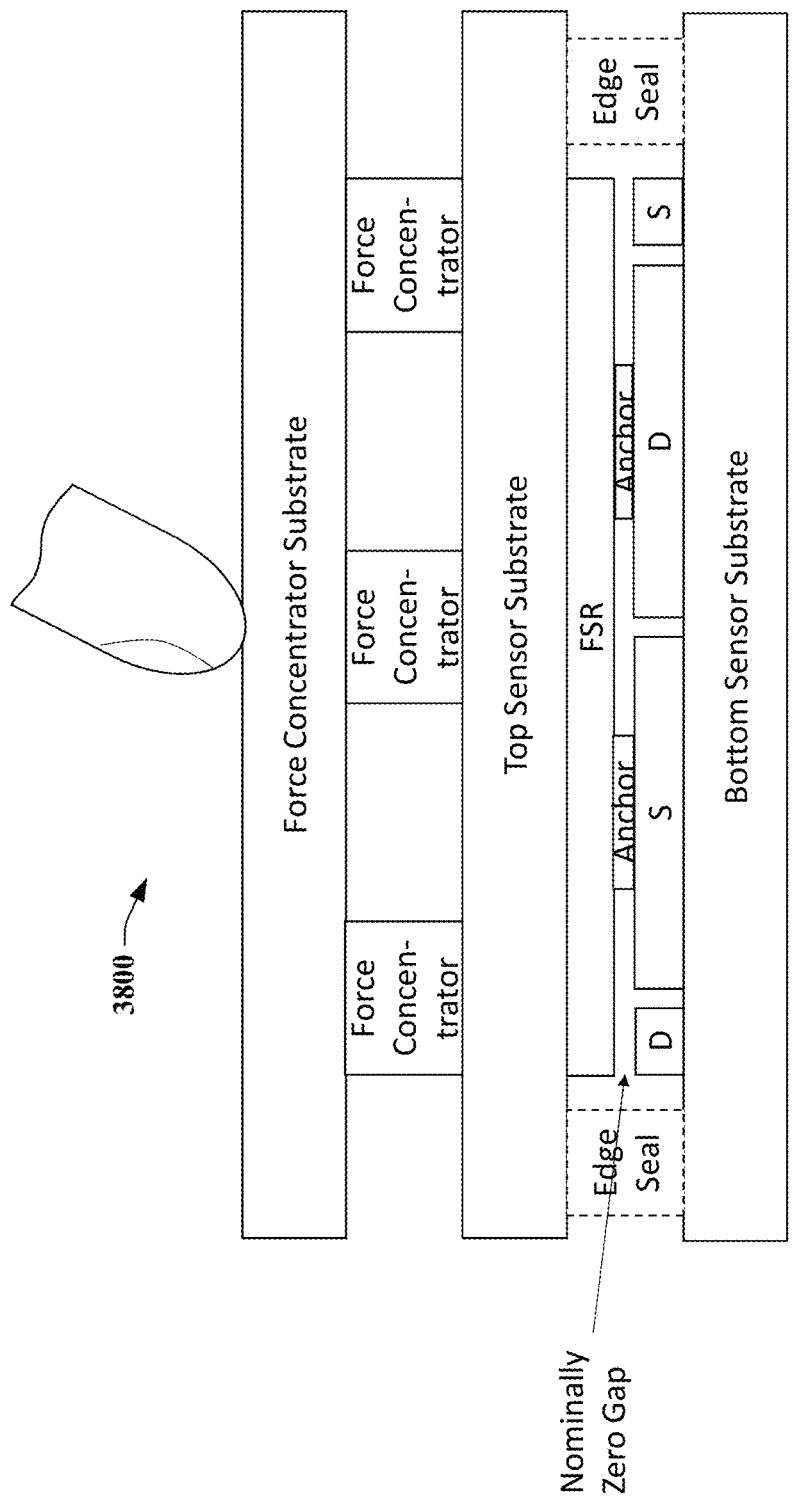

FIG. 38 illustrates an additional selectively adhered resistive force sensor device 3800 in accordance with one or more embodiments described herein. Selectively adhered resistive force sensor device 3800 can be a shunt mode force sensor resistive deice and can comprise a force concentrator substrate, a top sensor substrate, and a bottom sensor substrate, wherein between the force concentrator substrate and the top sensor substrate can be patterned one or more force concentrating elements, and between the top sensor substrate and the bottom sensor substrate can be patterned one or more force sensor resistive elements, drive elements (D) and/or sense elements (S), and anchor elements. In this instance, the force sensor resistive elements can be in contact with the anchor elements and the anchor elements can be in contact with at least one of the drive elements and/or the sense elements. As illustrated, the drive elements and the sensor elements can be swapped, the drive elements and the sense elements can be patterned on the top sensor substrate, and the force sensing resistive elements can be patterned on the bottom sensor substrate, and the force concentrators can be patterned on the top sensor substrate or the bottom sensor substrate. The force concentrating elements in some instances can be optional.

Figure 39:
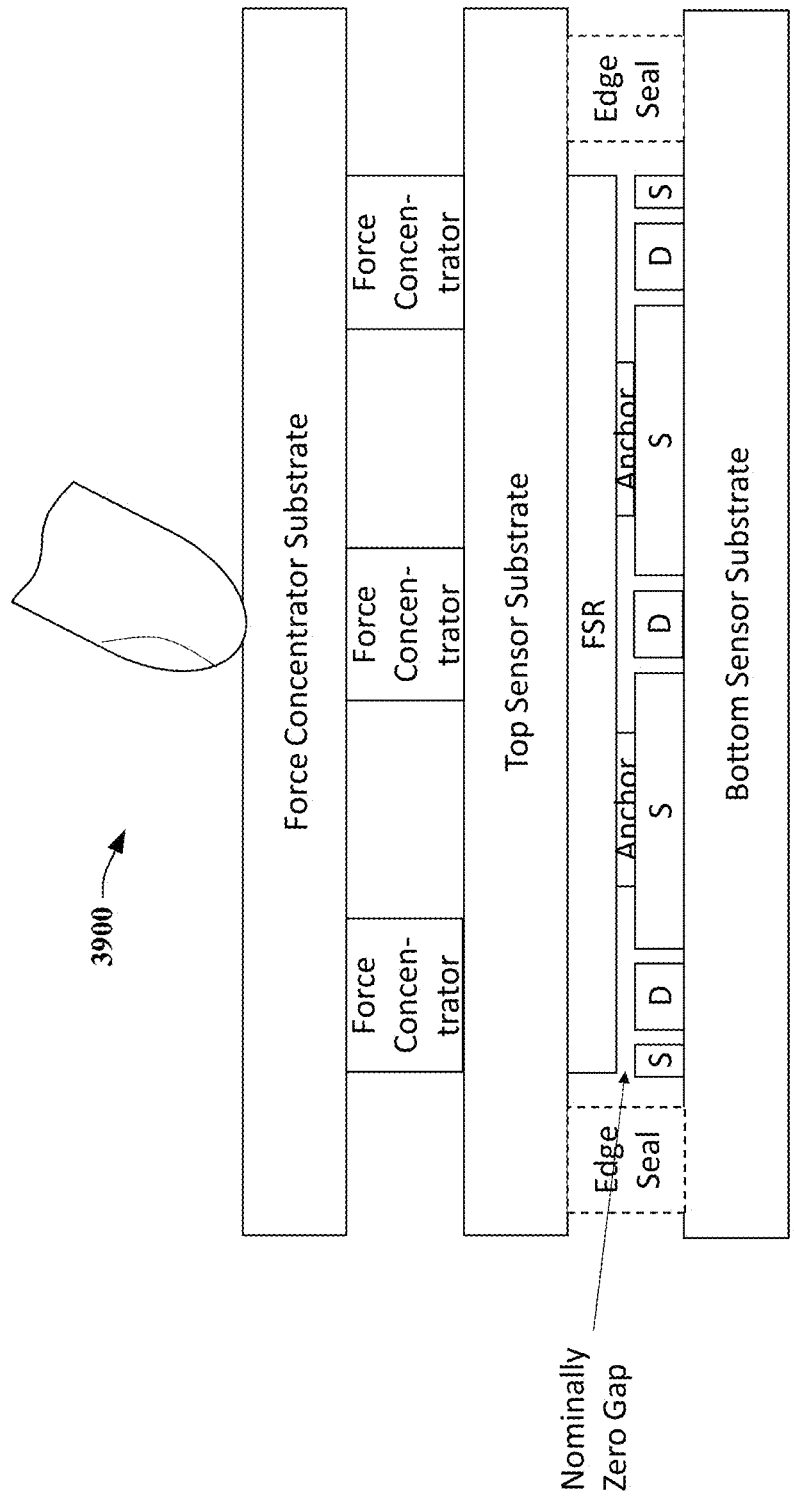

FIG. 39 illustrates an additional selectively adhered resistive force sensor device 3900 in accordance with one or more embodiments described herein. Selectively adhered resistive force sensor device 3900 can be a shunt mode force sensor resistive deice and can comprise a force concentrator substrate, a top sensor substrate, and a bottom sensor substrate, wherein between the force concentrator substrate and the top sensor substrate can be patterned one or more force concentrating elements, and between the top sensor substrate and the bottom sensor substrate can be patterned one or more force sensor resistive elements, drive elements (D) and/or sense elements (S), and anchor elements. In this instance, the force sensor resistive elements can be in contact with the anchor elements and the anchor elements can be in contact with at least one of the drive elements and/or the sense elements. As illustrated, the drive elements and the sensor elements can be swapped, the drive elements and the sense elements can be patterned on the top sensor substrate, the force sensing resistive elements can be patterned on the bottom sensor substrate, and the force concentrators can be patterned on the top sensor substrate or the bottom sensor substrate. The force concentrating elements in some instances can be optional.

Figure 40:
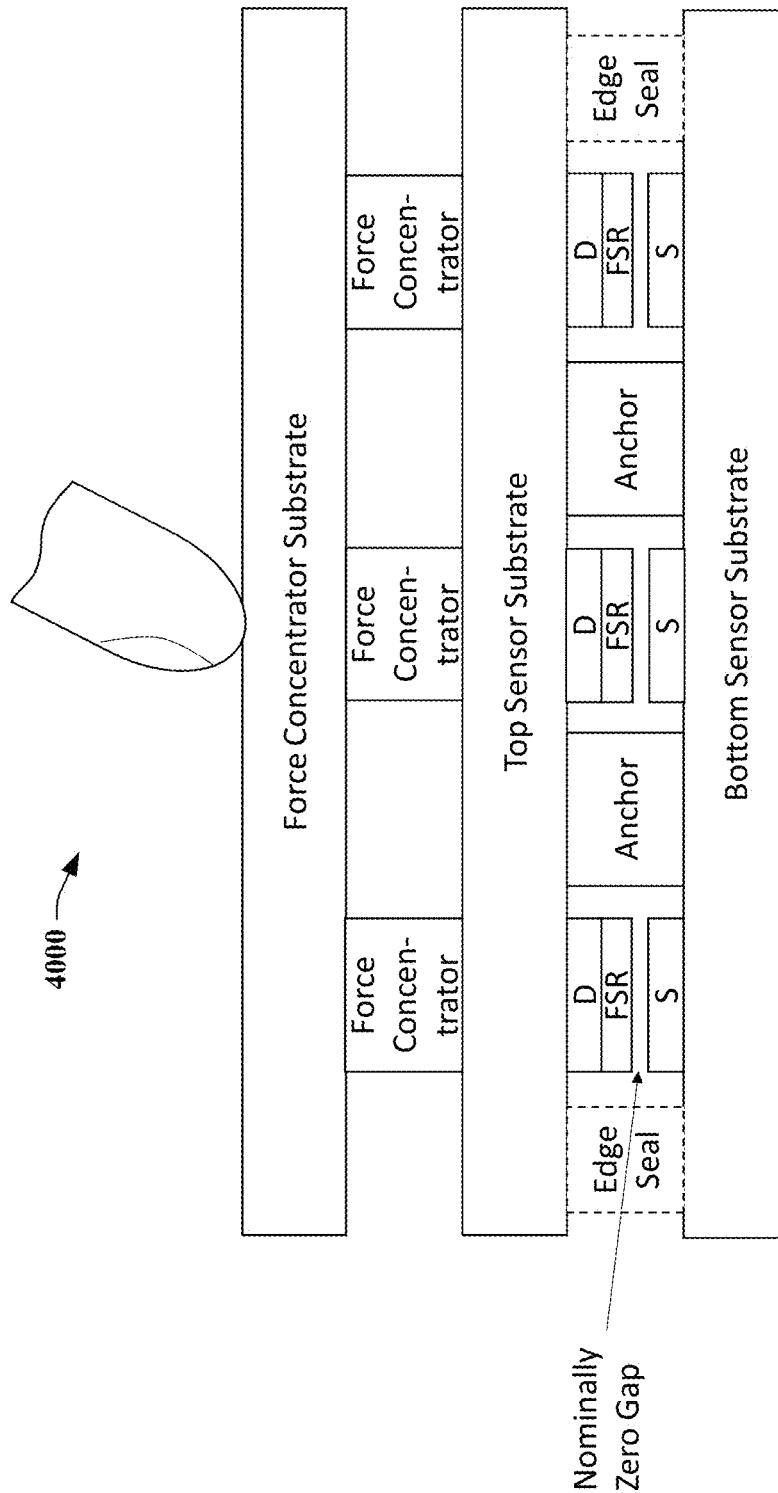

FIG. 40 illustrates an additional selectively adhered resistive force sensor device 4000 in accordance with one or more embodiments described herein. Selectively adhered resistive force sensor device 4000 can be a through mode force sensor resistive device and can comprise a force concentrator substrate, a top sensor substrate, and a bottom sensor substrate, wherein between the force concentrator substrate and the top sensor substrate can be patterned one or more force concentrating elements, and between the top sensor substrate and the bottom sensor substrate can be patterned one or more force sensor resistive elements, drive elements (D) and/or sense elements (S), and anchor elements. In this instance, the force sensor resistive elements can coat the drive elements and/or the sense elements. As illustrated, the drive elements and the sensor elements can be swapped, the drive elements and the sense elements can be patterned on the top sensor substrate, the force sensing resistive elements can be patterned on the bottom sensor substrate, and the force concentrators can be patterned on the top sensor substrate or the bottom sensor substrate. The force concentrating elements in some instances can be optional.

Figure 41:
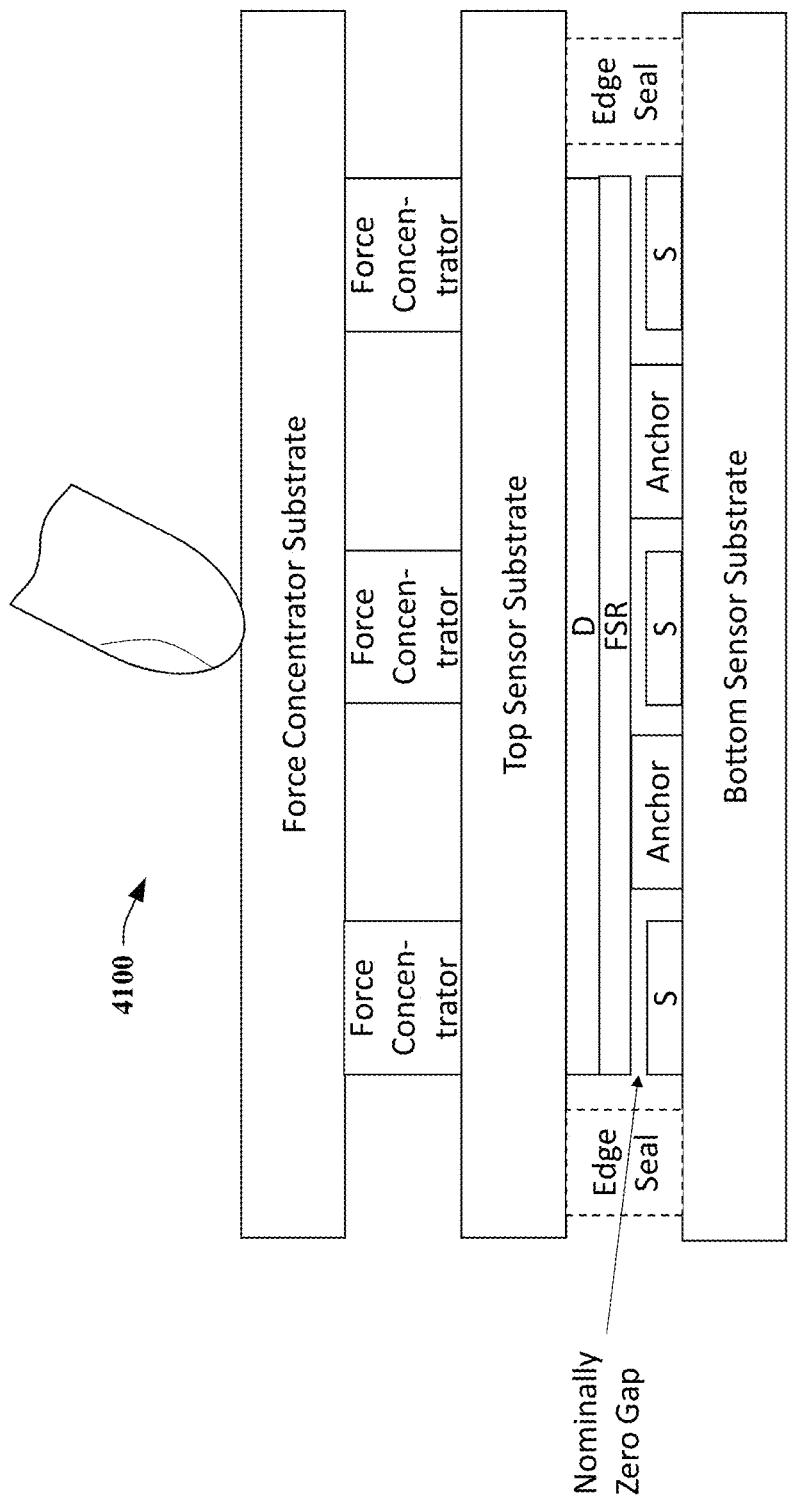

FIG. 41 illustrates an additional selectively adhered resistive force sensor device 4100 in accordance with one or more embodiments described herein. Selectively adhered resistive force sensor device 4100 can be a through mode force sensor resistive device and can comprise a force concentrator substrate, a top sensor substrate, and a bottom sensor substrate, wherein between the force concentrator substrate and the top sensor substrate can be patterned one or more force concentrating elements, and between the top sensor substrate and the bottom sensor substrate can be patterned one or more force sensor resistive elements, drive elements (D) and/or sense elements (S), and anchor elements. In this instance, the force sensor resistive elements can coat the drive elements and/or the sense elements. As illustrated, the drive elements and the sensor elements can be swapped, the drive elements and the sense elements can be patterned on the top sensor substrate, the force sensing resistive elements can be patterned on the bottom sensor substrate, and the force concentrators can be patterned on the top sensor substrate or the bottom sensor substrate. The force concentrating elements in some instances can be optional.

Figure 42:
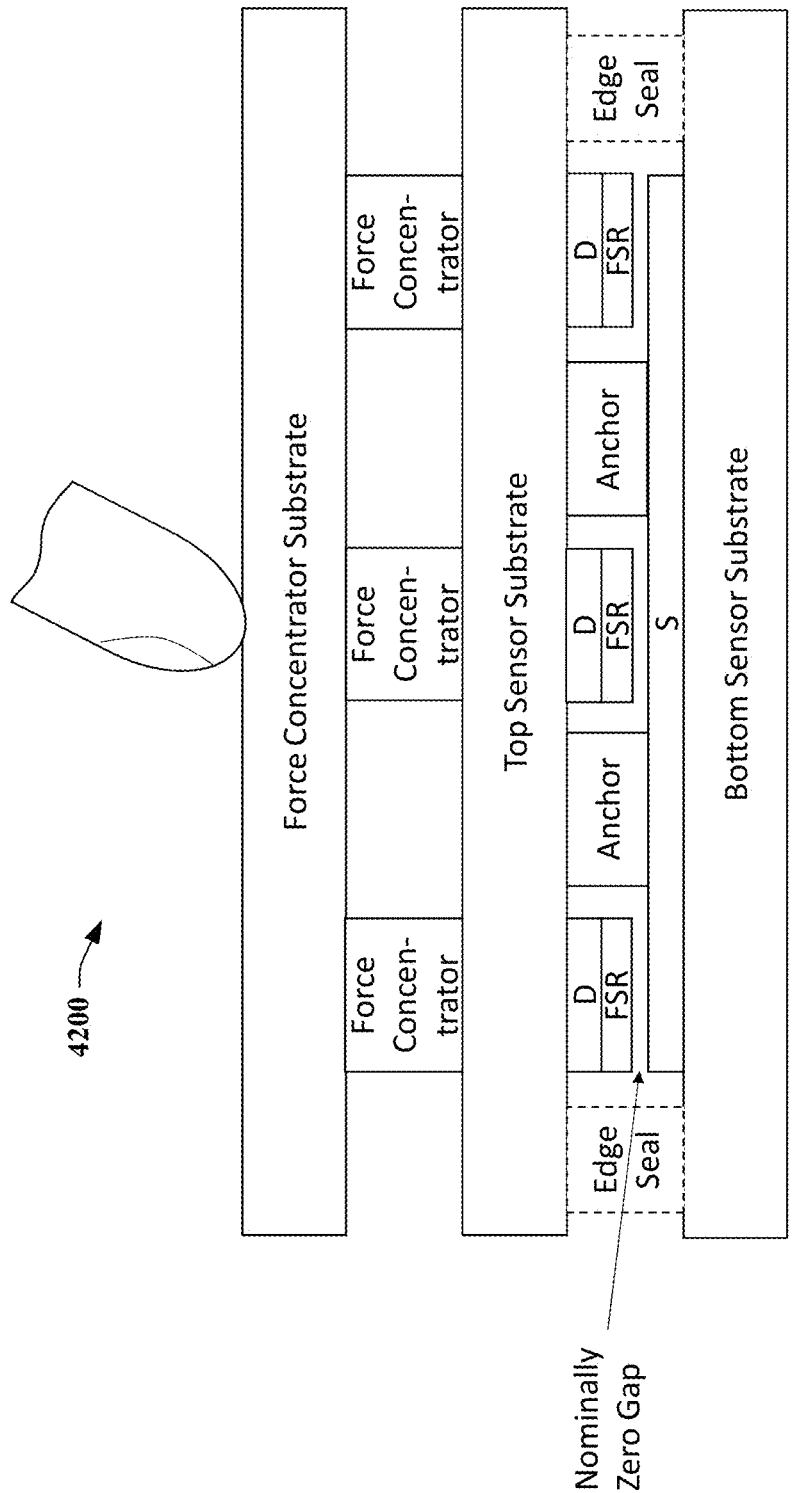

FIG. 42 illustrates an additional selectively adhered resistive force sensor device 4200 in accordance with one or more embodiments described herein. Selectively adhered resistive force sensor device 4200 can be a through mode force sensor resistive device and can comprise a force concentrator substrate, a top sensor substrate, and a bottom sensor substrate, wherein between the force concentrator substrate and the top sensor substrate can be patterned one or more force concentrating elements, and between the top sensor substrate and the bottom sensor substrate can be patterned one or more force sensor resistive elements, drive elements (D) and/or sense elements (S), and anchor elements. In this instance, the force sensor resistive elements can coat the drive elements and/or the sense elements. As illustrated, the drive elements and the sensor elements can be swapped, the drive elements and the sense elements can be patterned on the top sensor substrate, the force sensing resistive elements can be patterned on the bottom sensor substrate, and the force concentrators can be patterned on the top sensor substrate or the bottom sensor substrate. The force concentrating elements in some instances can be optional.

Figure 43:
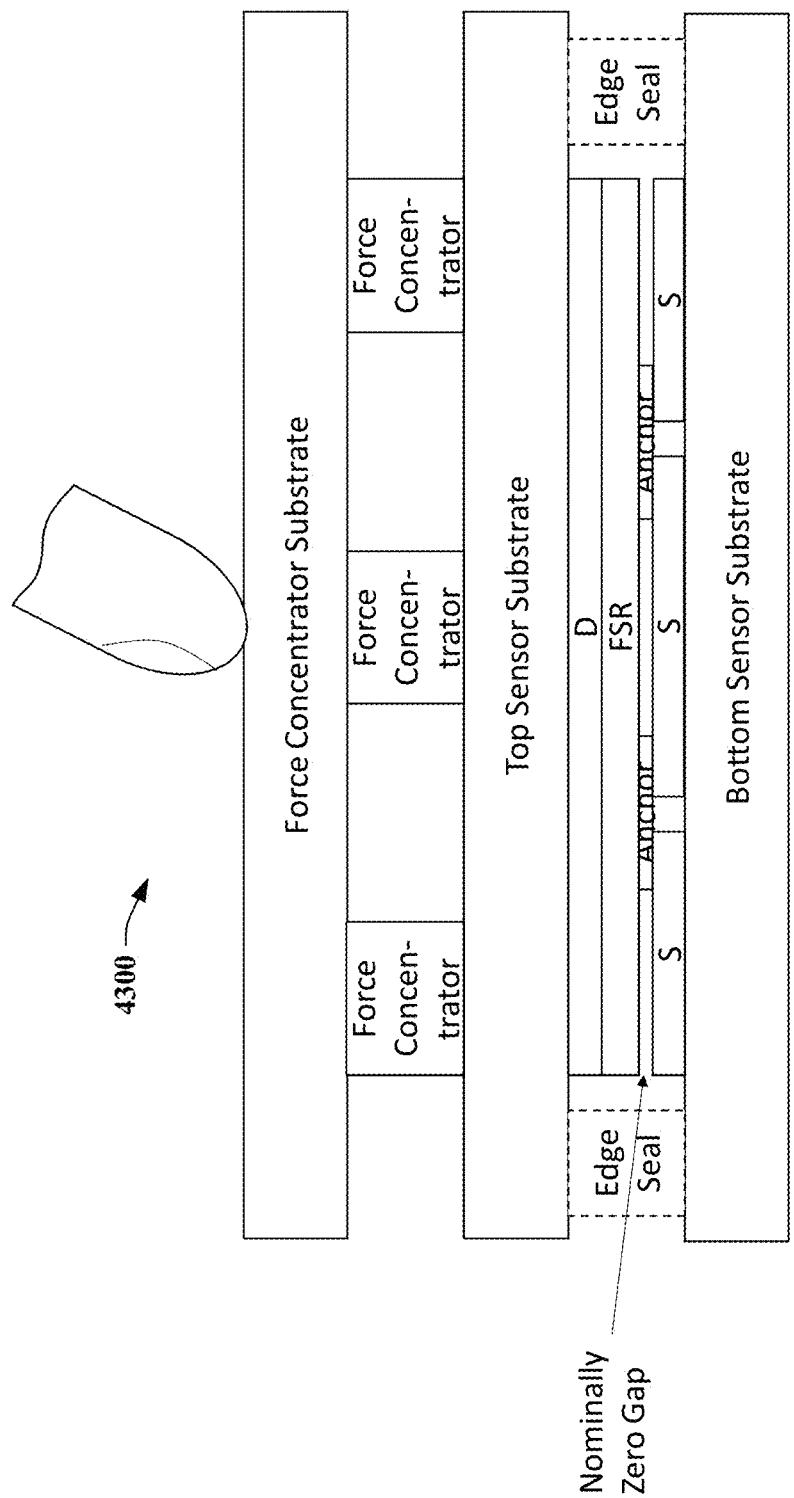

FIG. 43 illustrates an additional selectively adhered resistive force sensor device 4300 in accordance with one or more embodiments described herein. Selectively adhered resistive force sensor device 4300 can be a through mode force sensor resistive device and can comprise a force concentrator substrate, a top sensor substrate, and a bottom sensor substrate, wherein between the force concentrator substrate and the top sensor substrate can be patterned one or more force concentrating elements, and between the top sensor substrate and the bottom sensor substrate can be patterned one or more force sensor resistive elements, drive elements (D) and/or sense elements (S), and anchor elements. In this instance, the force sensor resistive elements can coat the drive elements and/or the sense elements. As illustrated, the drive elements and the sensor elements can be swapped, the drive elements and the sense elements can be patterned on the top sensor substrate, the force sensing resistive elements can be patterned on the bottom sensor substrate, and the force concentrators can be patterned on the top sensor substrate or the bottom sensor substrate. The force concentrating elements in some instances can be optional.

Figure 44:
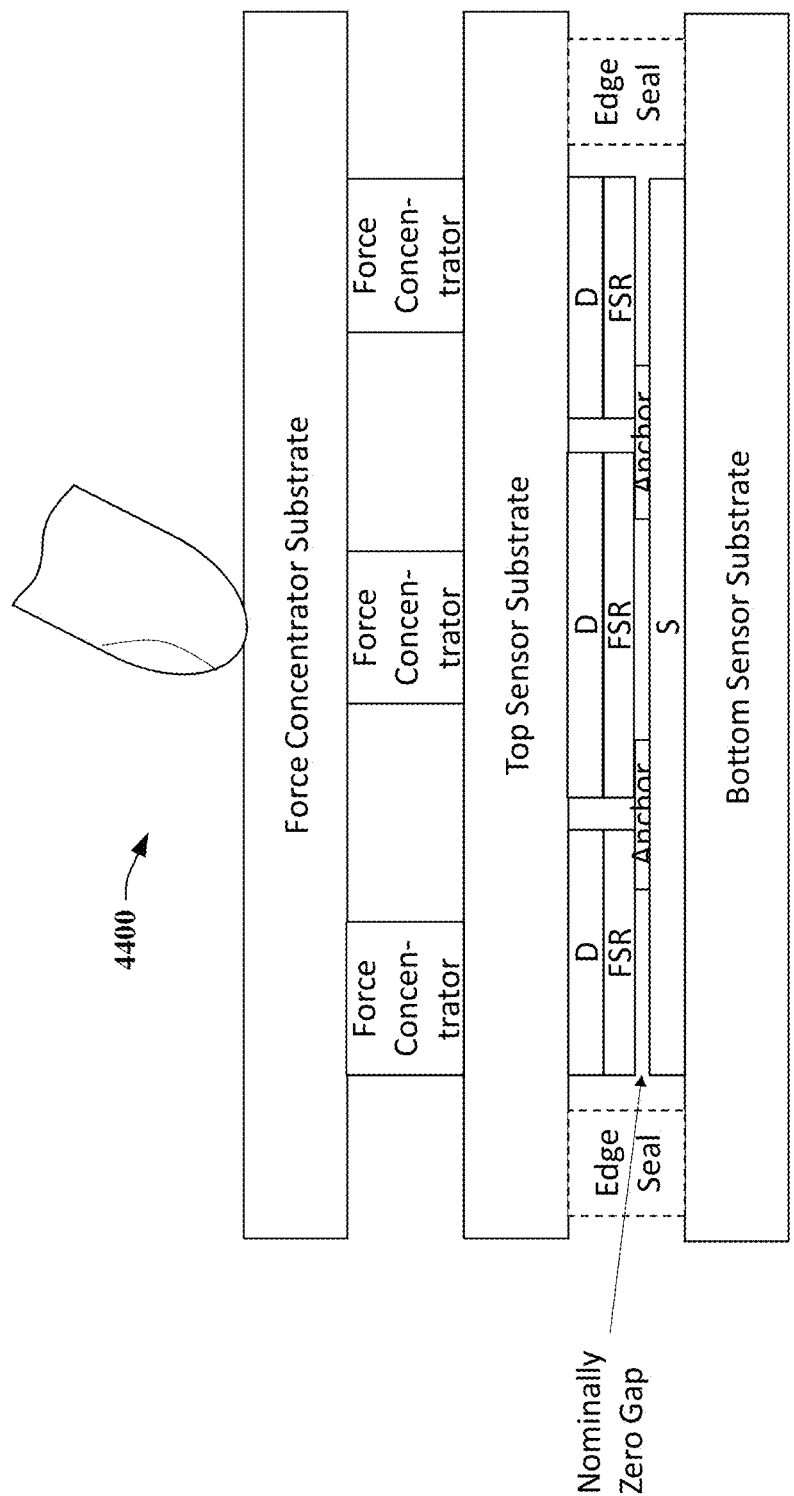

FIG. 44 illustrates an additional selectively adhered resistive force sensor device 4400 in accordance with one or more embodiments described herein. Selectively adhered resistive force sensor device 4400 can be a through mode force sensor resistive device and can comprise a force concentrator substrate, a top sensor substrate, and a bottom sensor substrate, wherein between the force concentrator substrate and the top sensor substrate can be patterned one or more force concentrating elements, and between the top sensor substrate and the bottom sensor substrate can be patterned one or more force sensor resistive elements, drive elements (D) and/or sense elements (S), and anchor elements. In this instance, the force sensor resistive elements can coat the drive elements and/or the sense elements. As illustrated, the drive elements and the sensor elements can be swapped, the drive elements and the sense elements can be patterned on the top sensor substrate, the force sensing resistive elements can be patterned on the bottom sensor substrate, and the force concentrators can be patterned on the top sensor substrate or the bottom sensor substrate. The force concentrating elements in some instances can be optional.

Figure 45:
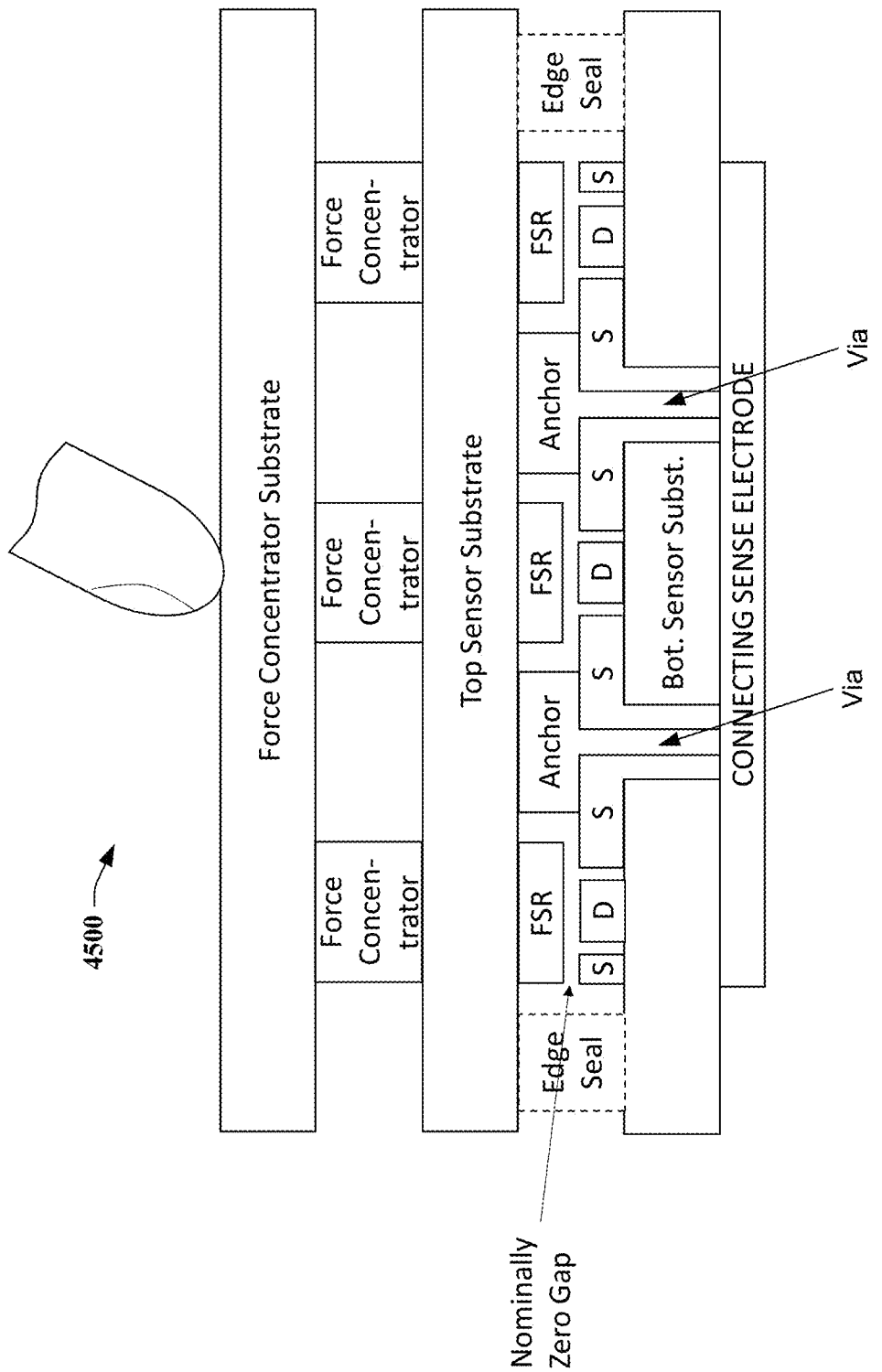

FIG. 45 illustrates a selectively adhered resistive force sensor device 4500 in accordance with various embodiments. Selectively adhered resistive force sensor device 4500 can comprise a force concentrator substrate, a top sensor substrate, a bottom sensor substrate, and a connecting sensor electrode. Between the force concentrator substrate and the top sensor substrate can be patterned force concentrating elements, and between the top sensor substrate and the bottom sensor substrate can be patterned edge seals, force sensor resistors, anchors, and sense elements and drive elements. A nominally zero gap can be located between the force sensor resistors and one or more of the sense elements (S) and the drive elements (D), the anchor elements can be in contact with one or more of the sense elements and/or drive elements, and a grouping of the sense elements or the drive elements, and anchor elements can be aligned with, and can be positioned to correspond with, one or more via formed in a printed circuit board. As has been noted above, where force concentrating elements are utilized, these can be patterned on the top sensor substrate or on the bottom sensor substrate.

Figure 46:
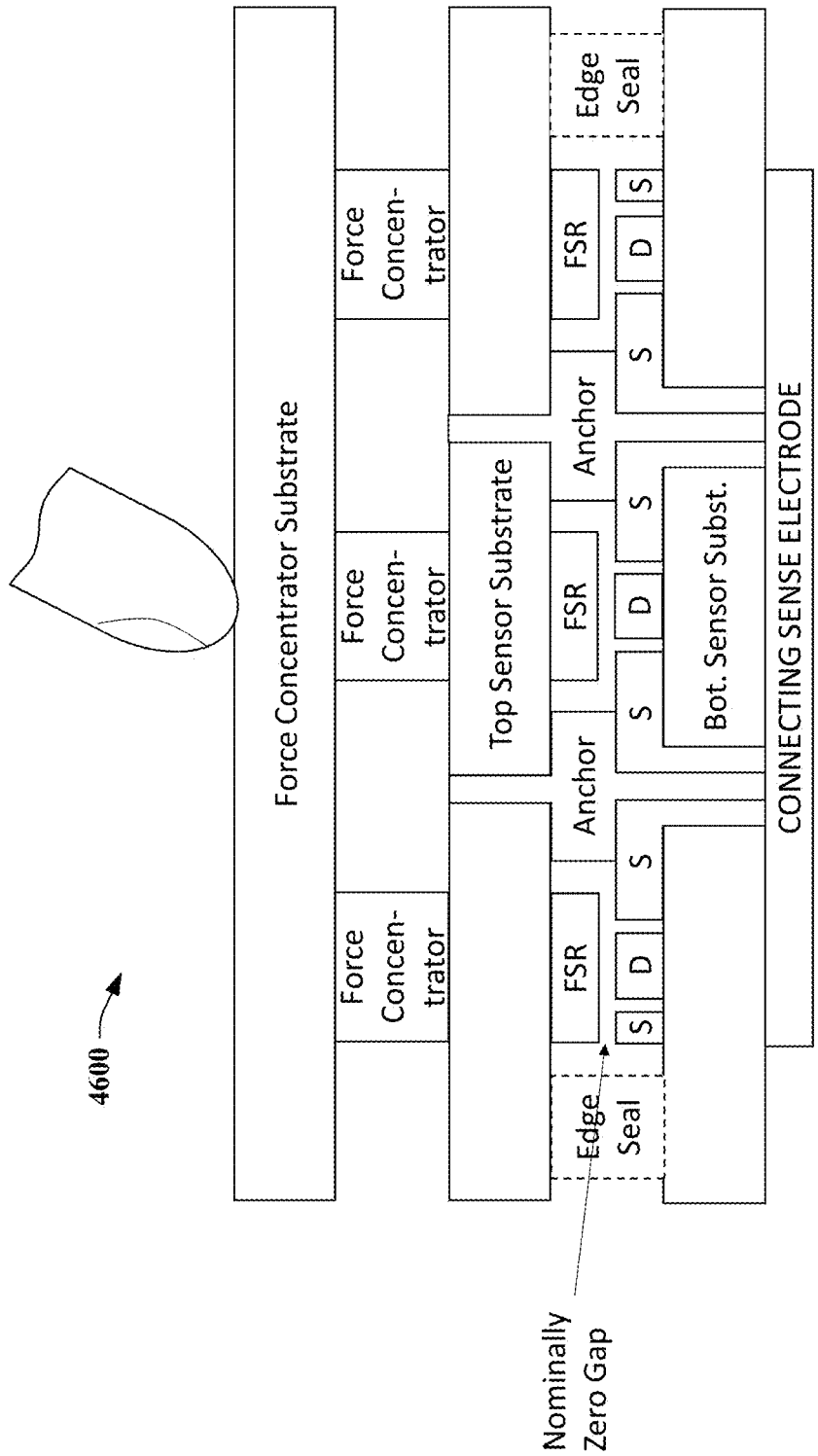

FIG. 46 illustrates a selectively adhered resistive force sensor device 4600 in accordance with various embodiments. Selectively adhered resistive force sensor device 4600 can comprise a force concentrator substrate, a top sensor substrate, a bottom sensor substrate, and a connecting sensor electrode. Between the force concentrator substrate and the top sensor substrate can be patterned force concentrating elements, and between the top sensor substrate and the bottom sensor substrate can be patterned edge seals, force sensor resistors, anchor elements, and sense elements and drive elements. A nominally zero gap can be located between the force sensor resistors and one or more of the sense elements (S) and the drive elements (D), the anchor elements can be in contact with one or more of the sense elements and/or drive elements, and a grouping of the sense elements or the drive elements, and anchor elements can be aligned with, and can be positioned to correspond with, one or more via formed in a printed circuit board. As has been noted above, where force concentrating elements are utilized, these can be patterned on the top sensor substrate or on the bottom sensor substrate.

Figure 47:
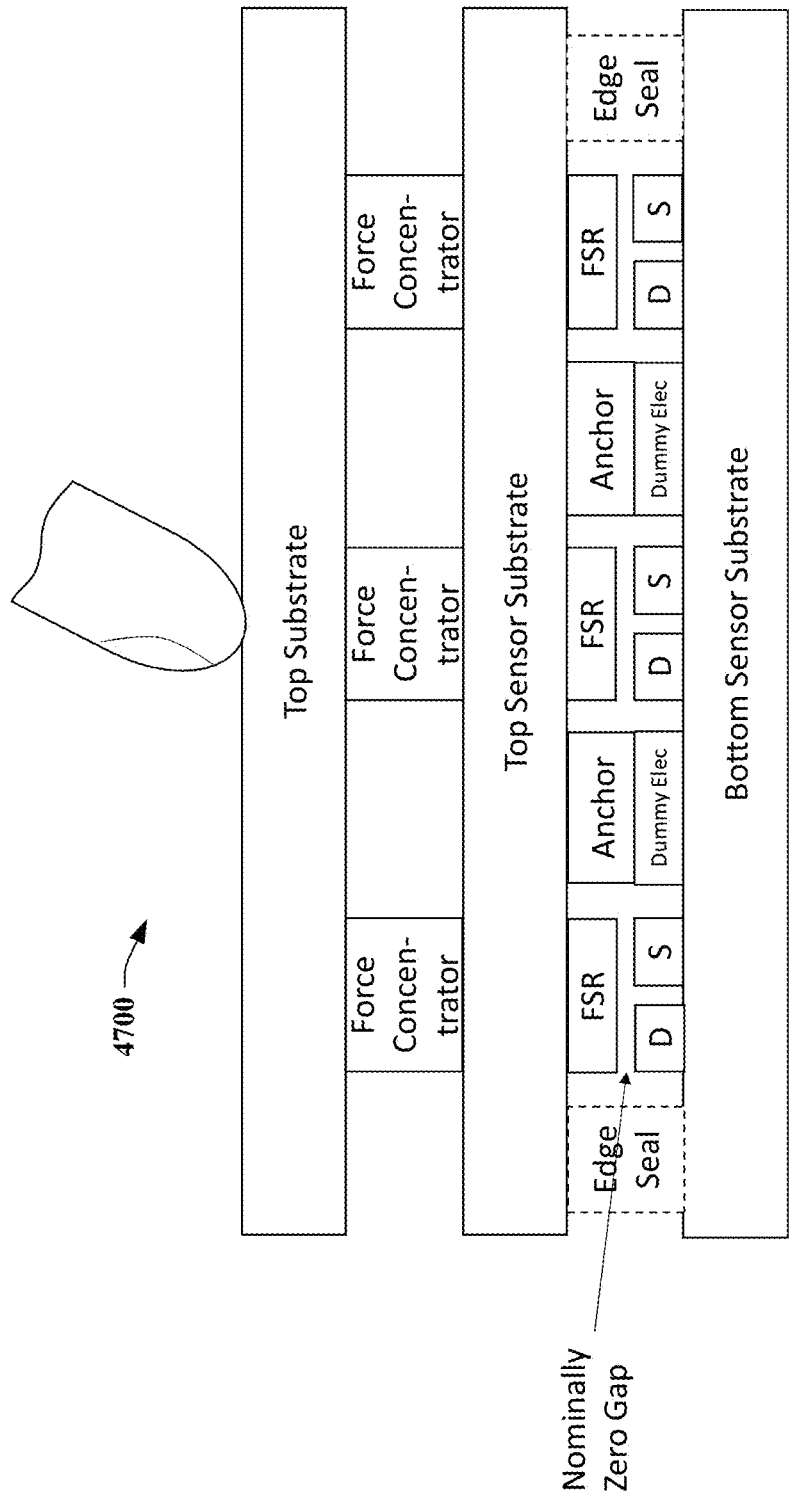

FIG. 47 illustrates a selectively adhered resistive force sensor device 4700 in accordance with various embodiments. Selectively adhered resistive force sensor device 4700 can comprise a force concentrator substrate, a top sensor substrate, and a bottom sensor substrate. Between the force concentrator substrate and the top sensor substrate can be patterned force concentrating elements, and between the top sensor substrate and the bottom sensor substrate can be patterned edge seals, force sensor resistors, anchors, and dummy elements, sense elements, and drive elements. A nominally zero gap can be located between the force sensor resistors and one or more of the sense elements (S) and the drive elements (D), the anchor elements can be coated with the dummy elements and can be in contact with the bottom sensor substrate. In regard to this embodiment, the drive elements and the sense elements can be swapped, the drive elements and the sense elements can be patterned on the top sensor substrate and the force sensor resistive elements can be patterned on the bottom sensor substrate. While force concentrators can be optional, where these are utilized, force concentrators can be positioned on the top of the top substrate or on the bottom of the bottom substrate.

Figure 48:
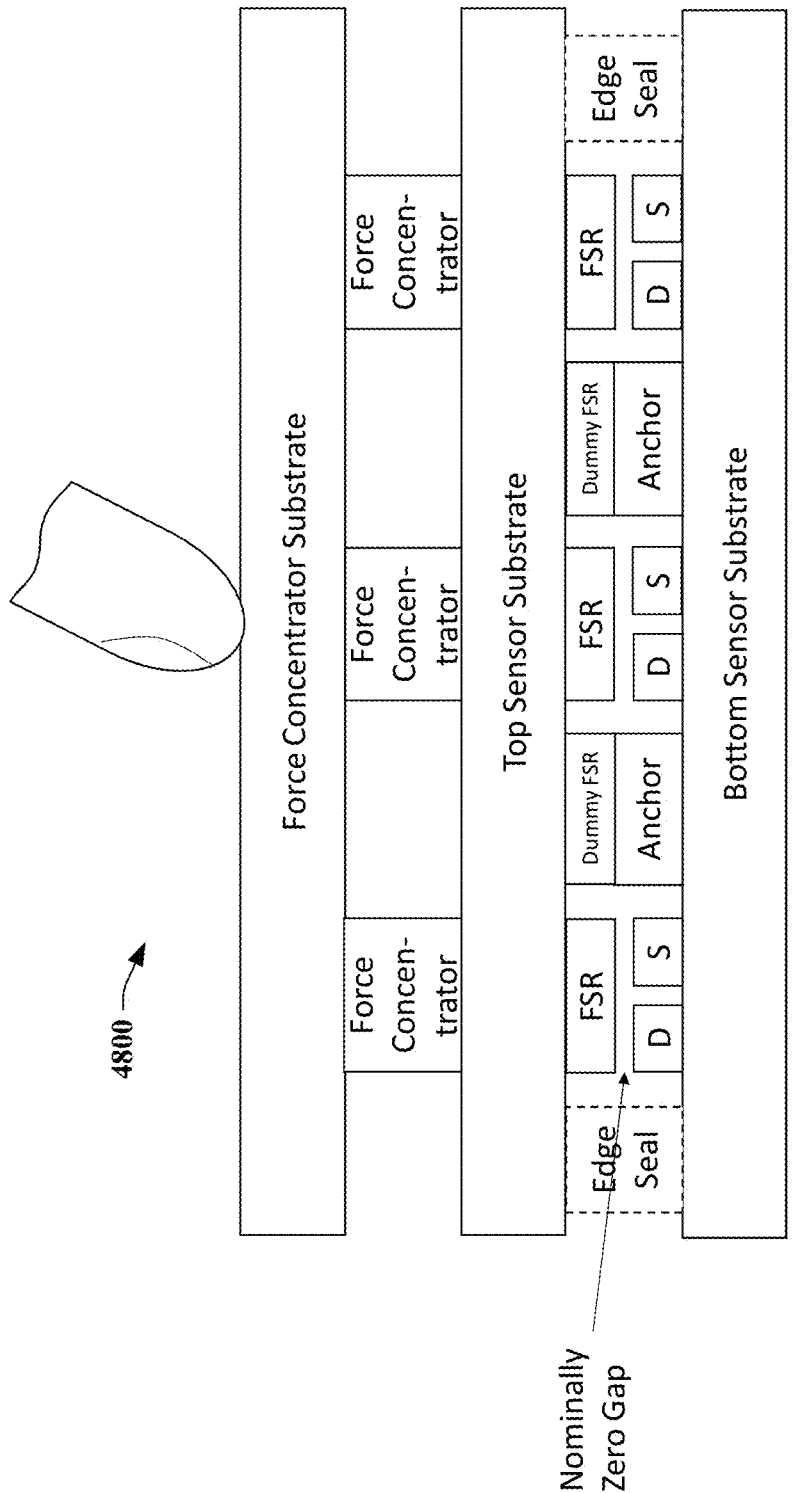

FIG. 48 illustrates a selectively adhered resistive force sensor device 4800 in accordance with various embodiments. Selectively adhered resistive force sensor device 4800 can comprise a force concentrator substrate, a top sensor substrate, and a bottom sensor substrate. Between the force concentrator substrate and the top sensor substrate can be patterned force concentrating elements, and between the top sensor substrate and the bottom sensor substrate can be patterned with edge seals, force sensor resistors, dummy force sensor resistors, anchors, and sense elements and drive elements. A nominally zero gap can be located between the force sensor resistors and one or more of the sense elements (S) and/or the drive elements (D), the anchor elements can be patterned with the dummy force sensor resistors which can be in contact with the top sensor substrate. In regard to this embodiment, the drive elements and the sense elements can be swapped, the drive elements and the sense elements can be patterned on the top sensor substrate and the force sensor resistive elements can be patterned on the bottom sensor substrate. Force concentrators can be optional, but where utilized, these can be patterned on the top of the top substrate or on the underside of the bottom substrate.

Figure 49:
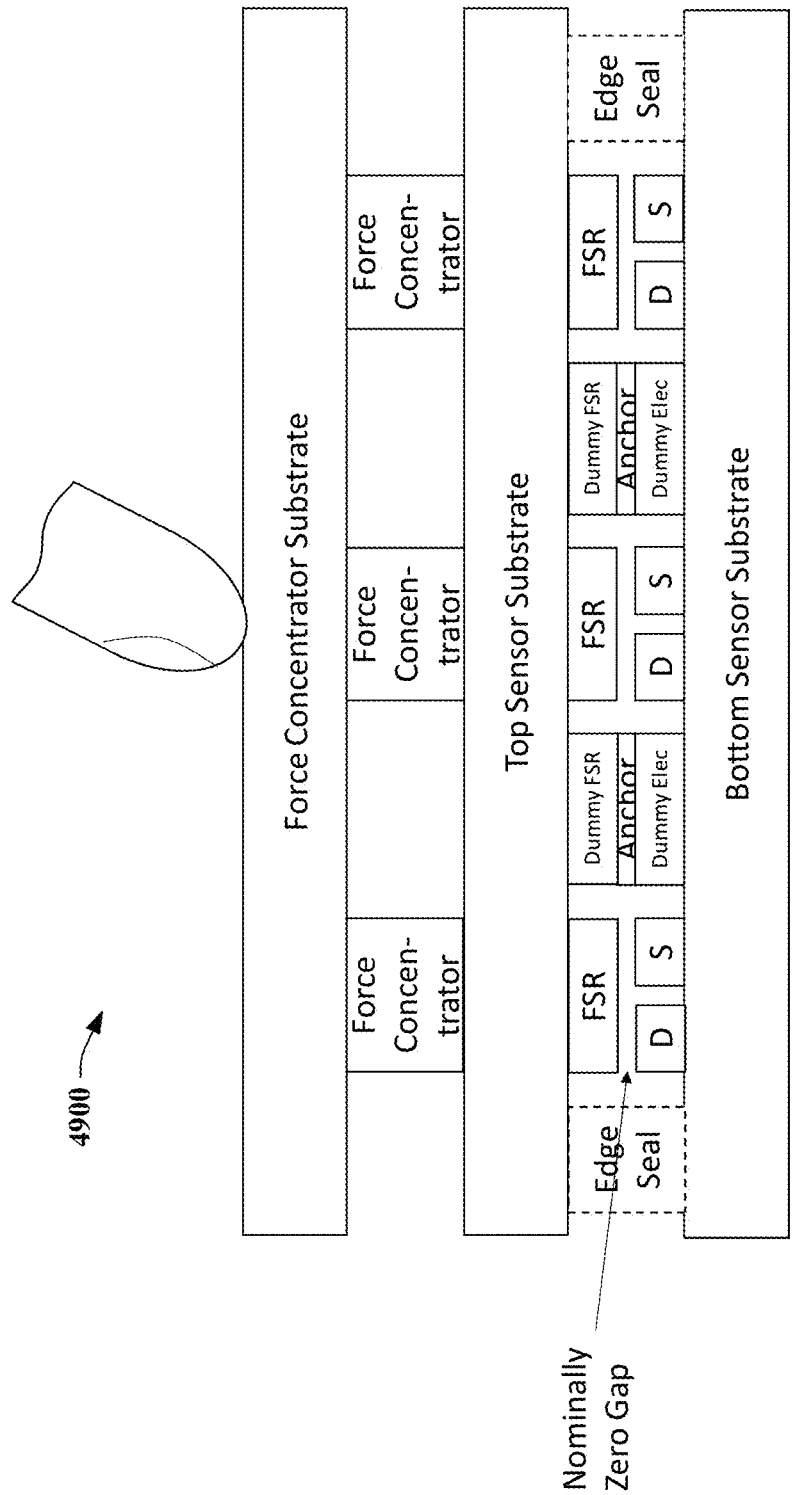

FIG. 49 illustrates a selectively adhered resistive force sensor device 4900 in accordance with various embodiments. Selectively adhered resistive force sensor device 4900 can comprise a force concentrator substrate, a top sensor substrate, and a bottom sensor substrate. Between the force concentrator substrate and the top sensor substrate can be patterned force concentrating elements, and between the top sensor substrate and the bottom sensor substrate can be patterned with edge seals, force sensor resistors, dummy force sensor resistors, anchors, and dummy elements, sense elements, and drive elements. A nominally zero gap can be located between the force sensor resistors and one or more of the sense elements (S) and/or the drive elements (D), the anchor elements can be patterned between dummy force sensor resistors and dummy elements. In regard to this embodiment, the drive elements and the sense elements can be swapped, the drive elements and the sense elements can be patterned on the top sensor substrate and the force sensor resistive elements can be patterned on the bottom sensor substrate. Force concentrators can be optional, but where utilized, these can be patterned on the top of the top substrate or on the underside of the bottom substrate.

In regard to FIGS. 47-49 it should be noted that the "dummy" elements can be used to provide a consistent height that matches the neighboring elements. "Dummy" elements can allow layers or substrates of disparate heights to have a definable height profile for ease of lamination of the various layers or substrates.

Figure 50:
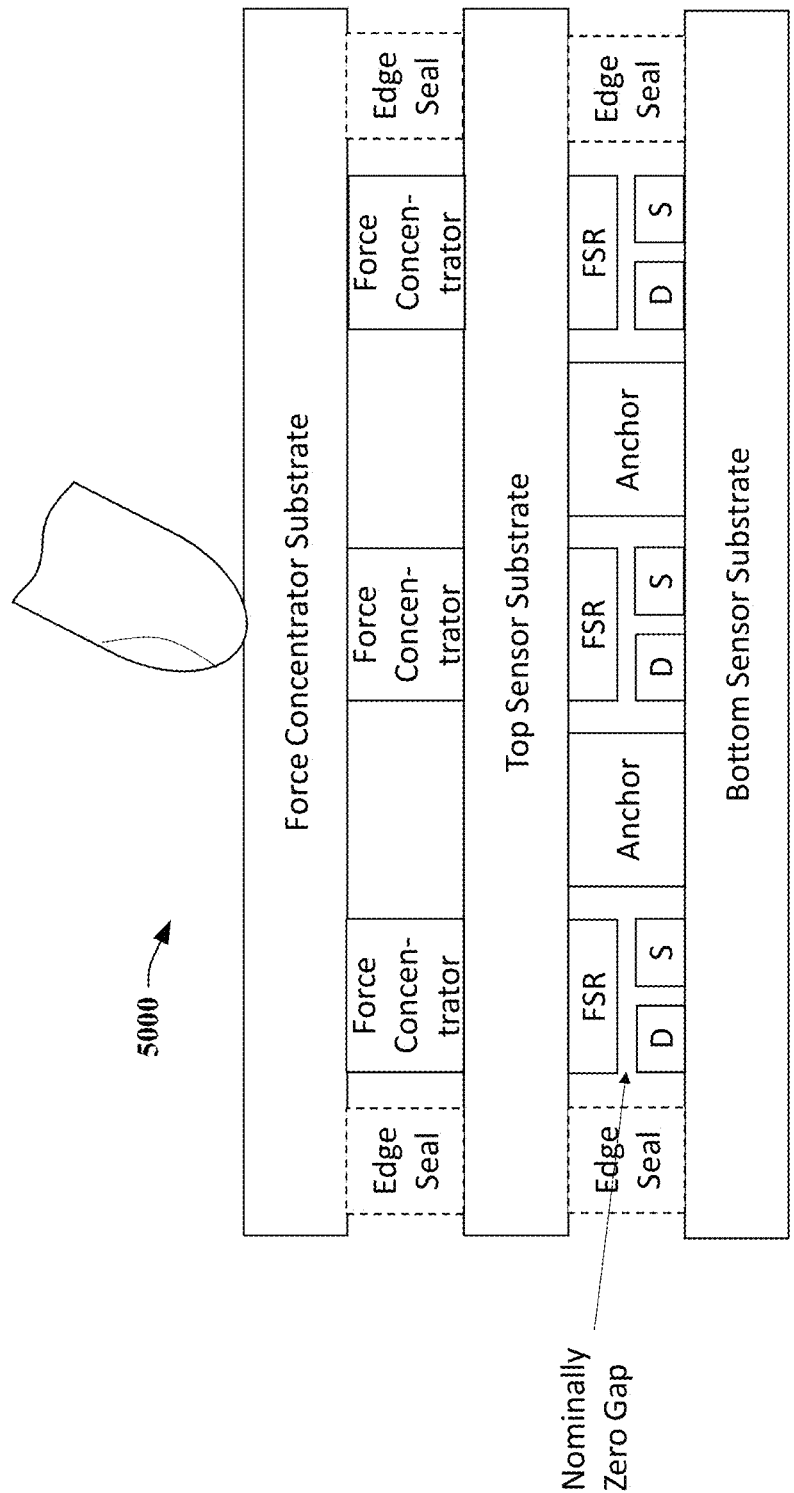

FIG. 50 illustrates a selectively adhered resistive force sensor device 5000 in accordance with various embodiments. Selectively adhered resistive force sensor device 5000 can comprise a force concentrator substrate, a top sensor substrate, and a bottom sensor substrate. Between the force concentrator substrate and the top sensor substrate can be patterned force concentrating elements and edge seals, and between the top sensor substrate and the bottom sensor substrate can be patterned with edge seals, force sensor resistors, anchors, and sense elements (S) and drive elements (D). A nominally zero gap can be located between the force sensor resistors and one or more of the sense elements (S) and/or the drive elements (D).

Figure 51:
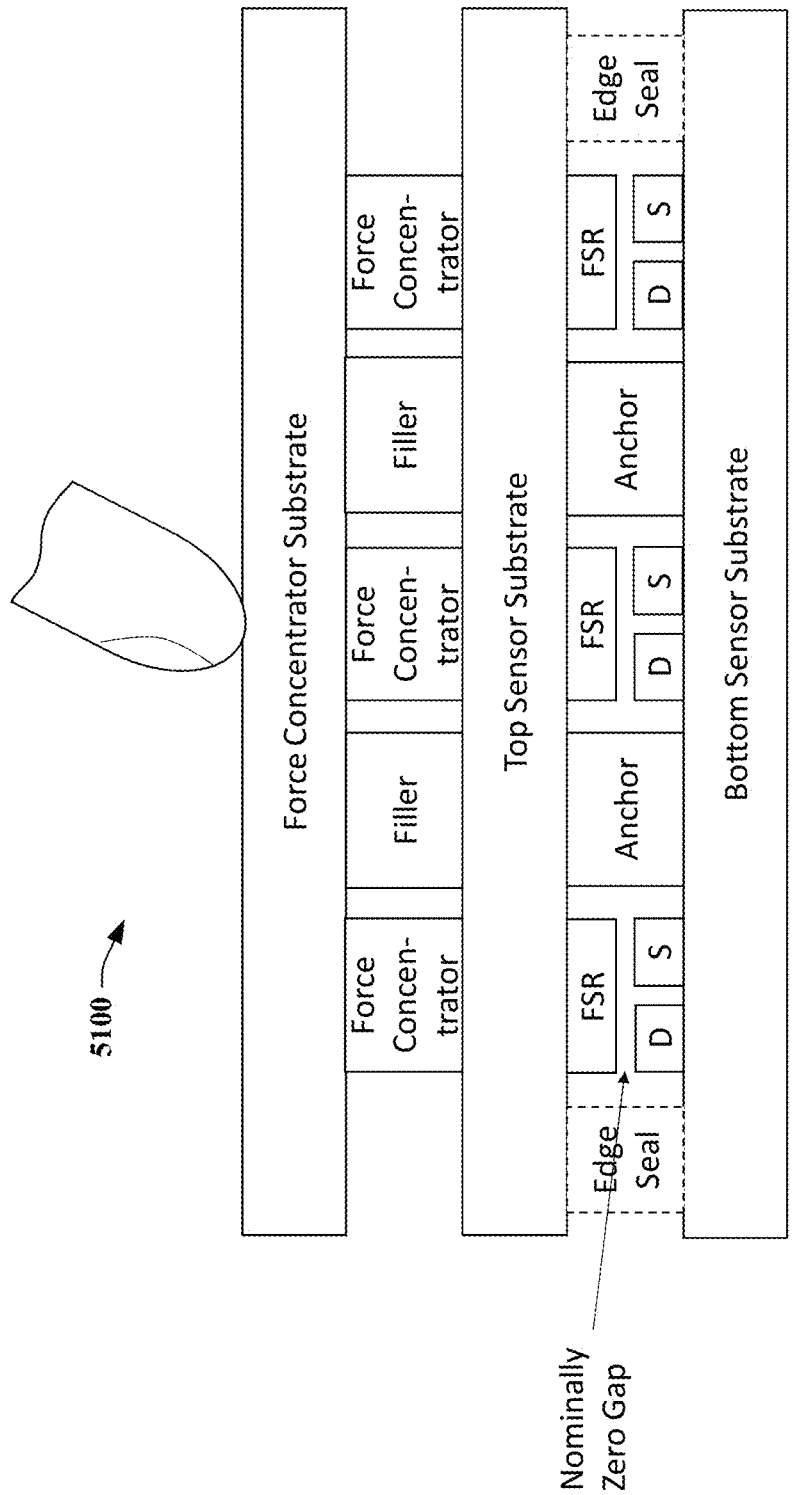

FIG. 51 illustrates a selectively adhered resistive force sensor device 5100 in accordance with various embodiments. Selectively adhered resistive force sensor device 5100 can comprise a force concentrator substrate, a top sensor substrate, and a bottom sensor substrate. Between the force concentrator substrate and the top sensor substrate can be patterned force concentrating elements and filler (e.g., glass beads, . . . ), and between the top sensor substrate and the bottom sensor substrate can be patterned with edge seals, force sensor resistors, anchors, and sense elements (S) and drive elements (D). A nominally zero gap can be exist between the force sensor resistors and one or more of the sense elements (S) and/or the drive elements (D).

Figure 52:
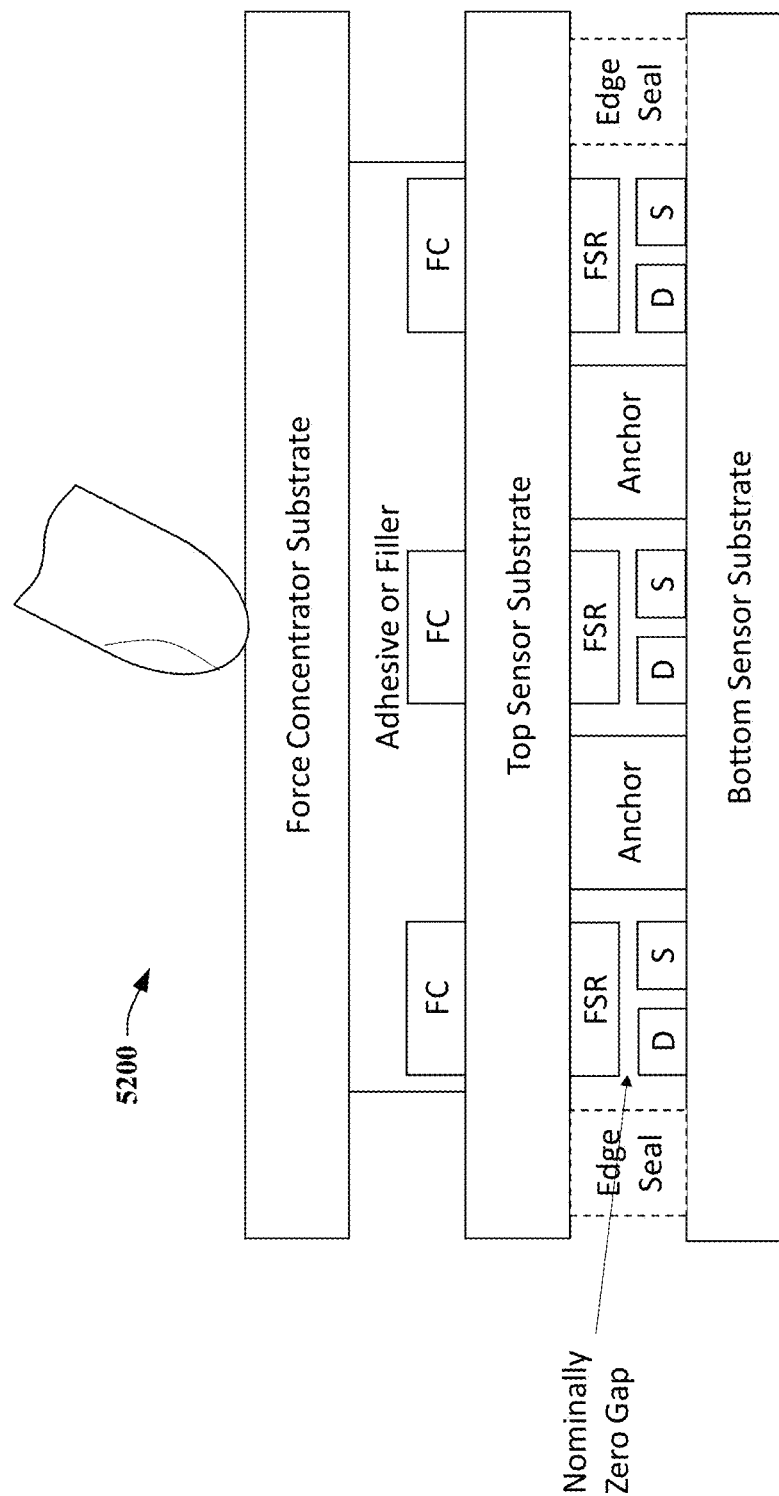

FIG. 52 illustrates a selectively adhered resistive force sensor device 5200 in accordance with various embodiments. Selectively adhered resistive force sensor device 5200 can comprise a force concentrator substrate, a top sensor substrate, and a bottom sensor substrate. Between the force concentrator substrate and the top sensor substrate can be patterned force concentrating elements set within a filler (e.g., glass beads, . . . ) and/or a soft adhesive that can coat and fill in the gaps between the force concentrating elements, and between the top sensor substrate and the bottom sensor substrate can be patterned with edge seals, force sensor resistors, anchors, and sense elements (S) and drive elements (D). A nominally zero gap can be exist between the force sensor resistors and one or more of the sense elements (S) and/or the drive elements (D). In regard to the filler and/or soft adhesive surrounding the force concentrating elements, the adhesive or filler can be formed above, below, and/or around (both above and below) the force concentrating elements.

Figure 53:
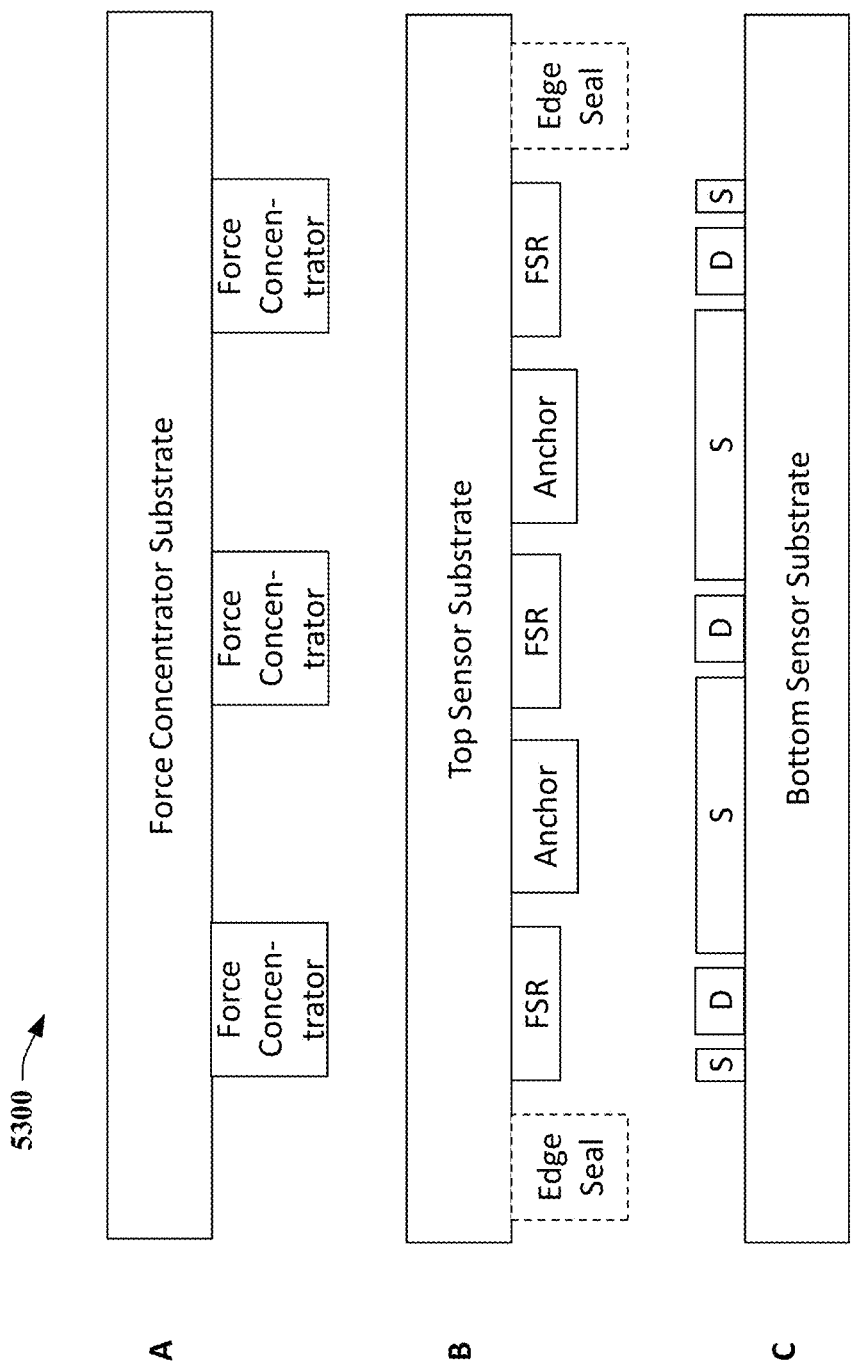
Figure 54:
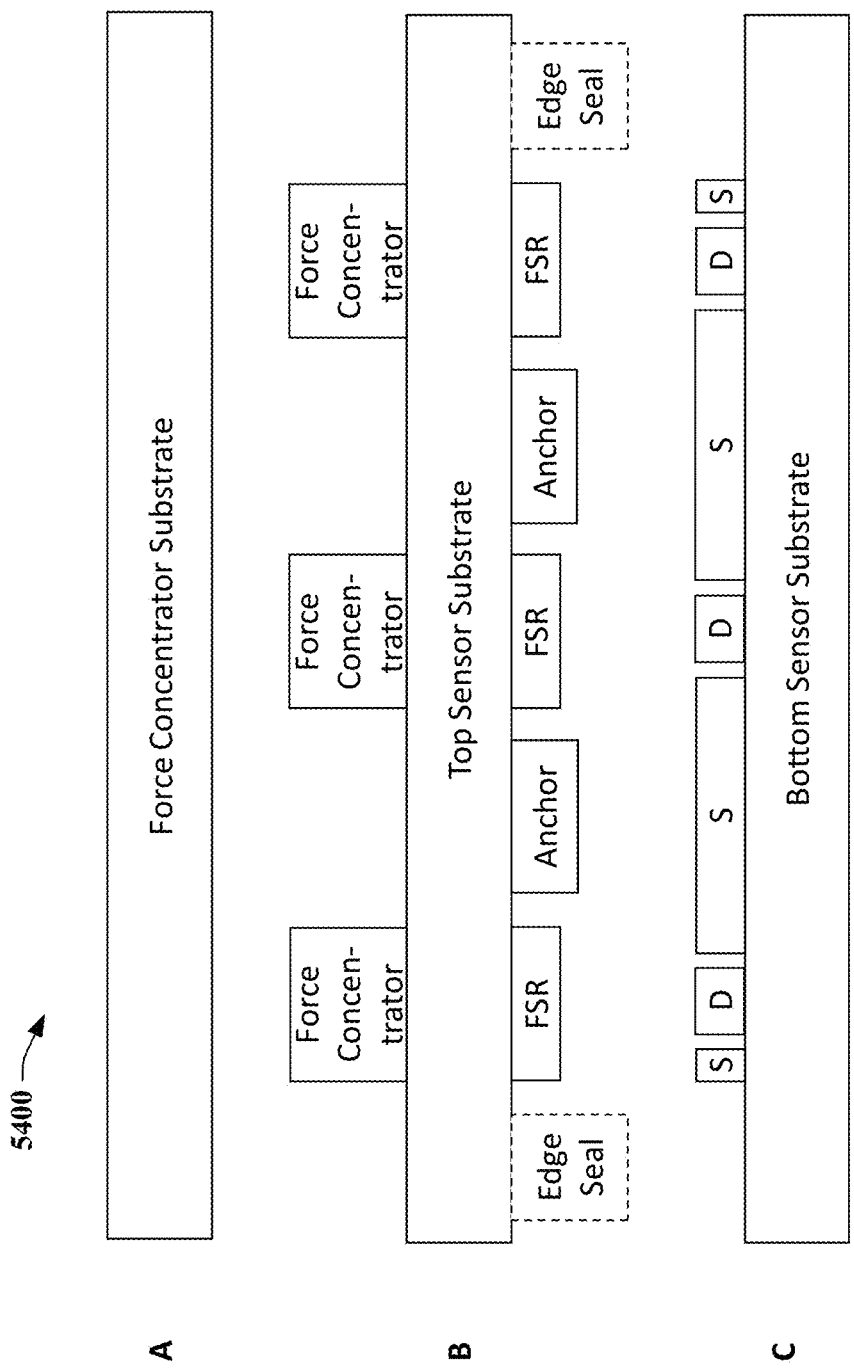
Figure 55:
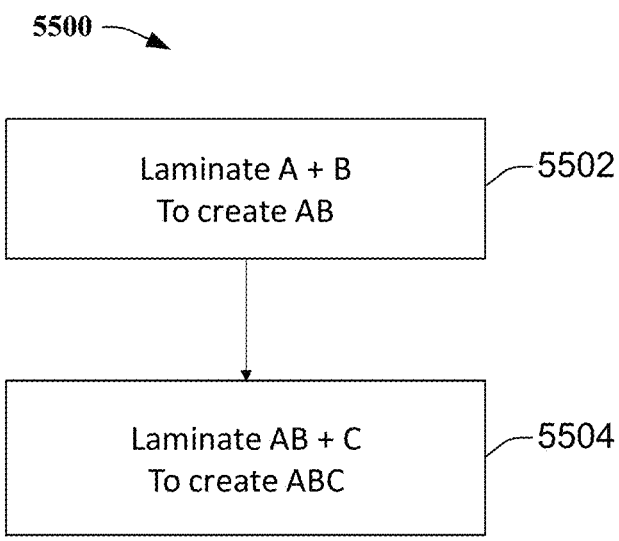
FIGS. 55-57 illustrate methods for assembling the selectively adhered resistive force sensor devices in accordance with various disclosed embodiments set forth in subject disclosure.
Figure 56:
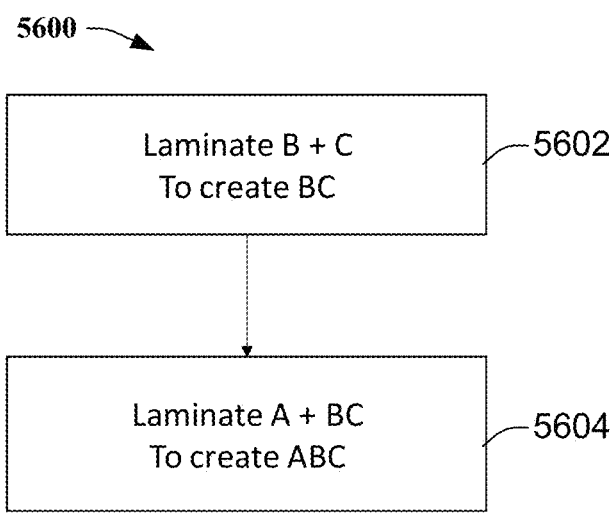
Figure 57:
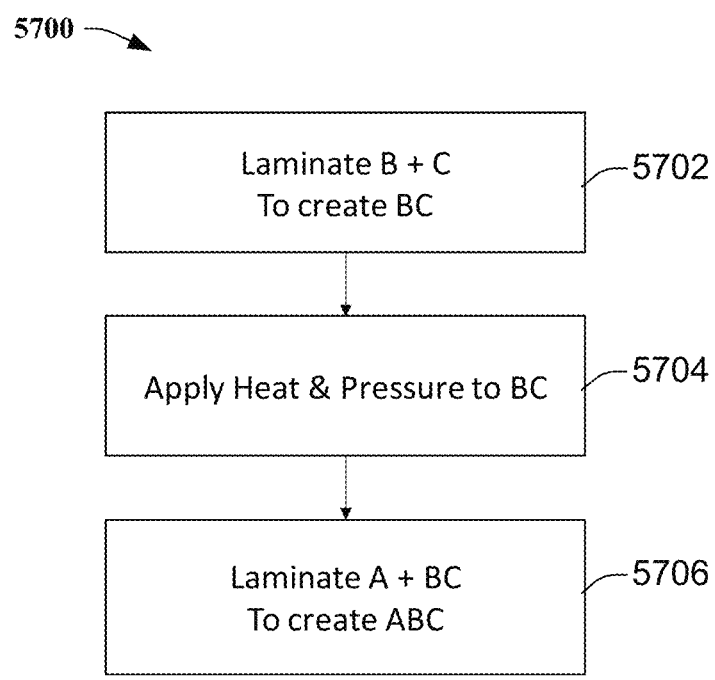

FIGS. 53 and 54 when read in conjunction with the methods illustrated in FIGS. 55-57 provide assembly processes to fabricate the various selectively adhered resistive force sensors disclosed in the subject application. FIG. 53 illustrates three component parts (A-C) comprising a force concentrator substrate (A) comprising force concentrating elements, a top sensor substrate (B) comprising force sensor resistive elements, anchors, and/or edge seals, and a bottom sensor substrate (C) comprising sensor elements (S) and drive elements (D). FIG. 54 illustrates an additional and/or alternative representation of the three component parts (A-C) comprising a force concentrator substrate (A), a top sensor substrate (B) comprising force concentrating elements patterned on a top surface of the top sensor substrate and force sensor resistive elements and anchor elements patterned on an underside of the top sensor substrate, and a bottom sensor substrate (C) comprising sense elements (S) and drive elements (D) patterned on a top surface of the bottom sensor substrate.

FIG. 55 illustrates a methodology 5500 for fabricating the variously disclosed selectively adhered resistive force sensors in accordance with one or more embodiments. Methodology 5500 can commence at 5502 wherein the force concentrator substrate (A) illustrated in FIGS. 53 and/or 54 can be laminated to the top sensor substrate (B) to create a laminated force concentrator substrate/top sensor substrate (AB). At 5504 the laminated force concentrator substrate/top sensor substrate (AB) can be further laminated with the bottom sensor substrate (C) for form a laminate comprising force concentrator substrate (A), top sensor substrate (B), and bottom sensor substrate (C).

FIG. 56 illustrates another methodology 5600 for fabricating the disclosed selectively adhered resistive force sensors in accordance with one or more embodiments. Method 5600 can commence at act 5602 wherein the top sensor substrate (B) can be laminated to bottom sensor substrate (C) to form a laminate comprising top sensor substrate and bottom sensor substrate (BC). At 5604 the laminate comprising top sensor substrate (B) and bottom sensor substrate (C) can then be laminated to force concentrator substrate (A) to form a laminate (ABC) comprising force concentrator substrate (A), top sensor substrate (B) and bottom sensor substrate (C).

FIG. 57 illustrates a further methodology 5700 for fabricating the disclosed selectively adhered resistive force sensors in accordance with one or more embodiments. Method 5700 can commence at act 5702 wherein the top sensor substrate (B) can be laminated to bottom sensor substrate (C) to form a laminate comprising top sensor substrate and bottom sensor substrate (BC). At 5704 heat and pressure can be applied to the laminate comprising top sensor substrate (B) and bottom sensor substrate (C). At 5706 the laminate comprising the top sensor substrate (B) and the bottom sensor substrate (C) can then be laminated to force concentrator substrate (A) to form a laminate (ABC) comprising force concentrator substrate (A), top sensor substrate (B) and bottom sensor substrate (C).

Figure 59:
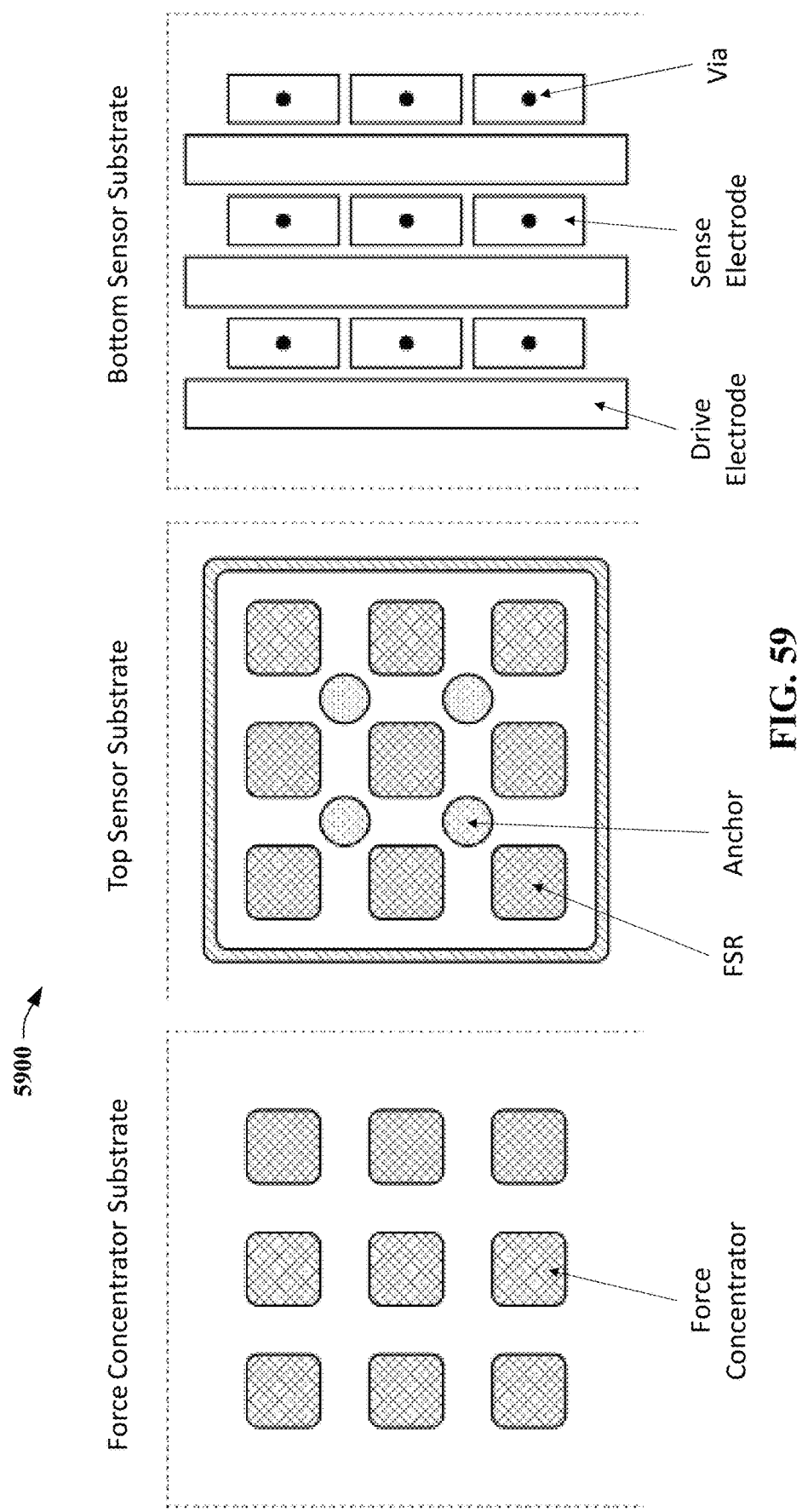

In regard to FIGS. 58-59 depicted is an overhead view 5800 of a force concentrator substrate, overlaid over a top sensor substrate, which in turn can be overlaid over a bottom sensor substrate. As illustrated in FIG. 59 the force concentrator substrate can comprise an array of force concentrating elements, the top sensor substrate can comprise force resistive elements and anchor elements positioned on the top sensor substrate, and the bottom sensor substrate can comprise drive electrodes, sense electrodes, that can align with one or more via that can have been formed in an underlying printed circuit board. In the context of FIG. 59, it should be noted that a ring seal (or edge seal) can be optional. In regard to FIG. 58 the overhead view (e.g., depicted on the left hand side of the illustration) can correspond to selectively adhered resistive force sensor 3300 illustrated in FIG. 33.

Figure 61:
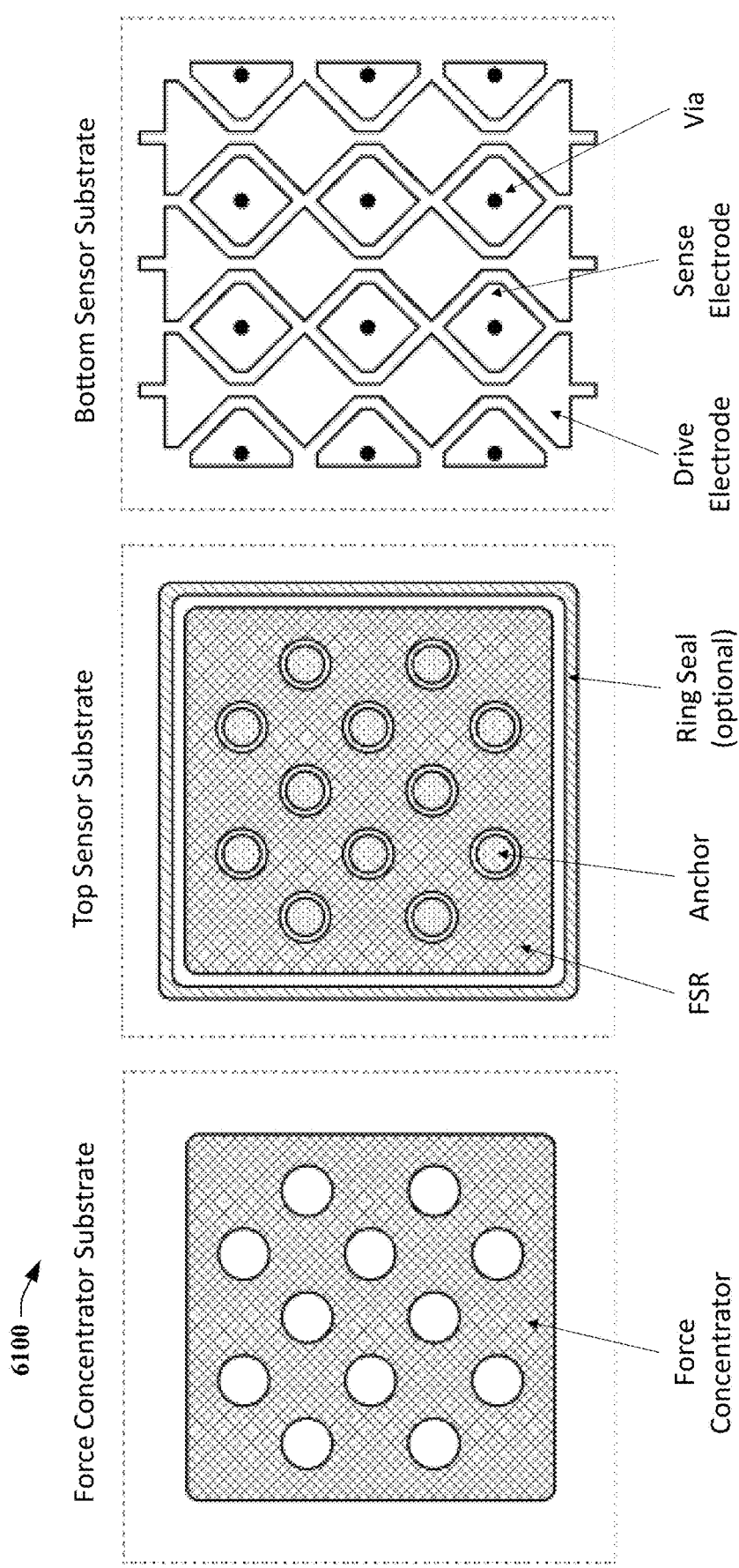

In regard to FIGS. 60-61 depicted is an overhead view 6000 of a force concentrator substrate, overlaid over a top sensor substrate, which in turn can be overlaid over a bottom sensor substrate. As illustrated in FIG. 60 force concentrator substrate can comprise a force concentrating fabric that can include voids. The top sensor substrate can comprise a matrix of force sensitive resistive (FSR) elements and anchor elements, wherein the anchor elements can be located/positioned to correspond with the voids included in the force concentrating fabric of force concentrator substrate. The bottom sensor substrate can comprise drive electrodes and sense electrodes that can be aligned with one or more via that can have been formed in an underlying printed circuit board. It will be observed that the drive electrodes and the sense electrodes can be patterned to form a diamond pattern. In the context of FIG. 61, it should be noted that the illustrated ring seal (or edge seal) can be optional. In regard to FIG. 60 the overhead view (e.g., depicted on the left hand side of the illustration) can correspond to selectively adhered resistive force sensor 3500 illustrated in FIG. 35.

Figure 62:
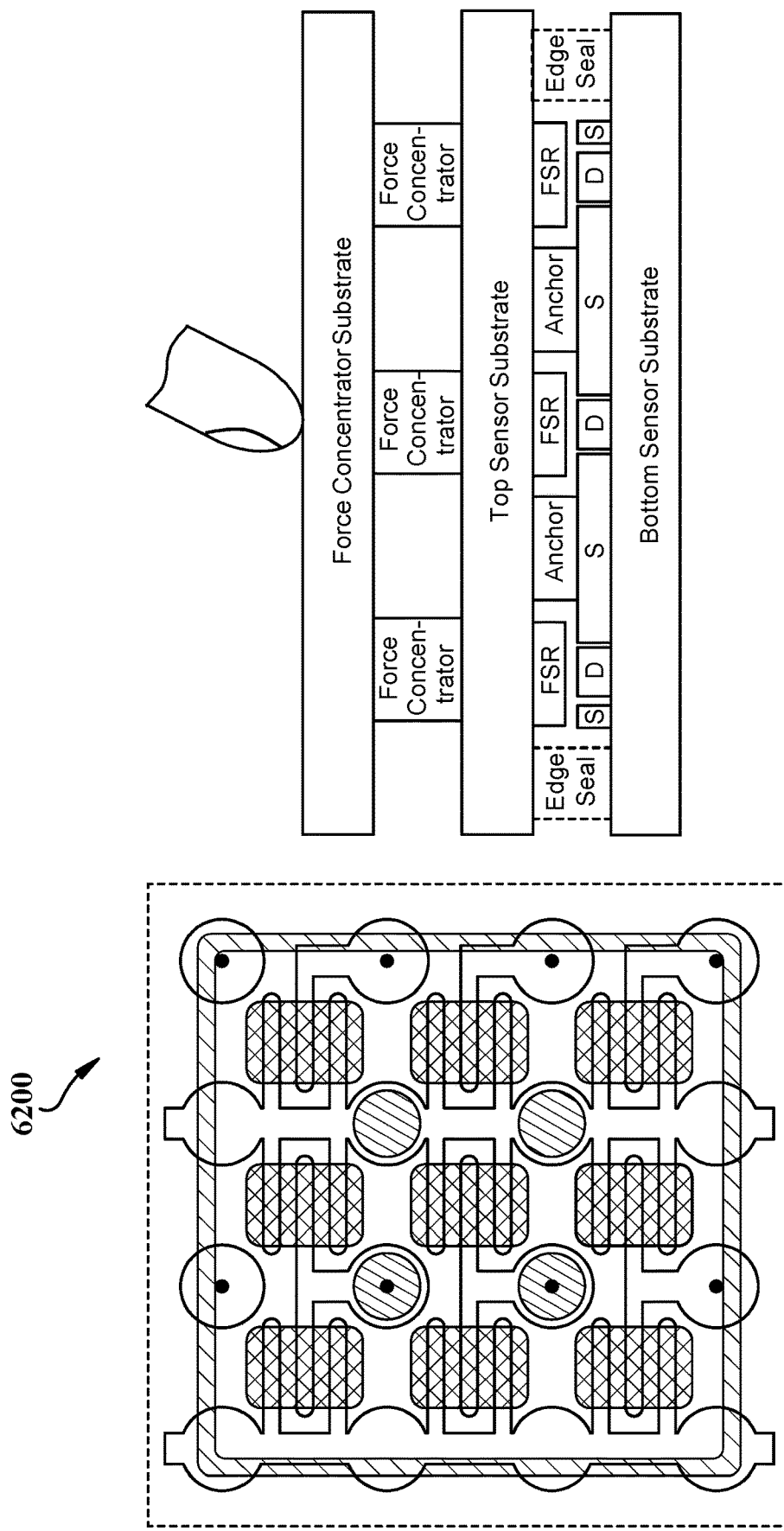
Figure 63:
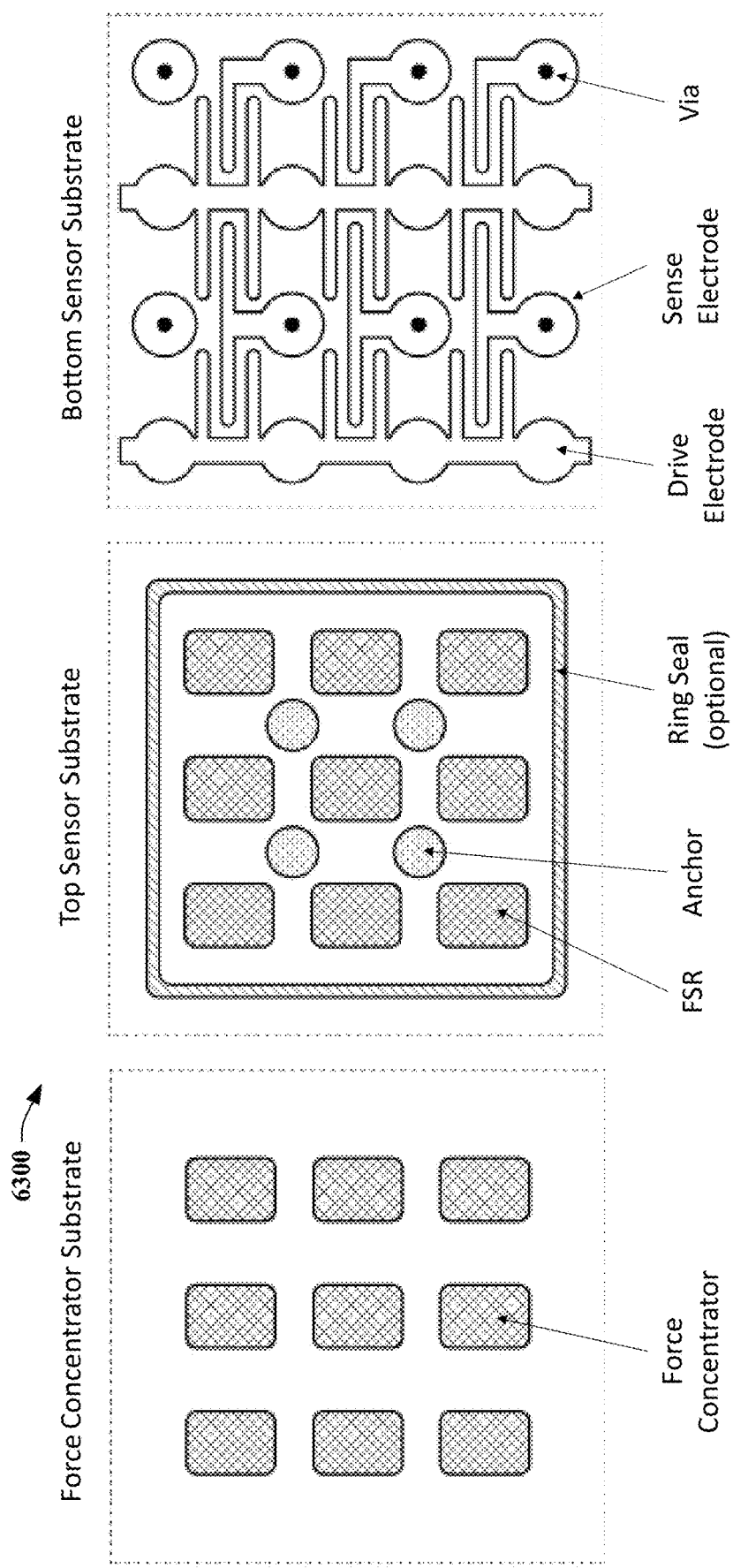

FIGS. 62-63 illustrate an overhead view 6200 of a force concentrator substrate, overlaid over a top sensor substrate, which in turn can be overlaid over a bottom sensor substrate. As illustrated in FIG. 62 the force concentrator substrate can comprise a grouping of force concentrating elements. The top sensor substrate can comprise a variously arranged group of force sensitive resistive (FSR) elements and a variously arranged group of anchor elements. The bottom sensor substrate can comprise drive electrodes and sense electrodes positioned to correspond with one or more via that can have been formed on an underlying printed circuit board. It will be observed that the drive electrodes and the sense electrodes can be patterned to form an interdigitated pattern. In the context of FIG. 63, it should be noted that the illustrated ring seal (or edge seal) can be optional. In regard to FIG. 62 the overhead view (e.g., depicted on the left hand side of the illustration) can correspond to selectively adhered resistive force sensor 3500 illustrated in FIG. 35.

Figure 64:
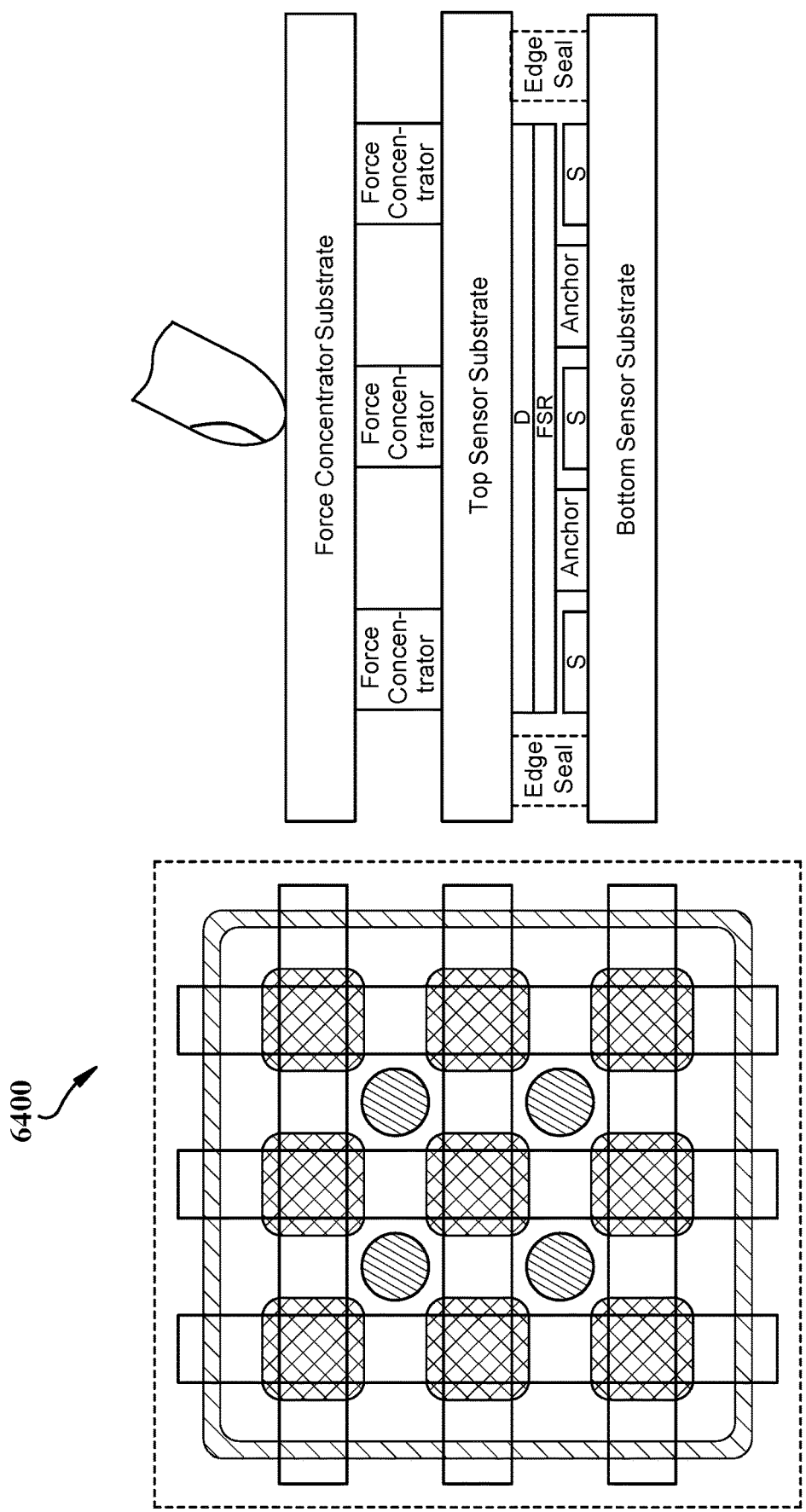
Figure 65:
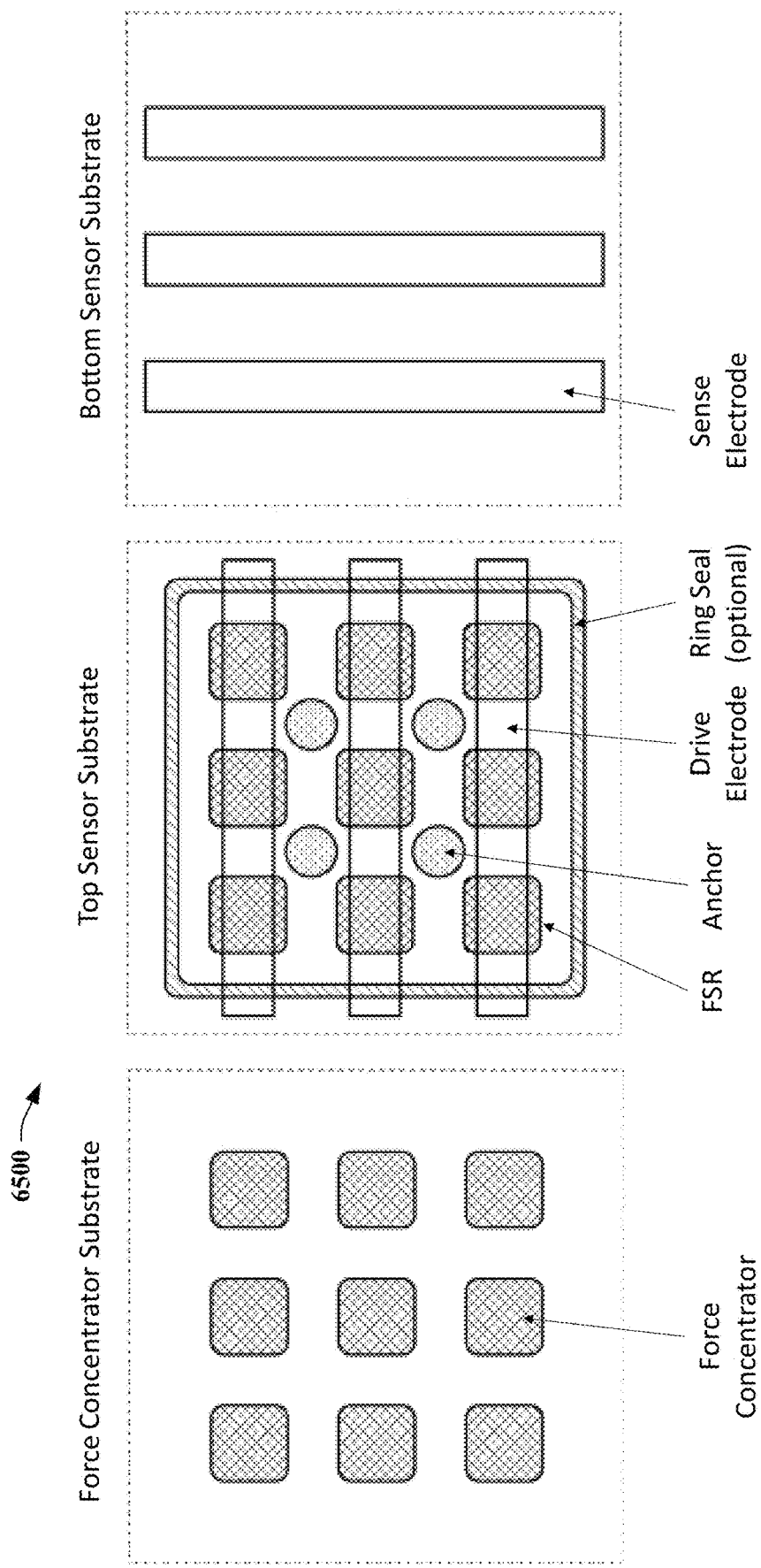

FIGS. 64-65 illustrate an overhead view 6400 of a force concentrator substrate, overlaid over a top sensor substrate, which in turn can be overlaid over a bottom sensor substrate. As illustrated in FIG. 64 the force concentrator substrate can comprise a grouping of force concentrating elements. The top sensor substrate can comprise a variously arranged grouping of force sensitive resistive (FSR) elements, a variously arranged grouping of anchor elements, and a grouping of drive electrodes oriented in a horizontal axis. The bottom sensor substrate can comprise a grouping of sense electrodes oriented in a vertical axis. In the context of FIG. 65, it should be noted that the illustrated ring seal (or edge seal) can be optional. In regard to FIG. 64 the overhead view (e.g., depicted on the left hand side of the illustration) can correspond to selectively adhered resistive force sensor 3300 illustrated in FIG. 33.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A sensor device, comprising:
a flexible membrane comprising a conductive layer; and
a printed circuit board comprising:
a plurality of sensor electrodes selectively positioned so as to abut the flexible membrane bonded to ones of a plurality of adhesive posts electively positioned on the printed circuit board by respective bonds, and a plurality of gaps, wherein during fabrication of the sensor device, the conductive layer was cured to facilitate, based on positions of the plurality of adhesive posts, delaminating the conductive layer from the plurality of sensor electrodes, while retaining the flexible membrane being bonded to the ones of the plurality of adhesive posts and reducing a size of ones of the plurality of gaps, resulting in the plurality of sensor electrodes being weakly and selectively adhered to the conductive layer,
wherein the flexible membrane deforms based on an external input force, resulting in movement of the conductive layer in relation to the plurality of sensor electrodes, and
wherein a sensor electrode of the plurality of sensor electrodes registers an input event based on the movement.

2. The sensor device of claim 1, wherein the conductive layer is partitioned into a first area and a second area.

3. The sensor device of claim 2, wherein the positions of the plurality of adhesive posts were positioned in the first area in a pattern along with the ones of the plurality of gaps.

4. The sensor device of claim 2, wherein the plurality of adhesive posts are selectively secured to the second area.

5. The sensor device of claim 1, wherein a gap of the plurality of gaps comprises an air gap reduced in size after formation based on the curing of the conductive layer.

6. The sensor device of claim 1, wherein a force concentrating element is formed on a first surface of the flexible membrane.

7. The sensor device of claim 6, wherein the force concentrating element is positioned on the first surface of the flexible membrane to be in proximity of the sensor electrode.

8. A fabrication system, comprising:
a processor; and
a memory that stores executable instructions that, when executed by the processor, facilitate performance of operations, comprising:
facilitating placement of a conductive layer with a first surface comprising a plurality of sensor electrodes selectively positioned so as to abut ones of a plurality of adhesive posts selectively positioned on the first surface and a plurality of gaps; and
delaminating the conductive layer from the plurality of sensor electrodes, wherein the delaminating causes the conductive layer to contact and weakly adhere to the plurality of sensor electrodes, wherein the conductive layer is placed to deform based on an external input force, resulting in movement of the conductive layer in relation to the first surface, and wherein the sensor electrode registers an input event based on the movement, wherein the conductive layer, the first surface, and an adhesive post of the plurality of adhesive posts enclose the plurality of gaps, wherein during fabrication of the fabrication system, the conductive layer was cured to facilitate, based on positions of the plurality of adhesive posts, delaminating the conductive layer from the plurality of sensor electrodes, while retaining the flexible membrane being bonded to the ones of the plurality of adhesive posts and reducing a size of ones of the plurality of gaps, resulting in the plurality of sensor electrodes being weakly and selectively adhered to the conductive layer.

9. The fabrication system of claim 8, wherein at placement the conductive layer comprises an uncured conductive polymer composite.

10. The fabrication system of claim 8, wherein at placement the conductive layer comprises a partially-cured conductive polymer.

11. The fabrication of claim 8, wherein one of the plurality of the sensor electrodes comprises a first sensor electrode in an array of sensor electrodes.

12. The fabrication system of claim 11, wherein the array of sensor electrodes is patterned on a printed circuit board.

13. The fabrication system of claim 11, wherein the conductive layer is applied over the array of sensor electrodes.

14. The fabrication system of claim 8, wherein the first surface comprises a printed circuit board.

15. The fabrication system of claim 14, wherein the adhesive post is selectively patterned on the printed circuit board in a pattern where gaps of the plurality of gaps and adhesive posts are alternately placed.

16. The fabrication system of claim 14, wherein the conductive layer is applied over one of the plurality of adhesive posts.

17. The fabrication system of claim 8, wherein delaminating the conductive layer comprises agitating the conductive layer to release the conductive layer from the array of sensor electrodes.

18. The fabrication system of claim 8, wherein delaminating the conductive layer comprises facilitating a thermal shock to the conductive layer to release the conductive layer from the array of sensor electrodes.

19. A non-transitory machine-readable storage medium, comprising executable instructions that, when executed by a processor, facilitate performance of operations, comprising:
  applying a laminate comprising a flexible membrane and a conductive layer to a first surface, wherein the first surface comprises a group of sensor electrodes patterned on a printed circuit board and a plurality of selectively positioned posts formed on the printed circuit board so as to abut ones of a group of sensor electrodes of ones of a plurality of gaps; and
  treating the laminate so as to cause a stress to the conductive layer, wherein the stress causes the conductive layer to delaminate from a sensor electrode of the group of sensor electrodes, while the conductive layer remains bonded to a post of the plurality of selectively positioned posts, wherein the laminate is applied to deform based on an external input force, resulting in movement of the conductive layer in relation to the first surface, and wherein a sensor electrode of the group of sensor electrodes registers an input event based on the movement, wherein during fabrication, the conductive layer was cured to facilitate, based on positions of the plurality of selectively positioned posts, delaminating the conductive layer from the first surface, while retaining the flexible membrane being bonded to the ones of the plurality of selectively positioned posts and reducing a size of ones of the plurality of gaps, resulting in the plurality of sensor electrodes being weakly and selectively adhered to the conductive layer.

20. The non-transitory machine-readable storage medium of claim 19, wherein the treating comprises curing the laminate, and wherein the delaminating from the sensor electrode is caused by a change in a volume of the conductive layer, and wherein a fabrication material of the laminate was chosen such that the conductive layer delaminates from the sensor electrode while remaining bonded to the post.

* * * * *